United States Patent
Amari et al.

(10) Patent No.: US 6,587,130 B1
(45) Date of Patent: Jul. 1, 2003

(54) MULTI-FUNCTION SWITCH DEVICE

(75) Inventors: Takeyuki Amari, Shizuoka (JP); Koji Ishii, Shizuoka (JP); Masayuki Ogawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/433,715

(22) Filed: Nov. 4, 1999

(30) Foreign Application Priority Data

Nov. 9, 1998 (JP) .......................... 10-318053
Mar. 3, 1999 (JP) .......................... 11-055432
Mar. 3, 1999 (JP) .......................... 11-056054

(51) Int. Cl.$^7$ ................................ G09G 5/00
(52) U.S. Cl. ..................... 345/810; 345/840
(58) Field of Search ................ 345/810, 840, 345/845, 853–855; 369/2, 6

(56) References Cited

U.S. PATENT DOCUMENTS

| 4,731,769 A | * | 3/1988 | Schaefer et al. ............... 369/6 |
| 4,811,226 A | * | 3/1989 | Shinohara ............... 364/424.05 |
| 5,195,065 A | * | 3/1993 | Kato et al. ..................... 369/2 |
| 5,784,059 A | * | 7/1998 | Morimoto et al. .......... 345/353 |
| 5,803,000 A | * | 9/1998 | Montia .................... 112/102.5 |
| 5,847,704 A | * | 12/1998 | Hartman ...................... 345/339 |
| 5,894,294 A | * | 4/1999 | Morita ........................ 345/157 |
| 5,977,976 A | * | 11/1999 | Meada ........................ 345/353 |
| 6,232,961 B1 | * | 5/2001 | Kunimatsu et al. ......... 345/173 |
| 6,240,347 B1 | * | 5/2001 | Everhart et al. .............. 701/36 |

FOREIGN PATENT DOCUMENTS

| DE | 199 41 956 | * | 8/2001 |
| JP | 59-57043 | | 4/1984 |
| JP | A-9-115377 | | 5/1997 |
| JP | 9-198176 | | 7/1997 |

* cited by examiner

Primary Examiner—Amare Mengistu
(74) Attorney, Agent, or Firm—Armstrong, Westerman & Hattori, LLP

(57) ABSTRACT

In a multi-function switch, while a first level screen inclusive of images representative of a plurality of object appliances viewed at operation buttons is displayed on a display means, an image of a selected appliance is selected by pressing any one of the operation buttons. Next, a second level screen inclusive of a plurality of functions of the selected appliance is displayed on the display means. In this configuration, not only the number of the operation buttons but also the space required for displaying the selected appliance can be reduced. When an air conditioner mode is selected from the first level screen, by pressing one by one a operation button for air drafting, in accordance with the number of times of pressing, the symbol representative of drafting mode is changed in a sequence of six patterns of "no drafting", "only head", "both head and leg", "only leg" "only leg with defogger" and "head and leg with defogger". In this configuration, the multi-function of a operation button for stepwise setting an operation of the air conditioner can be also realized.

4 Claims, 46 Drawing Sheets

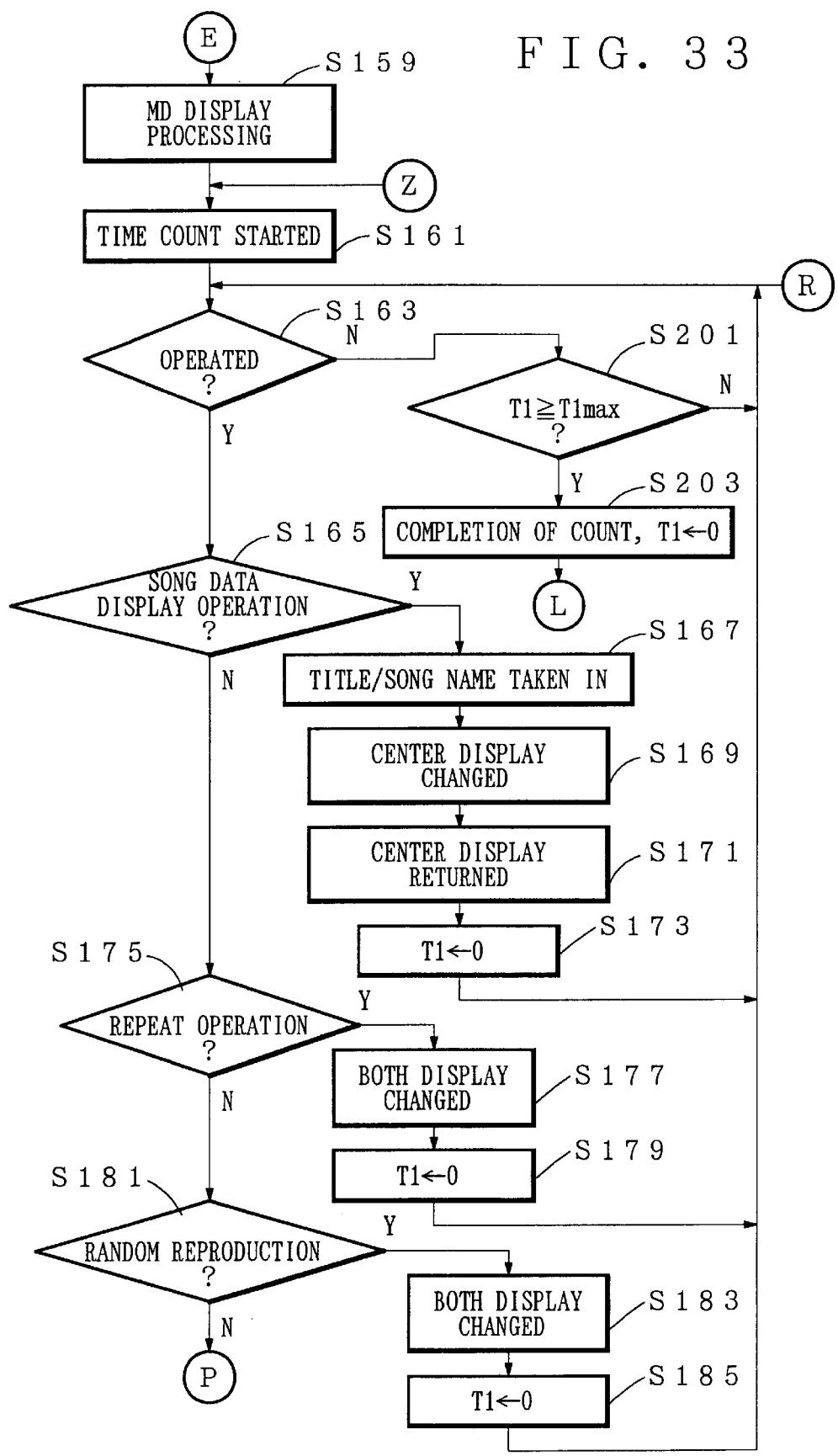

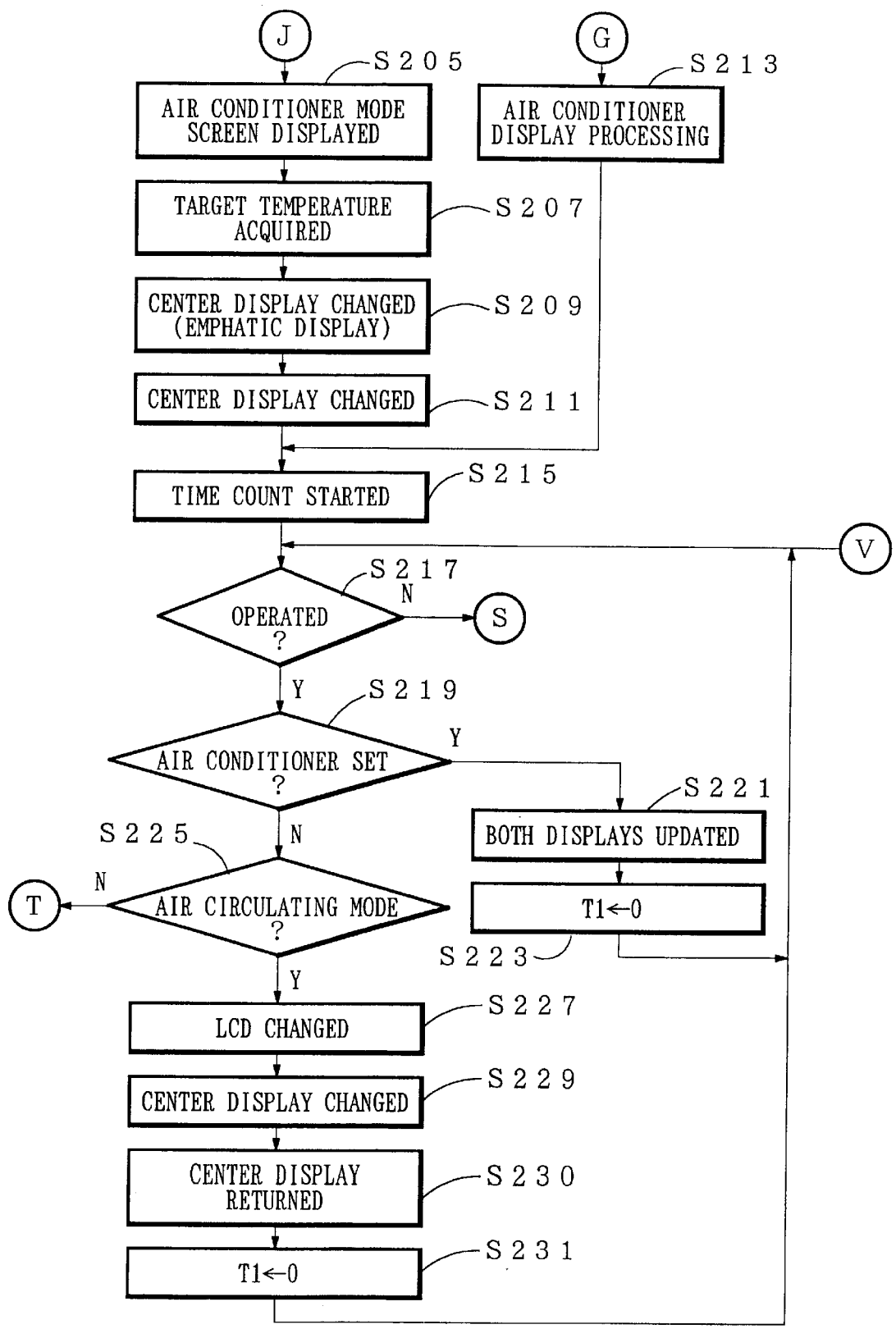

FIG. 41
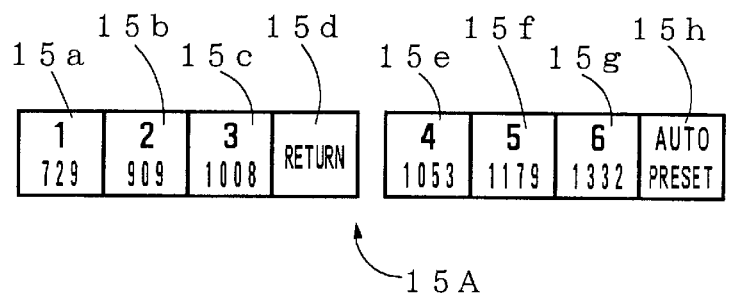
FIG. 44A  FIG. 44B
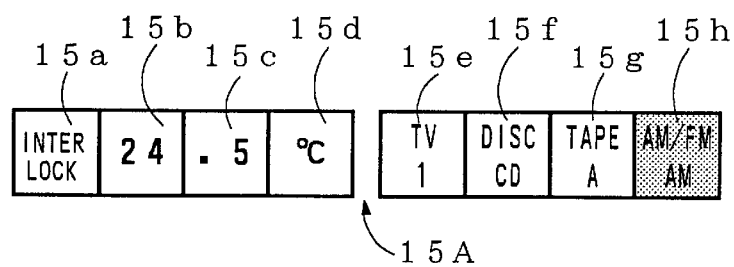 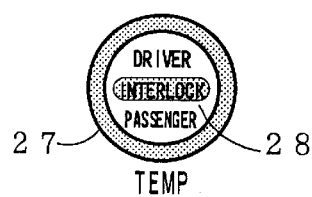
FIG. 45A  FIG. 45B
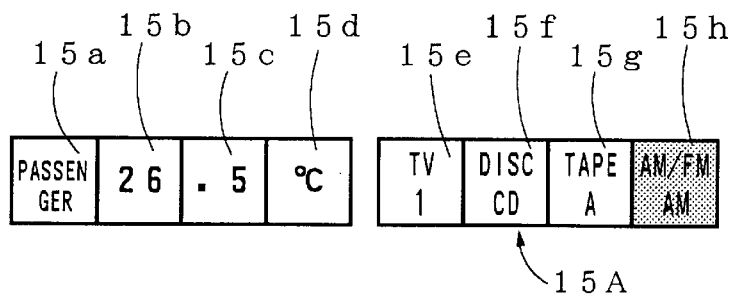 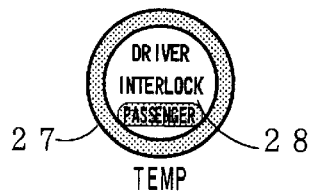

MULTI-FUNCTION SWITCH DEVICE

BACKGROUND OF THE INVENTION

1. Field of the Invention

The present invention relates to a multi-function switch device which is commonly used for selecting operation contents of a plurality of object appliances.

2. Description of the Related Art

Electric appliances such as a car stereo, a car air conditioner, etc. which are arranged intensively on the console of an motor car, requires operation buttons for selecting the corresponding operations. Conventionally, these operation buttons were individually arranged on the center console for each electric appliance.

However, with a development of technology, each electric appliance had a wide variety of functions which requires the corresponding number of operation buttons. Therefore, it has become difficult to arrange all the operation buttons on the center console in a limited space. Further, an increase in the number of the operation buttons might impair the appearance in design of the center console.

In order to obviate such inconveniences, a large number of prior arts have been proposed. Now, an explanation will be given of its typical example, the clustered switch device for a vehicle disclosed in JP-A-59-57043 (Laid-open).

In this concentrated switch device for a vehicle, a plurality of switches for mode selection are indicated on a partial area on a liquid crystal display. In operation, when a mode is selected by touching the indication of either switch by a finger, another transparent switch detects this. Thus, a plurality of switches for function selection corresponding to the selected mode are prepared in another area on the display.

In the clustered switch device, since the switches for function selection are prepared through the operation of the switches for mode selection, the number of switches for function selection to be displayed simultaneously and that of transparent switches for detecting their operation can be reduced.

However, since the areas for the switches for mode selection and function selection are located individually on the liquid crystal display, spaces corresponding to them must be assured on the display, and the respective transparent switches for detecting the operation of the above switches for mode selection and function selection must be provided. It was difficult to arrange these switches in the limited space such as the center console.

JP-A-9-115377 proposes a device for operating an air conditioner in which only the indication of the operation buttons for function selection is made on a liquid crystal display. In this case, the liquid crystal display indicates only the functions of the operation buttons for function selection. Therefore, the operation buttons for mode selection and function selection must be arranged outside the liquid crystal display. Accordingly, the technique disclosed in this reference could not also adopted in view of the limited space.

JP-A-9-198176 discloses an electronic appliance in which changes in the indication of the function of an operation button which is viewed through its transparent portion or through-hole are displayed on a liquid crystal display arranged behind the operation button.

In this electronic appliance, the contents to be indicated on the liquid crystal display are changed in accordance with the functions given to the operation button. Therefore, the functions given to the operation button which are allotted according to different circumstances can be surely recognized at the respective present timings. This greatly contribute to reduction in the number of operation switches in a manner of multi-functioning of the operation switch.

Meanwhile, the functions not used simultaneously, such as reproduction of a CD player and reproduction of a cassette player, can be performed by a single operation. Therefore, these functions can be switchably allotted to a single operation button so that they have only to be correspondingly indicated on the display.

However, the stepwise change of a setting condition, such as setting of the wind amount in an air conditioner and setting of the volume in an audio system cannot be performed by the single operation such as once pressing the operation button. Such a stepwise change has been carried out using a sliding knob, rotary knob, or operation buttons corresponding to setting stages. In this case, it can not be realized to allot the function inclusive of the stepwise change as well as the other functions and to switch the functions according to circumstances in a manner of changing the function indication of the operation button.

In view of the circumstances described above, the present invention has been accomplished.

SUMMARY OF THE INVENTION

The first object of the present invention is to provide a multi-function switch device which can perform or recognize a plurality of functions by each of a plurality of operation buttons when the number of operation buttons as well as the space required for display of the functions are reduced.

The second object of the present invention is to provide a multi-function switch device which can perform or recognize a plurality of functions by an operation button for setting the stepwise operation as well as another operation button for only selecting the corresponding function.

In order to attain the first object of the present invention, in accordance with the first aspect of the present invention, there is provided a multi-function switch device comprising: a plurality of operating operation buttons $\alpha 1$–$\alpha n$ each for selecting object appliances and their operation; a display means 15$j$ on which images indicative of functions of the operation buttons are displayed, the images being viewed at the corresponding operating operation buttons; means 31A for executing the display of a first level screen representative of a plurality of object appliances to be selected on the display means 15$j$; means B for detecting whether or not any of the operation buttons has been pressed while the first level screen is displayed; means 31B for specifying an image of the appliance to be displayed on the display means 15$j$ in response to detection of a pressed operation button; and means 31C for executing the display of a second level screen representative of a plurality of functions of a specific appliance. In such a configuration, the number of operation buttons $\alpha 1$–$\alpha n$ and space occupied by these operation buttons can be reduced while the functions of these operation buttons are recognized.

Preferably, the multi-function switch device further comprises means 31D for setting images of the plurality of object appliances on the first display screen. Therefore, the contents of the object appliances to be selected can be optionally set.

Preferably, the means 31D sets images of the plurality of object appliances on the basis of appliance information transferred from these object appliances. Therefore, the images of the plurality of object appliances on the first level screen can be easily set with no special means or operation.

Preferably, the multi-function switch device further comprises means 31E for setting images of a specific object appliance on the second level screen. Therefore, the contents of the functions of the selected object appliance can be optionally set.

Preferably, the means 31E sets images of a specific object appliance on the basis of function information transferred from the specific appliance. Therefore, the images of the plurality of functions of the selected appliance on second first level screen can be easily set with no special means or operation.

Preferably, the multi-function switch device further comprises a specific operation button β which is valid for a specific object appliance, and means C for detecting whether the specific operation button has been operated while the first level screen is displayed. In this configuration, even if the kind of the object appliance is designated, when the specific operation button is operated, the functions relative to the specific operation button can be set at the operation buttons.

Preferably, while the first level screen or the second level screen is displayed on the display means 15j, in a first operation button region except at least one of the plurality of operation buttons α1–αn, the corresponding functions are viewed, whereas in a second operation button region constituting the at least one operation button, additive information relative to functions of the operation buttons viewed in the first operation button region is viewed. In this configuration, the necessary number of operation buttons can be assured for selection of the object appliance and its function while additive information relative to the operation buttons can be displayed on the space of operation buttons not used for selection.

Preferably, the first level screen includes a symbol predictive of presence of the second level screen corresponding to at least one appliance displayed by the first level screen. Therefore, the presence or absence of the function to be selected on the second level screen can be known in advance.

Further, in accordance with the first aspect of the present invention, there is provided a multi-function switch device comprising: a plurality of operating operation buttons δ1–δn each for selecting one of operations of a specific object appliance; a section D through which an operation of the specific appliance is selected using any of the operation buttons δ1–δn; a section E through which a change of setting of the operation of the object appliance is instructed; display means 15j, 15k for displaying the operations of the specific appliance which are viewed at the corresponding operation buttons δ1–δ; and display changing means 33A for changing the display of the display means 15j, 15k so that in response to an instruction of changing the setting of the operation, selective operations relative to at least the setting are viewed at the operation buttons.

In this configuration, the functions of the object appliance whose setting has been changed can be viewed at the operation buttons δ1–δn and can be executed successively executed.

Preferably, the setting change instructing section E includes some of the operation buttons δ1–δn at which selective instructions to change of the setting are viewed. Therefore, the space occupied by the operation buttons δ1–δn can be saved.

Preferably, the setting change instructing section E further includes an individual operation button λ for instructing to change of the setting. Therefore, an user can use both the operation buttons and the individual operation button for changing the setting of the object appliance in accordance with the function of the object appliance.

Preferably, the setting change instructing section E further includes some of the operation buttons δ1–δn at which selective instructions of determining an instruction to change the setting are viewed. Therefore, it is possible to prevent the operation based on an erroneous instruction from being viewed.

Preferably, the setting changing section E includes some of the operation buttons δ1–δn at which selective instructions of determining an instruction to change the setting are viewed. In this configuration, an user can use both the operation buttons and the individual operation button for changing the setting of the object appliance in accordance with the function of the object appliance. It is also possible to prevent the operation based on an erroneous instruction from being viewed.

Preferably, a present setting relative to the operation of the selected appliance is viewed at some of the operation buttons δ1–δ.

Preferably, an image of the first color is viewed against a background of the second color at a first operation button region composed of some of the plurality of operation buttons, whereas the image of the second color is viewed against the background of the first color at a second operation button region composed of the remaining operation buttons, and the first and the second operation button region are switched by a selecting means F.

In order to attain the second object of the present invention, in accordance with the second aspect of the present invention, there is provided multi-function switch comprising: operation button means α for stepwise setting one of operations of an object appliance; display means 15j for displaying the set operation which is viewed at the operation button means; means A' for detecting that any one of operation button means has been pressed; means 31A' for deciding the step of the operation set by the operation button means on the basis of a detection result of the detecting means A'; means 31B' for creating image information of a character to be viewed at the operation button means on the basis of a decision result of the deciding means 31B so that the character representative of the operation of the object appliance viewed at the operation button means is changed in accordance with the step on the display means.

Preferably, the operation button means includes an increment operation button for incrementing the step of the operation of the object appliance and a decrement operation button for decrementing the step thereof; and the step deciding means decides that the step of the operation is now a minimum value when the operation detecting means detects the operation of the increment operation button in a state where the step of the operation is decided to be a maximum value, and decides that the step of the operation is now a maximum value when the operation detecting means detects the operation of the decrement operation button in a state where the step of the operation is decided to be a minimum value.

Preferably, the operation button means further includes a default operation button for setting the step of operation at a default value between the minimum value and the maximum value , and the step deciding means decides that the step of the operation is now a default value when the operation detecting means detects the operation of the default operation button.

Preferably, the operation button means includes a plurality of operation buttons and the character created by the character image information creating means is viewed at an area extending over the plurality of operation buttons.

The above and other objects and features of the present invention will be more apparent from the following description taken in conjunction with the accompanying drawings.

BRIEF DESCRIPTION OF THE DRAWINGS

FIGS. 26 to 38 are flowcharts of the processing which is performed by a CPU in accordance with the control program stored in the ROM of the microcomputer shown in FIG. 25;

FIG. 41 is a view showing the display state of a preset operation mode by the multi-switch section in FIG. 39;

FIGS. 44A and 44B are views showing a character display changing pattern on the multi-switch section and on a seat setting operation button which shows a temperature adjusting area in a room temperature adjusting mode display, respectively;

FIGS. 45A and 45B are views showing a character display changing pattern on the multi-switch section and on a seat setting operation button which shows a temperature adjusting area in a room temperature adjusting mode display, respectively;

DESCRIPTION OF THE PREFERRED EMBODIMENTS

Aspect 1 of the Invention

Figure 1:
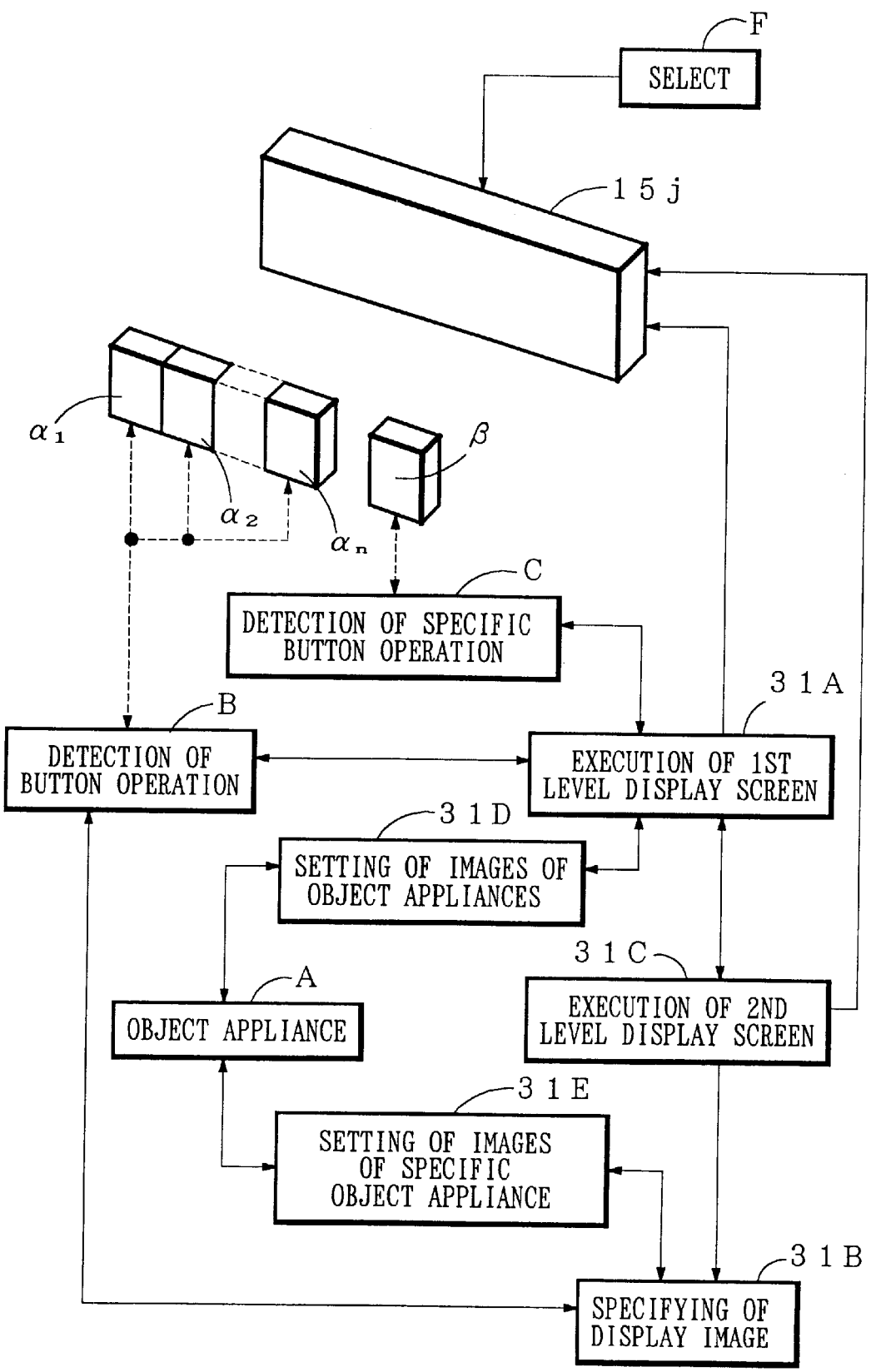
FIG. 1 is a block diagram of a basic configuration of the multi-function switch device according to the first aspect of the present invention.
Figure 2:
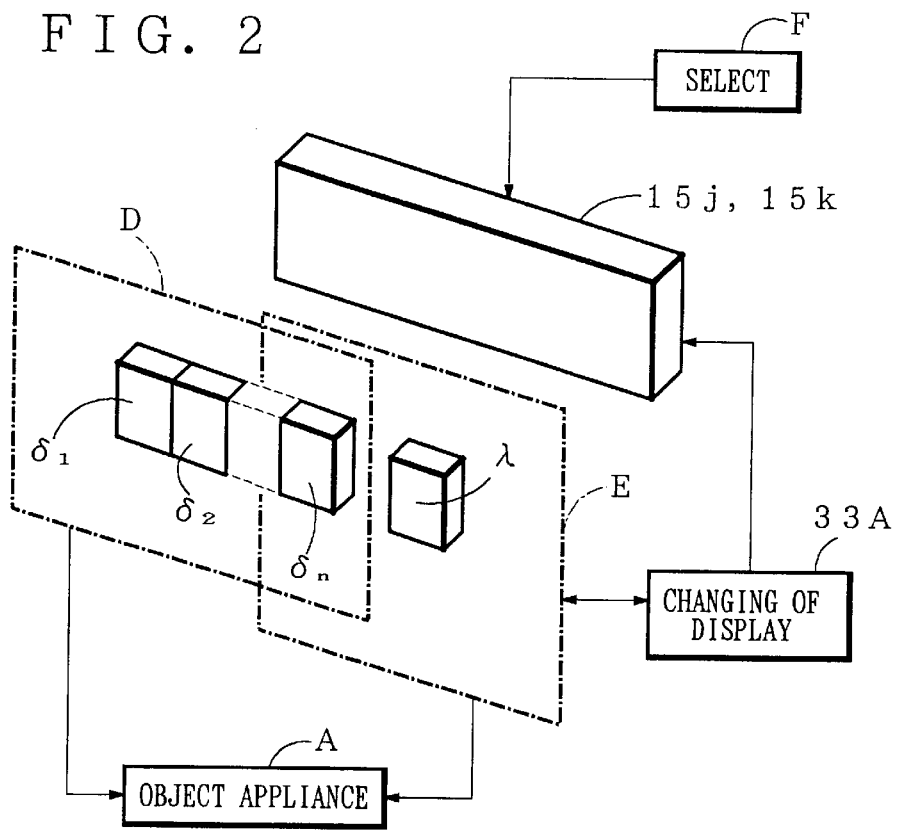
FIG. 2 is a block diagram of another basic configuration of the multi-function switch device according to the first aspect of the present invention.

First, now referring to the drawings, an explanation will be given of several embodiments of a multi-function switch according to the first aspect of the present invention.

Prior to explaining the embodiments, referring to FIG. 3, an explanation will be given of an object to which the present invention is applied.

Figure 3:
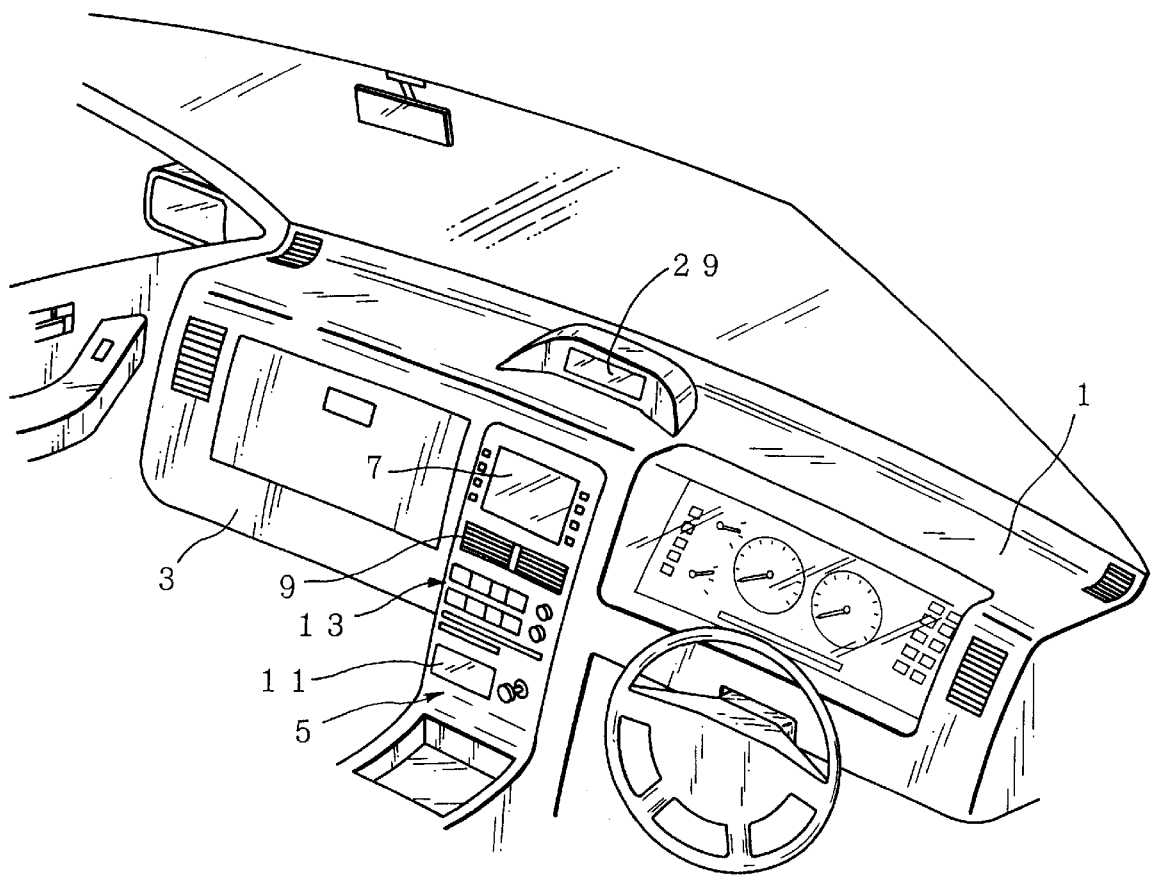
FIG. 3 is a perspective view of the vicinity of a dash board of a motor vehicle inclusive of a center console to which the switch according to the present invention can be applied.

FIG. 3 is a perspective view of the vicinity of a dash board of a motor vehicle to which the switch device according to the present invention can be applied. In FIG. 3, reference numeral 1 denotes a dash board, and 3 denotes an instrument panel. A center console 5 is centrally arranged on the instrument panel in a width direction of the vehicle.

The center console 5 includes a screen 7 for car navigation, an outlet 9 for an air conditioner, and ash tray 11. Further, the center console 5 includes a combination panel 13 between the outlet 9 and the ash tray 11. The combination panel 13 constitutes a switch device according to the present invention.

Embodiment 1

An explanation will be given of a switch device according to the first embodiment in the first aspect of the present invention.

Figure 4:
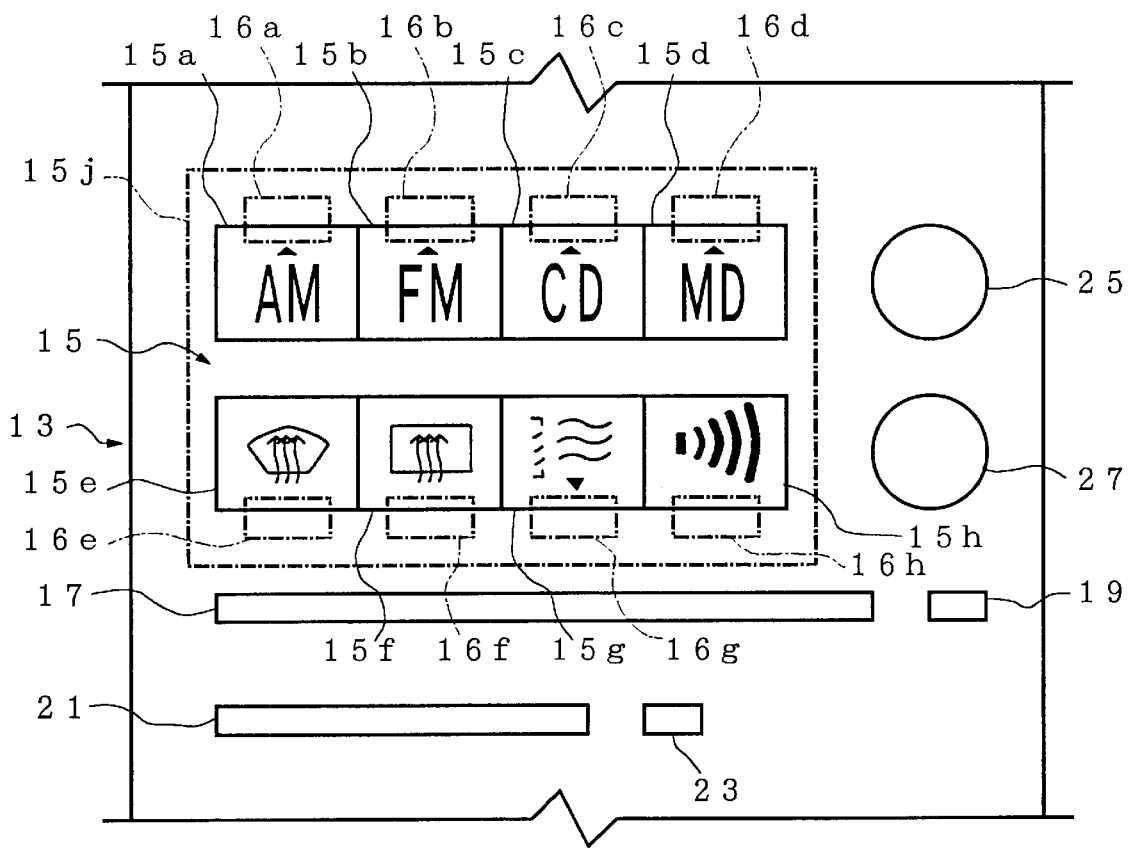
FIG. 4 is a front view of the switch device according the first embodiment of the first aspect of the present invention.
Figure 24:
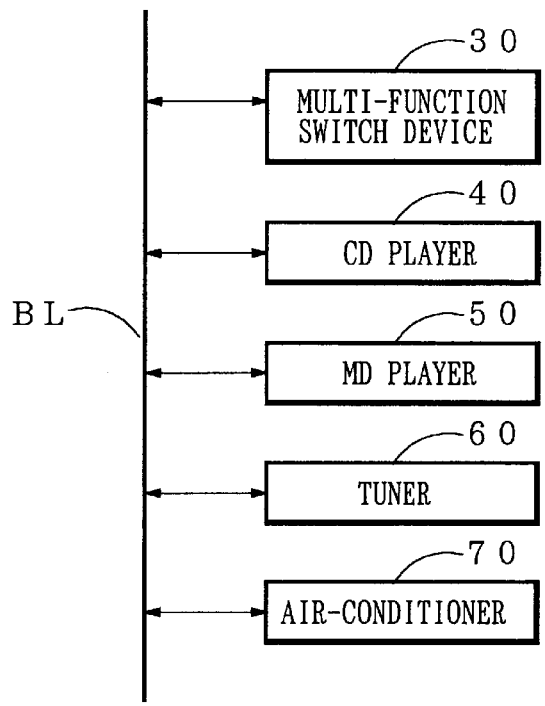
FIG. 24 is a block diagram showing the schematic configuration of a multiplex transmission system which is installed in a center console.

FIG. 4 is a front view of the main part of such a switch device (combination panel). The combination panel 13 includes a multi-switch section 15; a CD slot 17 and its eject operation button 19 for a CD player (FIG. 24); a MD slot 21 and its eject operation button 23 for a MD (mini-disk) player (FIG. 24); a volume knob 25 for an audio system; and a temperature setting knob 27 for an air conditioner (FIG. 24). The operation contents of the respective components or sections are displayed on the screen of a center display 29 in FIG. 3.

The multi-switch section 15, as seen from FIG. 4, total eight operation buttons 15a–15h are arranged. Of these operation buttons, four operations buttons of 15a–15d are arranged in sequence from the left side at the upper row, whereas four operation buttons of 15e–15h are arranged in sequence from the left side at the lower row. Each of the operation buttons 15a–15h is made of a transparent material so that images displayed on a liquid crystal display 15j indicated by a phantom line, located behind the multi-switch section 15, can be directly viewed behind the respective operation buttons 15a–15h.

The liquid crystal display 15j may be located not only behind the multi-switch section 15, but also at any optional place within the center console 5. In this case. The light from the displayed image on the liquid crystal display 15j may be led to behind the respective operation buttons 15a–15h through a light conducting means (not shown).

Behind the multi-switch section 15, as seen indicated by phantom line in FIG. 4, limit switches 16a–16h for detecting the pressing of the operation buttons 15a–15h are arranged not so as to interfere with the image light from the liquid crystal display 15j.

The default mode display screen as shown in FIG. 4 as well as several mode images shown in FIGS. 5–9 is viewed at the operation buttons 15a–15h on the liquid crystal display 15j on the basis of the information relative to the device and function collected through a multiplex bus line described later.

On the default mode display screen shown in FIG. 4, the characters indicative of appliances to be selected, i.e. "AM", "FM", "CD" and "MD" are viewed or visually recognized at the four operation buttons at the upper stage. At the lower stage, a symbol mark indicative of an "air conditioner" to be selected is viewed at the second operation button 15g from right. Further, symbol marks indicative of "defogger", "hot wire rear window", and "traffic information" are viewed at the two operation buttons 15e and 15f on the left side and rightmost operation button 15h.

Incidentally, it should be noted that at the three operations buttons 15e, 15f and 15h in the default mode display, the symbol mark indicative of the function in "ON" is viewed as a crosshatched inverted display and that in "OFF" is viewed as a normal on-white normal display.

Further, it should be noted that at the four operation buttons 15a–15d at the upper stage and the operation button 15g at the lower stage in the default mode display, symbol marks such as ▲ or ▼ which indicate the presence of a second level screen are additionally displayed.

Figure 5:
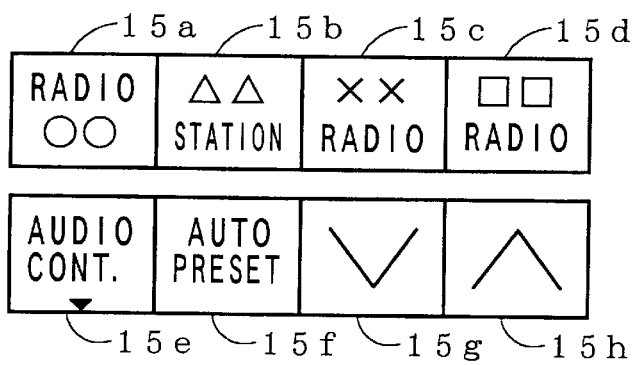
FIG. 5 is a view showing an AM radio mode screen displayed on a liquid crystal display of FIG. 4.

FIG. 5 shows an AM radio mode display screen. On this AM radio mode display screen, the characters indicative of the names of preset AM broadcasting stations are viewed at the four operation buttons 15a–15d at the upper stage, respectively. The characters indicative of the functions of "AUDIO CONT (audio control)" and "AUTO PRESET (automatic preset) are viewed at the left two operation buttons 15e and 15f at the lower stage.

In the AM radio mode display, the symbol marks ⋀ and ⋁ indicative of the functions of "DOWN in the receiving frequency" and "UP in the receiving frequency" are viewed at the right two operation buttons 15g and 15h at the lower stage.

Incidentally, it should be noted that at the four operations buttons 15a–15d at the upper stage in the AM radio mode display, the character indicative of the selected AM broadcasting station is viewed as a crosshatched inverted display and those of the non-selected AM broadcasting stations are viewed as a normal on-white normal display.

Figure 6:
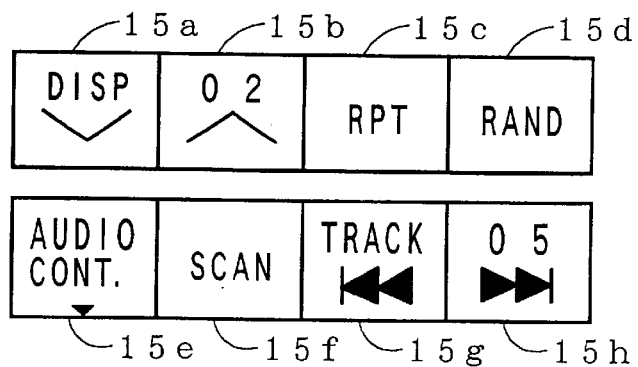
FIG. 6 is a view showing a CD mode screen displayed on a liquid crystal display screen of FIG. 4.

FIG. 6 shows a CD mode display screen. On this AM radio mode display screen, at the left two operation buttons 15a and 15b at the upper stage, the symbol marks indicative of DOWN and UP in the number of the selected disk and characters indicative of the selected disk number are viewed. Further, at the right two operation buttons 15g and 15h, the symbol marks indicative of DOWN and UP in the number of the reproduced track and characters indicative of the selected track number are viewed.

On the CD mode display screen, further, at the right two operation buttons 15c and 15d at the upper stage, the symbols indicative of the functions of "RPT (repeat reproduction)" and "RND (random reproduction)" are viewed, and at the left two operation buttons 15e and 15f at the lower stage, the symbols indicative of the functions of the selected objects of "AUDIO CONT (audio control)" and "SCAN (random scan reproduction) are viewed.

In the state where no CD is inserted from the CD slot 17, the selected disk number and selected track number are omitted from the CD mode display screen. Therefore, they are not viewed at the operation buttons 15b and 15h.

Figure 7:
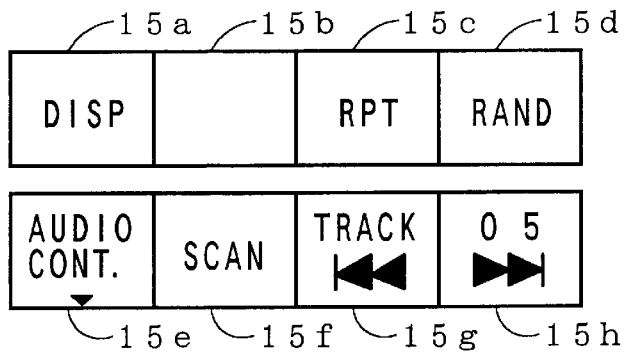
FIG. 7 is a view showing a MD mode screen displayed on a liquid crystal display screen of FIG. 4.

FIG. 7 shows an MD mode display screen. On this MD mode display screen, at three operation buttons at the upper stage, i.e. the leftmost operation button 15a and the right two operation buttons 15c and 15d, the symbols indicative of the functions of "DISP (song data display)", "RTP" and "RAND" are viewed. Further, at the left two operation buttons 15e and 15f at the lower stage, the symbols indicative of the functions of "AUDIO CONT (audio control)" and "AUTO PRESET (automatic preset) are viewed.

Further, on the MD mode display screen, at the right two operation buttons 15g and 15h, the symbol marks indicative of DOWN and UP in the number of the reproduced track and characters indicative of the selected track number are viewed.

In the state where no MD is inserted from the MD slot 21, the selected track number is omitted from the MD mode display screen. Therefore, it is not viewed at the rightmost operation button 15h.

It should be noted that in the MD mode display, at the second operation button 15b from left at the upper stage, no symbol or character is viewed.

Incidentally, it should be noted that at the three operations buttons 15c and 15d at the upper stage in both the CD mode display and MD mode display, the symbol mark indicative of the function in "ON" is viewed as a crosshatched inverted display and that in "OFF" is viewed as a normal on-white normal display.

Further, it should be noted that at the leftmost operation button 15e at the lower stage in both the AM radio mode, CD mode display and MD mode display, a symbol of ▼ which indicate the presence of a second level display is also additionally displayed.

Figure 8:
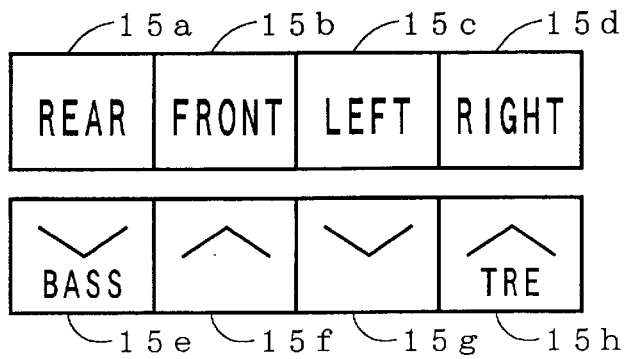
FIG. 8 is a view showing an audio control mode screen displayed on a liquid crystal display screen of FIG. 4.

FIG. 8 shows an audio control mode display screen. On this audio control mode display screen, at four operation buttons 15a, 15b, 15c and 15d, symbols indicative of the function of taking the balance in sound volume of "REAR (rear side)", "FRONT (front side)", "LEFT (left side)", and "RIGTH (right side)" are viewed.

In the audio control mode display, further, at the operation buttons 15e and 15h on both ends at the lower stage, the symbol marks and characters indicative of the function of taking the balance in sound quality of "BASS low" and "TREBLE high" are viewed. At the remaining two operation buttons 15f and 15g at the lower stage, the symbol marks and characters indicative of the function of taking the balance in sound quality of "BASS strong" and "TREBLE low" are viewed.

Figure 9:
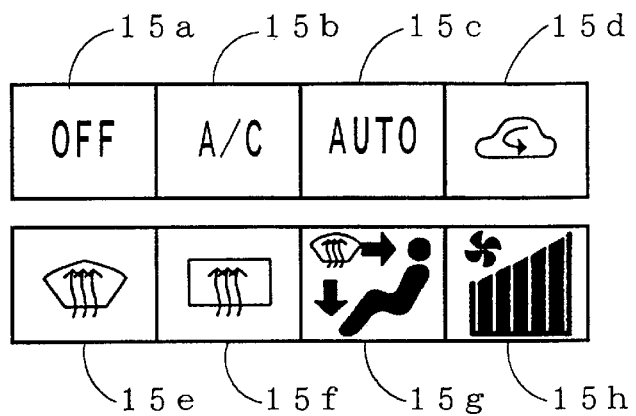
FIG. 9 is a view showing an air conditioner mode screen displayed on a liquid crystal display screen of FIG. 4.

FIG. 9 shows an air conditioner mode display screen. On this air conditioner mode display screen, at the operation button 15a at the upper stage, the character indicative of the status of "OFF" is viewed. At the operation buttons 15b and 15c at the upper stage, the characters indicative of the function of "A/C (manual)" and "AUTO" are viewed.

In the air conditioner mode display, at the operation button 15d at the upper row and the four operation buttons 15e, 15f, 15g and 15h at the lower row, symbol marks indicative of the functions of "air circulating mode", "defogger", "hot-wire rear window heater", "wind drafting mode" and "wind drafting level" are viewed.

Incidentally, in the air conditioner mode display, it should be noted that at the two operation buttons 15b and 15c at the upper row and the two operation buttons 15e and 15f at the lower row, the symbol mark indicative of the function in "ON" is viewed as a crosshatched inverted display and that in "OFF" is viewed as a normal on-white normal display.

Further, in the air conditioner mode display, it should be noted that the character "OFF" indicative of the status at the operation button 15a at the upper row is viewed as a crosshatched inverted display when both functions of "A/C" and "AUTO" are off, whereas it is viewed as a on-white normal display when either of both functions of "A/C" and "AUTO" is on.

Figure 10:
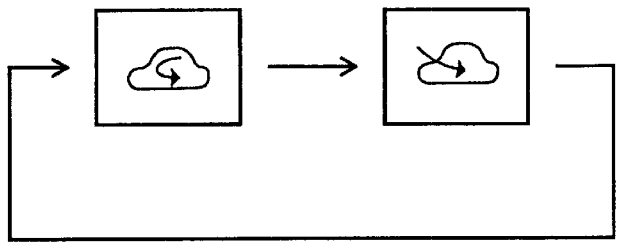
FIG. 10 is a view showing a display changing pattern of a symbol mark indicative of the function of the air circulating mode on the air conditioner mode screen of FIG. 9.

In the air conditioner mode display, it should be noted that whenever the setting of the air conditioner circulating mode viewed at the operation button 15d is changed, its symbol mark changes alternately between the symbol marks of "circulating" and "ventilating" as shown in FIG. 10

Figure 11:
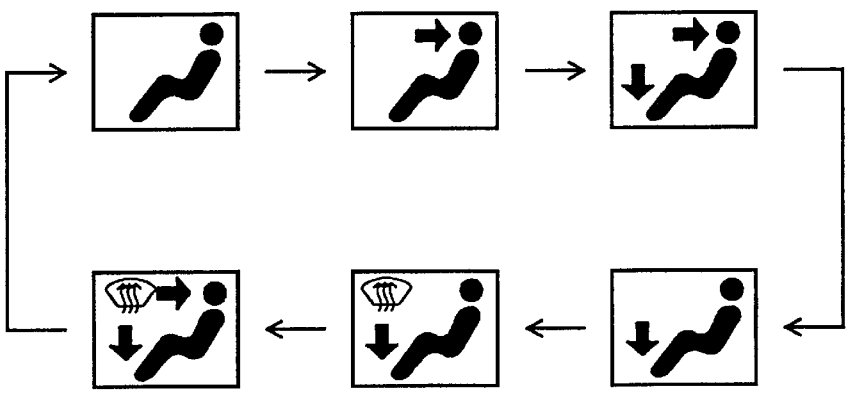
FIG. 11 is a view showing a display changing pattern of a symbol mark indicative of the function of the wind drafting mode on the air conditioner mode screen of FIG. 9.

In the air conditioner mode display, it should be noted that whenever the setting of the wind drafting mode viewed at the operation button 15g at the lower row changes is changed, its symbol mark changes in a sequence of six patterns of "no drafting", "only head", "both head and leg", "only leg", "only leg with defogger" and "head and leg with defogger" as indicated by arrows in FIG. 11.

Figure 12:
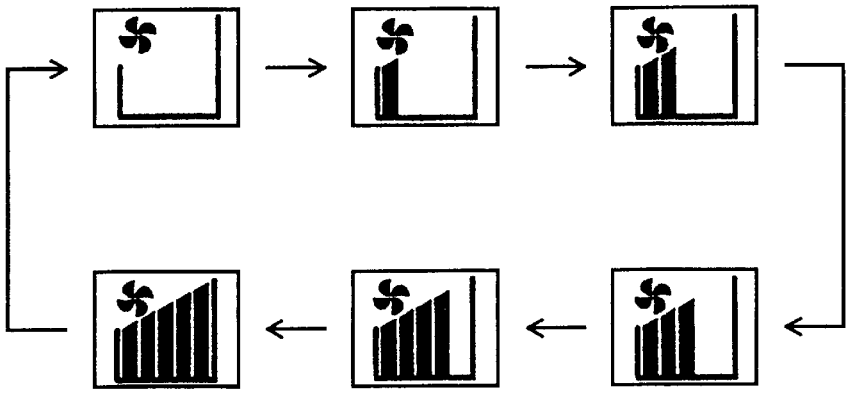
FIG. 12 is a view showing a display changing pattern of a symbol mark indicative of the function of a wind drafting level on the air conditioner mode screen of FIG. 9.

In the air conditioner mode display, further, it should be noted that the setting of the wind drafting level viewed at the operation button 15h at the lower row is changed, its symbol mark changes in six levels from 0 to 5 (maximum) of the wind drafting amount as indicated by arrows in FIG. 12.

In addition to the various modes described above, although not shown, an FM radio mode display can be carried out. Its manner is substantially the same as the AM radio mode display shown in FIG. 5 except that the names of preset FM broadcasting stations are viewed at the operation buttons 15a–15d at the upper row.

The center display 29 as well as the multi-switch section 15 constitutes a multi-function switch device according to the first embodiment of the first aspect of the present invention. The center display 29 may be a liquid crystal display. As seen from FIG. 3, it is arranged centrally on the dash board 1 in the width direction of the vehicle so that its display screen can be viewed from a driver seat and a passenger seat.

In order to display the information relative to the appliance selected by and function set by the operation buttons 15a–15h, the center display 29 displays status guiding screens as shown in FIGS. 13 to 23 in accordance with. each mode display screen on the liquid crystal display 15j and the operation of the operation buttons 15a–15h as described above.

Figure 13:
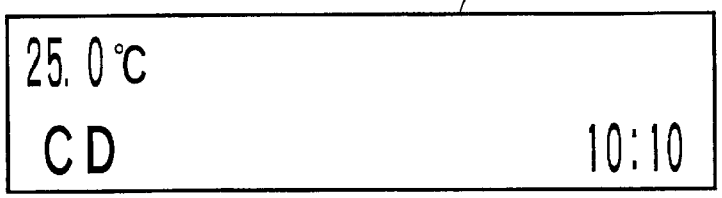
FIG. 13 is a view showing a default mode guiding screen displayed on a center display of FIG. 3.

FIG. 13 shows a default mode guiding screen. In the default mode, the center display 29 displays a present indoor temperature, an appliance selected from AM, FM, CD and MD which is now ON, and a present time.

Figure 14:
FIG. 14 is a view showing an AM radio mode guiding screen displayed on a center display of FIG. 3.

FIG. 14 shows an AM radio mode guiding screen. In the AM radio mode, the center screen 29 displays "AM" which is now ON, a broadcasting station being selected at present and its receiving frequency.

Figure 15:
FIG. 15 is a view showing a screen which is to be interrupted in the AM radio mode guiding screen of FIG. 14 and displayed on the center display screen of FIG. 3 while an audio control operation is performed.

While the audio control is performed, as seen from FIG. 15, the center display 29 displays the symbol marks of sound volume or quality balance and its adjusting state instead of the broadcasting station and its receiving frequency. While the auto-preset is performed, the center display 29 displays "AUTO PRESET" instead of the broadcasting station and its receiving frequency.

Figure 16:
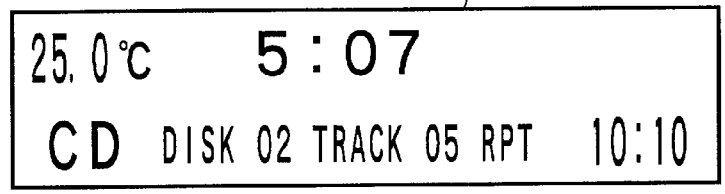
FIG. 16 is a view showing a CD mode guiding screen displayed on a center display of FIG. 3.

FIG. 16 shows a CD mode guiding screen. In the CD mode, the center display 29 displays "CD" which is now ON, a disk number and track number being reproduced and an elapsed reproduction time. In addition, when each of repeat reproduction, random reproduction and random scan reproduction is selected, its symbol is displayed on the center display 29.

In the case where the no CD is inserted into the CD slot 17, the center display 29 displays only "CD" in addition to the temperature and present time.

While the audio control is performed, the center display 29 displays the symbol marks of sound volume or quality balance and its adjusting state instead of the disk number and track number being reproduced and the elapsed reproduction time like the AM radio mode guiding screen.

Figure 17:
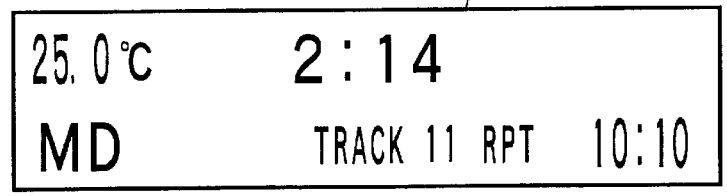
FIG. 17 is a view showing a MD mode guiding screen displayed on a center display of FIG. 3.

FIG. 17 shows a MD mode guiding screen. In the MD mode, the center display 29 displays MD" which is now ON, its track number being reproduced and an elapsed reproduction time. In addition, when each of repeat reproduction, random reproduction and random scan reproduction is selected, its symbol is displayed on the center display 29.

In the case where the no MD is inserted into the MD slot 21, the center display 29 displays only "MD" in addition to the temperature and present time.

While the audio control is performed, the center display 29 displays the symbol marks of sound volume or quality balance and its adjusting state instead of the track number being reproduced and the elapsed reproduction time like the AM radio mode guiding screen.

Figure 18:
FIG. 18 is a view showing a screen which is to be interrupted in the MD mode guiding screen of FIG. 17 and displayed on the center display of FIG. 3 while an song title display operation is performed.

While the song data display is performed, as shown in FIG. 18, the center display 29 emphatically displays only the disk title and song name written on the MD which is being reproduced at present.

Figure 19:
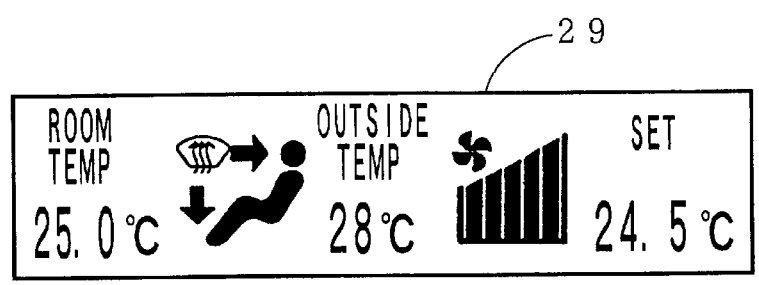
FIG. 19 is a view showing an airconditioner mode guiding screen displayed on the center display of FIG. 3.

FIG. 19 shows an air conditioner mode guiding screen. In the air conditioner mode, the center display 29 displays a present room temperature (25° C.), a present outside temperature (28° C.), and a set target temperature (24.5° C.). In addition, the center display 29 displays the symbol marks indicative of the wind drafting mode and wind drafting level.

Figure 20:
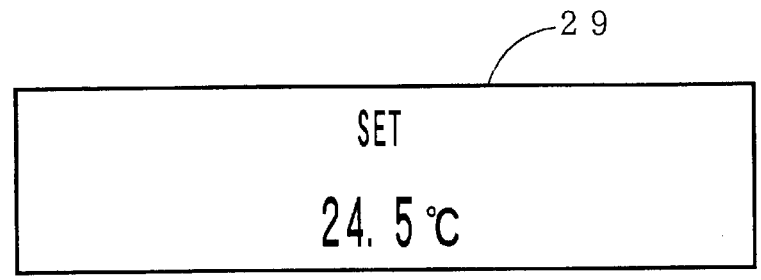
FIG. 20 is a view showing a screen which is to be interrupted in the air conditioner mode guiding screen of FIG. 19 and displayed on the center display of FIG. 3 when setting of the target temperature is changed.
Figure 21:
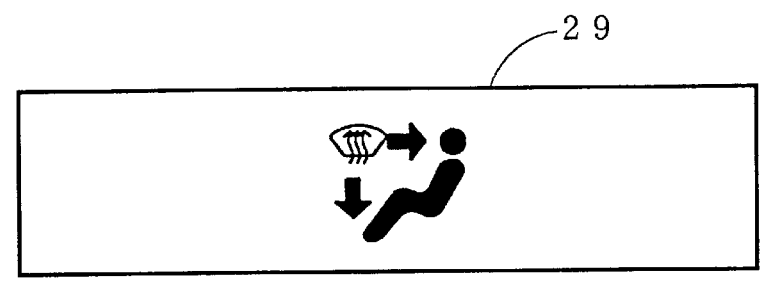
FIG. 21 is a view showing a screen which is to be interrupted in the air conditioner mode guiding screen of FIG. 19 and displayed on the center display of FIG. 3 when setting of the wind drafting mode is changed.
Figure 22:
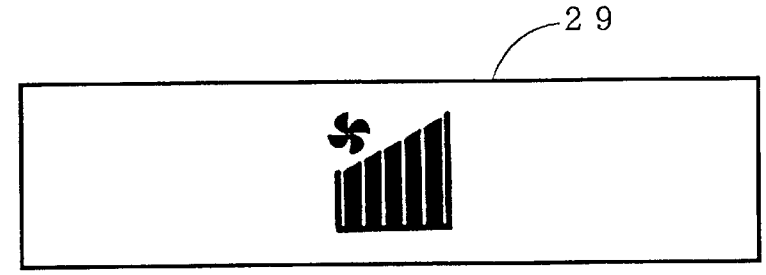
FIG. 22 is a view showing a screen which is to be interrupted in the air conditioner mode guiding screen of FIG. 19 and displayed on the center display of FIG. 3 when setting of the wind drafting level is changed.

When setting of the target temperature is changed, as shown in FIG. 20, the center display 29 emphatically displays only the target temperature. When the wind drafting mode is changed, as shown in FIG. 21, the center display 29 displays its symbol after changed. Otherwise, when the wind drafting level is changed, as shown in FIG. 22, the center display 29 displays its symbol after changed.

When setting of the air circulating mode is changed, although not shown, the center display 29 emphatically displays only the symbol mark of either "circulating" or "outside air" after changed.

Incidentally, on the center display 29, the symbol mark of the wind drafting mode changes in the sequence indicated by arrows in FIG. 11, and that of the wind drafting level changes in the sequence indicated by arrows in FIG. 12.

When the air conditioner is changed from "ON" to "OFF", the set target temperature disappears from each of the screens shown in FIGS. 13, 14, 15, 16, 19 and during the auto-presetting.

Figure 23:
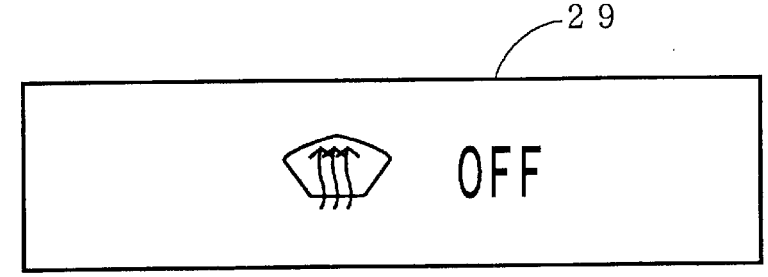
FIG. 23 is a view showing a screen which is to be interrupted in the default mode guiding screen of FIG. 13 or the air conditioner mode guiding screen of FIG. 19 and displayed on the center display of FIG. 3 when the ON/OFF state of a defogger is changed.

While the default mode guiding screen of FIG. 13 or air conditioner mode guiding screen of FIG. 19 is displayed, when the ON/OFF state of the defogger is changed, the center display 29 emphatically displays only the symbol mark of the defogger and its status after changed as seen from FIG. 23. Further, also when the ON/OFF state of the hot wire rear window or traffic information is changed, although not shown, the center display emphatically displays only the symbol mark of the hot wire rear window or traffic window and its function state after changed.

In FIG. 23, the state changed from ON to OFF is shown. When the state is changed from OFF to ON, the character of ON instead of OFF is shown.

Although not shown in detail, the FM radio mode guiding screen can be also displayed. In this case, like the AM radio mode guiding screen, the center display 29 displays the broadcasting station being selected and its receiving frequency as well as "FM". On the FM radio mode guiding screen, the audio control and auto-preset are displayed in the same manner as the AM radio mode guiding screen.

The volume knob 25 serves to adjust the volume (sound level) of the AM broadcasting (inclusive of traffic information) or FM broadcasting received by a tuner (FIG. 24) and that of the sound reproduced from the CD player or MD player (not shown). On the other hand, the temperature setting knob 27 serves to adjust the room temperature by the air conditioner. These knobs are adapted to change the target volume and temperature by rotation.

An explanation will be given of the schematic electric configuration of the switch device according to the first embodiment.

FIG. 24 is a block diagram of the schematic configuration of a multiplex communication system which is composed of electric components relative to facilities such as the center console 5 loaded within the vehicle. In FIG. 24, the switch device 30 according to this embodiment constitutes a multiplex communication system which makes communication using a multiplex bus line BL together with a CD player 40, MD player 50, tuner 60, air conditioner 70, etc.

Figure 25:
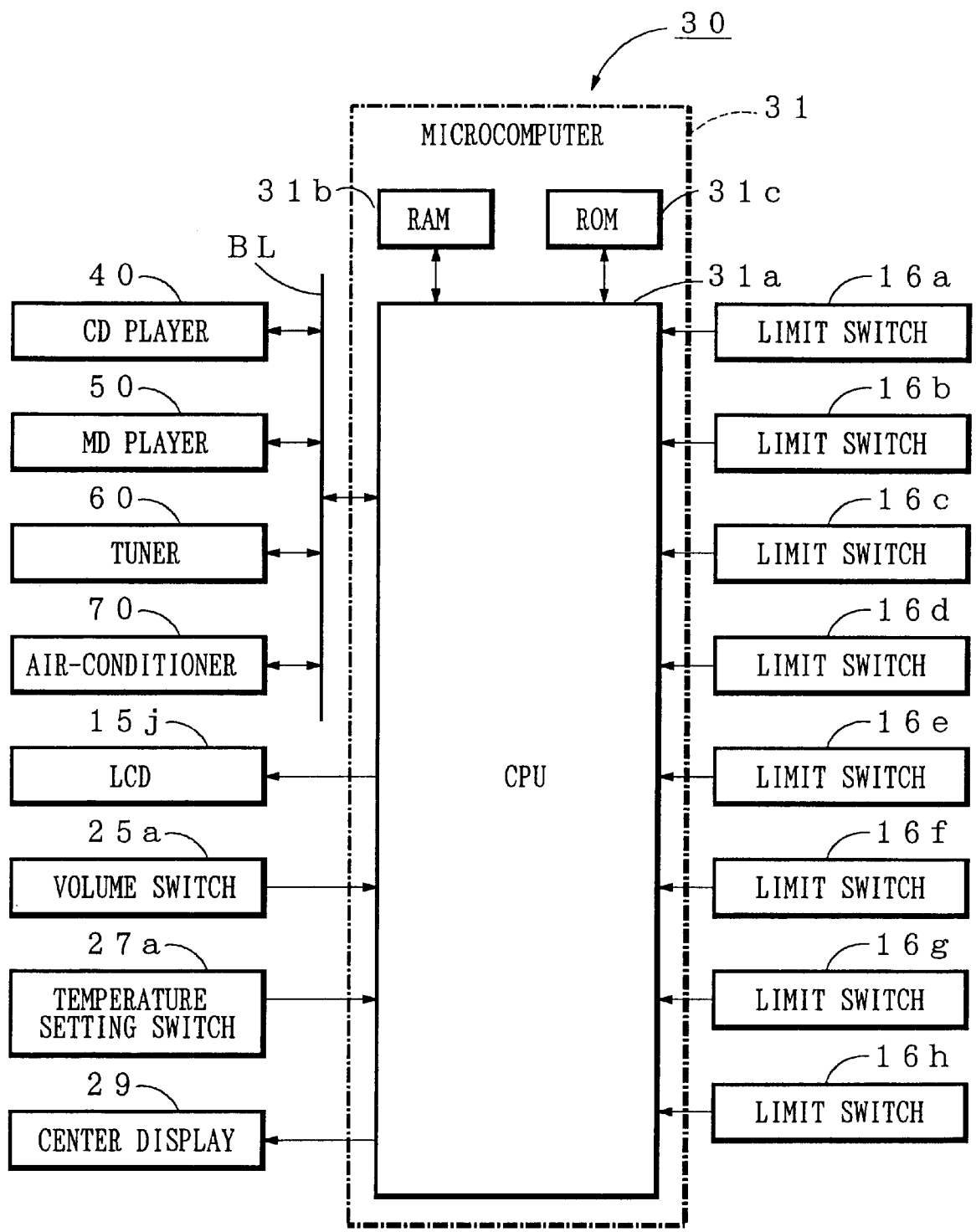
FIG. 25 is a block diagram showing the electric schematic configuration of the switch device of FIG. 4.

As seen from FIG. 25, the switch device 30 includes a microcomputer 31 for controlling the display of the liquid crystal display 15j and center display 29 described above.

The microcomputer 31 includes a CPU 31a, RAM 31b and ROM 31c. The CPU 31a is connected to the CD player 40, MD player 50, tuner 60 and air conditioner 70 through the multiplex bus line BL. The CPU 31a is connected to limit switches 16a–16h, liquid display 15j, volume switch 25a an output of which is changed by the rotation of the volume knob 25, a temperature setting switch 27a an output of which is changed by the rotation of the temperature setting knob 27 and center display 29.

The RAM 31b includes a data area and a work area used for various kinds of processing. The work area includes sub-areas used various kinds of flags and a buffer. The ROM 31c stores a control program for performing various kinds of processing operations.

Now referring to flowcharts of FIGS. 26–38, an explanation will be given of the processing carried out by the CPU 31a in accordance with the control program stored in the ROM 31c.

By turning on an accessory switch (not shown), the microcomputer 31 is booted up by power supply from a battery (not shown) loaded in the vehicle. Then, a program starts. As seen from FIG. 26, first, the CPU 31a makes initial setting inclusive of setting various kinds of flags at "0" (Step S1).

Recognition processing is made for collecting appliance/function information from the CD player 40, MD player 50, tuner 60 and air conditioner 70 by the communication from and to their nodes constituting a multiplex communication system though the multiplex bus line BL (Step S3). The contents of each mode screen to be displayed on the liquid crystal display 15j is determined on the basis of the recognized appliance/function information (step S5).

Default processing is made for displaying the default mode display screen on the liquid crystal display 15j and for displaying the default mode guiding screen on the center display 29 (step S7). Whether any one of the operation buttons 15a–15h has been pressed is verified on the basis of the outputs from the limit switches 16a–16h (step S9).

If NO, the processing proceeds to step S33. If YES, if or not the operation button 15a allotted to the AM radio mode in the default mode display has been pressed is verified (step S11). If YES, the flag F1 of the AM flag area in the RAM 31 is set at "1", whereas the flags F3, F5 and F7 in the FM, CD and MD flag areas in the RAM 31 are set at "0", respectively (step S13). The processing will proceed to processing A (step S49 described later).

In step S11, if NO, whether or not the operation button 15b allotted to the FM radio mode has been pressed is verified (step S15).

In step S15, if YES, the FM flag F3 is set at "1", whereas the AM flag F1, CD flag F5 and MD flag F7 are set at "0" (step S17). The processing will proceed to processing B (step S83). In step S15, if NO, whether or not the operation button 15c allotted to the CD mode has been pressed is verified (step S19).

In step S19, if YES, the CD flag F5 is set at "1", whereas the AM flag F1, FM flag F3 and MD flag F7 are set at "0" (step S21). The pressing will further proceed to processing C (step S117 described later). In step S19, if NO, whether or not the operation button 15d allotted to the MD mode has been pressed is verified (step S23).

In step S23, if YES, the MD flag F7 is set at "1", whereas the AM flag F1, FM flag F3 and CD flag F5 are set at "0" (step S25). The processing will proceed to processing E (step S159 described later). In step S23, if NO, the processing proceeds to processing D shown in FIG. 7. Namely, in step S27, whether or not the operation button 15e allotted to the ON/OFF switching of the defogger on the default mode screen has been pressed is verified (step S27).

In step S27, if NO, the processing proceeds to step S31 described later. In step S27, if YES, the display at the operation button 15e in the default mode on the liquid display 15j is updated from a crosshatched inverted display to an on-white normal display, and vice versa (step S28).

In addition, the default mode guiding screen on the center display 29 is changed, for a prescribed time, into only the emphatic display of the symbol mark of the defogger and the character of its ON/OFF state (step S29). After the prescribed time elapsed, the display of the center display is returned to the original default mode guiding screen (step S30). The processing returns to processing F (step S9).

In step S27, if NO, whether or not the operation button 15f allotted to the ON/OFF switching of the hot wire rear window has been pressed is verified (step S31). In step S31, if NO, the processing proceeds to step S35 described later.

In step S31, if YES, the display at the operation button 15f in the default mode on the liquid display 15j is updated from a crosshatched inverted display to an on-white normal display, and vice versa (step S32).

In addition, the default mode guiding screen on the center display 29 is changed, for a prescribed time, into only the emphatic display of the symbol mark of the hot wire rear window and the character of its ON/OFF state (step S33). After the prescribed time elapsed, the display of the center display is returned to the original default mode guiding screen (step S34). The processing returns to processing F (step S9).

In step S31, if NO, whether or not the operation button 15g allotted to the selection of the air conditioner 70 has been pressed is verified (step S35). In step S35, if YES, the processing proceeds to step S213 described later.

In step S35, if NO, the display at the operation button 15h in the default mode on the liquid display 15j is updated from a crosshatched inverted display to an on-white normal display, and vice versa (step S36).

In addition, the default mode guiding screen on the center display 29 is changed, for a prescribed time, into only the emphatic display of the symbol mark of the traffic information and the character of its ON/OFF state (step S37). After the prescribed time elapsed, the display of the center display is returned to the original default mode guiding screen (step S38). The processing returns to processing F (step S9).

Figure 26:
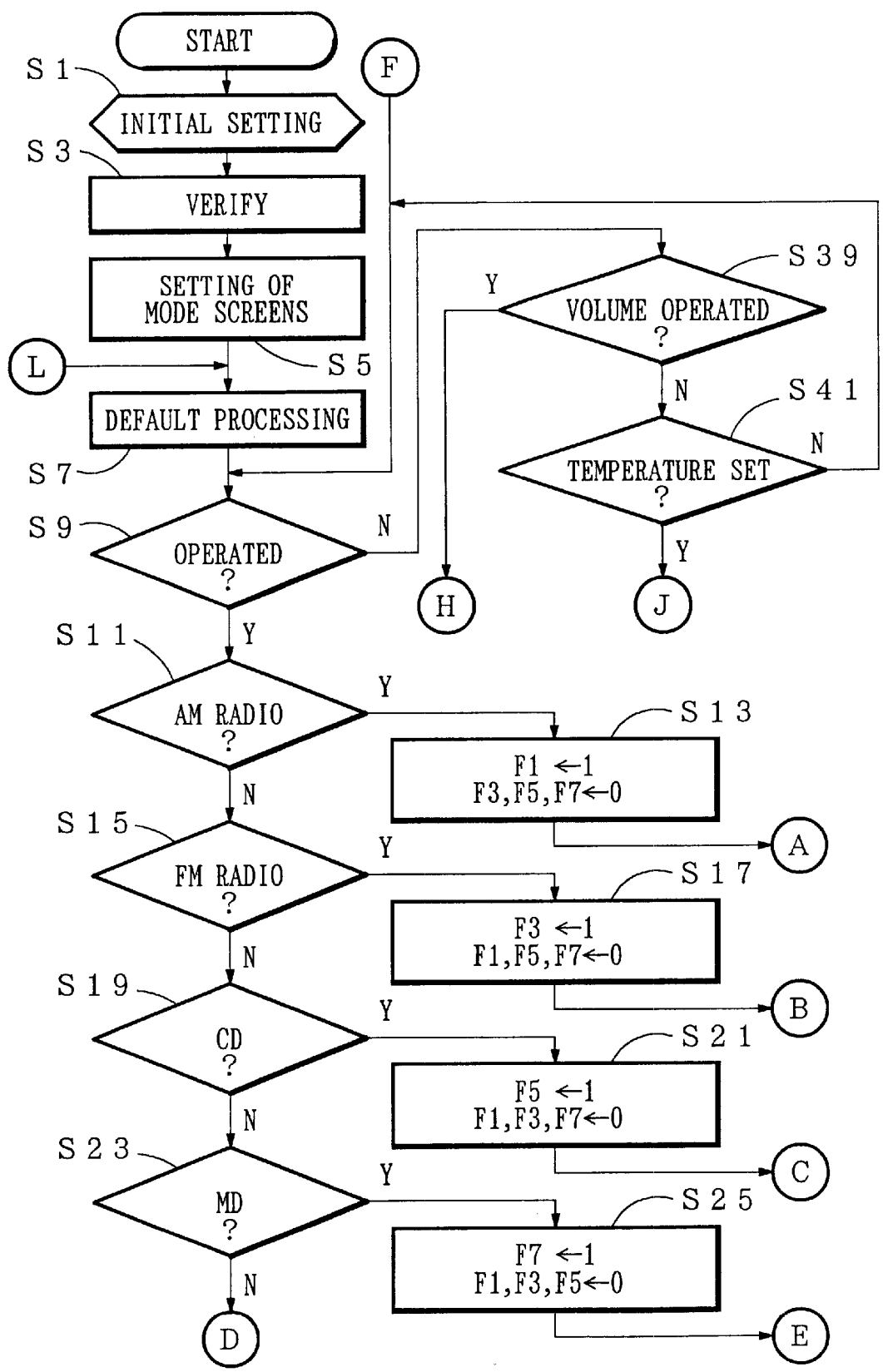

In step S9, if NO (no operation button has been pressed), as seen from FIG. 26, whether or not the volume knob 25 has been operated (rotated) is verified on the basis of the output from the volume switch 25a (step S39). In step S39, if YES, the processing proceeds to processing H (step S43). If NO, whether the temperature setting knob 27 has been operated (rotated) is verified on the basis of the output from the temperature setting switch 27a (step S41).

In step S41, if YES, the processing proceeds to step S205. If NO, the processing returns to step S9.

Figure 28:
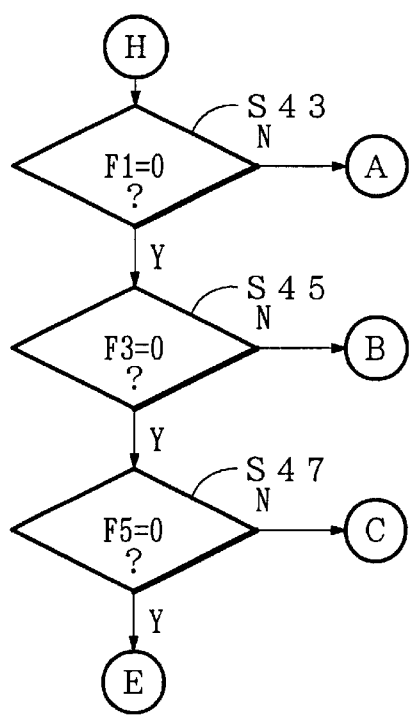

As seen from FIG. 28, in step S43, whether or not the AM flag F1 is "0" is verified. If NO, the processing proceeds to processing A (step S49 in FIG. 29). If YES, whether or not the FM flag F3 is "0" is verified (step S45).

Figure 30:
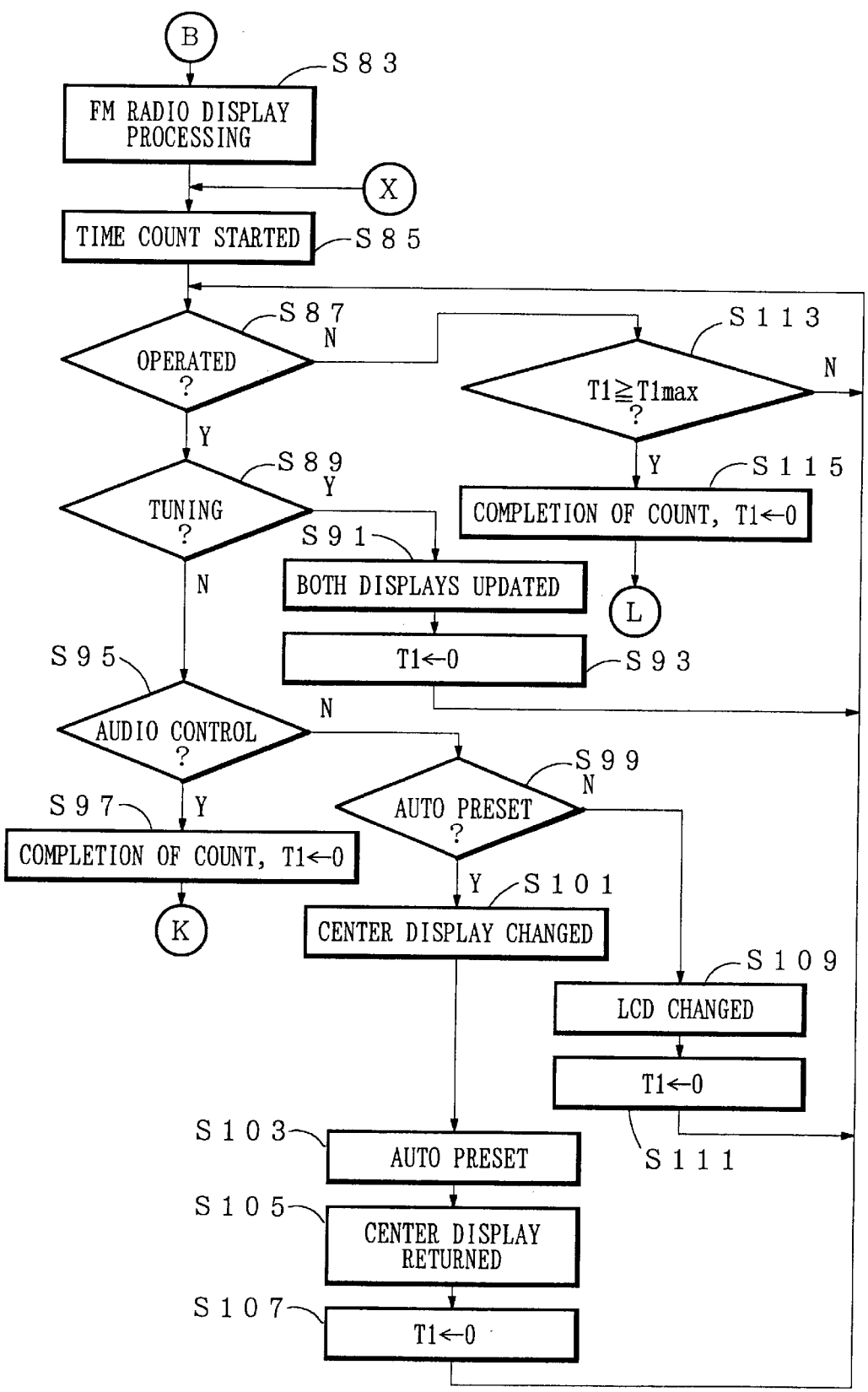

In step S45, if NO, the processing proceeds to processing B (step S83 in FIG. 30). If YES, whether or not the CD flag F5 is "0" is verified (step S47). In step S47, if NO, the processing proceeds to processing c (step S117 in FIG. 31). If YES, the processing proceeds to processing E (step S159 in FIG. 33).

As seen from FIG. 29, in step S49 (F1=1 in steps S13 and S43), AM radio display processing will be made. Namely, the AM radio mode screen is displayed on the liquid crystal display 15j and the AM radio mode guiding screen is displayed on the center display 29.

In step S51, time counting is started in the second level display timer area in RAM 31. Subsequently, in step S53, whether or not each of the operation buttons 15a–15h has been pressed is verified on the basis of the outputs from the limiter switches 16a–16h.

In step S53, if NO, the processing proceeds to S79. If YES, whether or not any of the operation buttons 15a–15d for allotted for tuning preset broadcasting stations (FIG. 5) has been pressed is verified (step S55). In step S55, if NO, the processing proceeds to step S61 described later.

In step S55, if YES, the AM radio mode guiding screen center display 29 (FIG. 14) is updated according to the pressed one of the operation buttons 15a–15d. The AM radio mode screen on the liquid crystal display 15*j* is also updated so that only the pressed one of the operation buttons 15*a*–15*d* is viewed as a crosshatched inverted display and the remaining portions thereof are viewed as on-white normal display (step S57). Subsequently, the timer value T1 of the second level display timer is reset to zero (step S59). Therefore, the processing returns to step S53.

In step S61 (none of the operation buttons 15*a*–15*d* has been pressed in step S55), whether or not the operation button 15*e* allotted for audio control has been pressed is verified. If YES, the time counting by the above display timer is completed an the timer value T1 is reset to zero (step S63). The processing proceeds to processing (step S285 in FIG. 38).

In step S61, if NO, whether or not the operation button 15*f* allotted for the auto-presetting operation has been pressed is verified (step S65). In step S65, if NO, the processing proceeds to step S75.

In step S65, if YES, the AM radio mode guiding screen on the center display 29 is changed from the display of the broadcasting station being selected and its receiving frequency into AUTOPRSET (step S67). Subsequently, the auto-presetting is carried out (step S69). Thereafter, the display of the center display 29 is restored to the initial AM radio mode guiding screen (step S71). Further, the timer value T1 of the timer is reset to zero (step S73). The processing returns to step S53.

In step S75, the AM radio mode screen on the liquid crystal display 15*j* is changed in accordance with a change in the receiving frequency when the operation button 15*g* or 15*h* is pressed. Subsequently, the timer value T1 is reset to zero (step S77). The processing returns to step S53.

In step S79, whether or not the timer value T1 has reached a prescribed time-up value $T1_{MAX}$. If NO, the processing returns to step S53. If YES, the time-counting by the timer is completed, and the timer value T1 is reset to zero. Thereafter, the processing proceeds to processing L (step S7 in FIG. 26).

As seen from FIG. 30, in step S83 (F3=1 in steps S17 and S45), AM radio display processing will be made. Namely, the FM radio mode screen is displayed on the liquid crystal display 15*j* and the FM radio mode guiding screen is displayed on the center display 29.

In step S85, time counting is started in the second level display timer area in RAM 31. Subsequently, in step S87, whether or not any one of the operation buttons 15*a*–15*h* has been pressed is verified on the basis of the outputs from the limit switches 16*a*–16*h*.

In step S87, if NO, the processing proceeds to S113. If YES, whether or not any of the operation buttons 15*a*–15*d* for allotted for tuning preset broadcasting stations (FIG. 5) has been pressed is verified (step S89). In step S89, if NO, the processing proceeds to step S95 described later.

On the other hand, in step S87, if YES, the FM radio mode guiding screen center display 29 is updated according to the pressed one of the operation buttons 15*a*–15*d*. The FM radio mode screen on the liquid crystal display 15*j* is also updated so that only the pressed one of the operation buttons 15*a*–15*d* is viewed as an crosshatched inverted display and the remaining portions thereof are viewed as on-white normal display (step S91). Subsequently, the timer value T1 of the second level display timer is reset to zero (step S93). Thereafter, the processing returns to step S87.

In step S61 (none of the operation buttons 15*a*–15*d* has been pressed in step S89), whether or not the operation button 15*e* allotted for audio control has been pressed is verified. If YES, the time counting by the above display timer is completed an the timer value T1 is reset to zero (step S97). The processing proceeds to processing (step S285 in FIG. 38).

In step S95, if NO, whether or not the operation button 15*f* allotted for the auto-presetting operation has been pressed is verified (step S99). In step S99, if NO, the processing proceeds to step S105.

In step S99, if YES, the FM radio mode guiding screen on the center display 29 is changed from the display of the broadcasting station being selected and its receiving frequency into AUTOPRSET (step S101). Subsequently, the auto-presetting is carried out (step S103). Thereafter, the display of the center display 29 is restored to the initial FM radio mode guiding screen (step S105). Further, the timer value T1 of the timer is reset to zero (step S107). The processing returns to step S87.

In step S75, the FM radio mode screen on the liquid crystal display 15*j* is changed in accordance with a change in the receiving frequency when the operation button 15*g* or 15*h* is pressed. Subsequently, the timer value T1 is reset to zero (step S111). The processing returns to step S81.

In step S113, whether or not the timer value T1 has reached a prescribed time-up value $T_{MAX}$. If NO, the processing returns to step S87. If YES, the time-counting by the timer is completed, and the timer value T1 is reset to zero (step S115). Thereafter, the processing proceeds to processing L (step S7 in FIG. 26).

Figure 31:
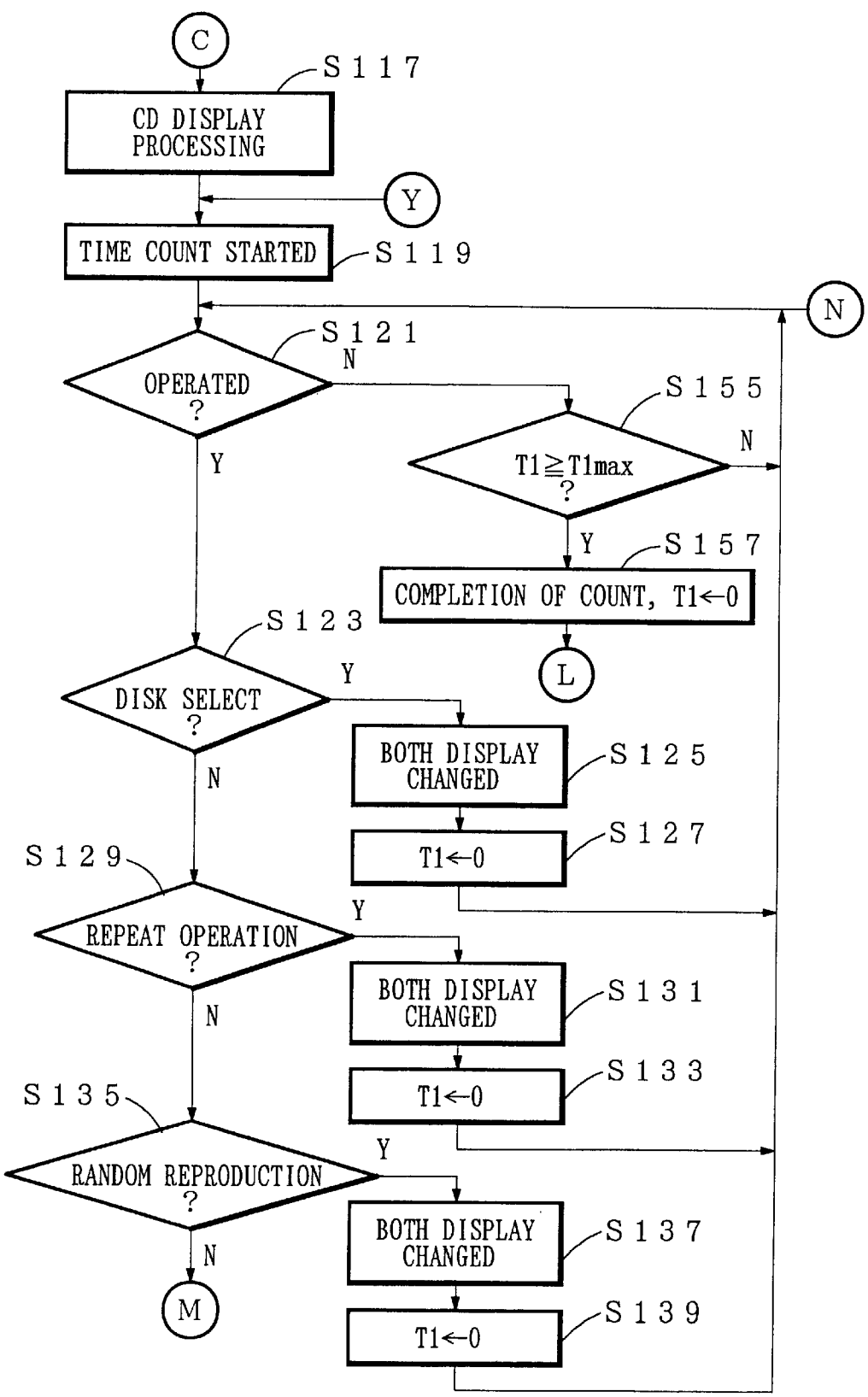

As seen from FIG. 31, in step S117 (F5=1 in steps S21 and S47), CD display processing will be made. Namely, the CD mode screen is displayed on the liquid crystal display 15*j* and the CD mode guiding screen is displayed on the center display 29.

In step S119, time counting is started in the second level display timer area in RAM 31*b*. Subsequently, in step S121, whether or not any one of the operation buttons 15*a*–15*h* has been pressed is verified on the basis of the outputs from the limit switches 16*a*–16*h*.

In step S121, if NO, the processing proceeds to S155. If YES, whether or not any one of the operation buttons 15*a*–15*h* for allotted for selection of a disk to be reproduced (FIG. 6) has been pressed is verified (step S123). In step S123, if NO, the processing proceeds to step S129 described later.

On the other hand, in step S123, if YES, the CD mode screen on the liquid crystal display 15*j* and the CD mode guiding screen on the center display 29 are updated according to changes in the disk number corresponding to the operated operation button 15*a* or 15*b*. Subsequently, the timer value T1 of the second level display timer is reset to zero (step S127). Therefore, the processing returns to step S121.

In step S123, if NO, whether or not the operation button 15*c* allotted for the ON/OFF switching of the repeat operation has been pressed is verified (step S129). If NO, the processing proceeds to step S135 described later.

On the other hand, in step S129, if YES, the CD mode guiding screen center display 29 is updated according to the ON/OFF switching of the repeat operation corresponding to the pressed operation button 15*c*. The CD mode screen on the liquid crystal display 15*j* is also updated so that the display at the operation button 15*c* is changed from a crosshatched inverted display to an on-white normal display, and vice versa(step S131). Subsequently, the timer value T1 of the second level display timer is reset to zero (step S133). Thereafter, the processing returns to step S121.

In step S129, if NO, whether or not the operation button 15*d* allotted for the ON/OFF switching of the random reproduction has been pressed is verified (step S135). In step S135, if NO, the processing proceeds to processing M (step S141 in FIG. 32).

On the other hand, in step S135, if YES, the CD mode guiding screen on the center display 29 is updated according to the ON/OFF switching of the random reproduction corresponding to the pressed operation button 15*d*. The CD mode screen on the liquid crystal display 15*j* is also updated so that the display at the operation button 15*d* is changed from a crosshatched inverted display to an on-white normal display (step S137). Subsequently, the timer value T1 of the second level display timer is reset to zero (step S139). Thereafter, the processing returns to step S121.

In step S141 (FIG. 32), whether or not the operation button 15*e* allotted for audio control has been pressed is verified. If YES, the timer value T1 of the second level display timer is reset to zero (step S143). Thereafter, the processing returns to processing K (step S285 in FIG. 38).

In step S141, if NO, whether or not the operation button 15*f* allotted for random scan reproduction has been pressed is verified (step S145). In step S145, if NO, the processing proceeds to processing S151.

On the other hand, in step S145, if YES, the CD mode guiding screen on the center display 29 is updated according to the ON/OFF switching of the random scan reproduction corresponding to the pressed operation button 15*f*. The CD mode screen on the liquid crystal display 15*j* is also updated so that the display at the operation button 15*f* is changed from a crosshatched inverted display to an on-white normal display, and vice versa (step S147). Subsequently, the timer value T1 of the second level display timer is reset to zero (step S149). Thereafter, the processing returns to step S121.

In step S145, if NO, the CD mode screen on the liquid crystal display 15*j* and the CD mode guiding screen on the center display 29 are updated according to changes in the track number corresponding to the operated operation button 15*g* or 15*h* (step S151). Subsequently, the timer value T1 of the second level display timer is reset to zero (step S153). Therefore, the processing returns to step S121.

In step S121, if NO, whether or not the timer value T1 has reached a prescribed time-up value $T1_{MAX}$ (step S155). In step S155, if NO, the processing returns to step S121. If YES, the time-counting by the timer is completed, and the timer value T1 is reset to zero. Thereafter, the processing proceeds to processing L (step S7 in FIG. 26).

As seen from FIG. 33, in step S159 (F7=1 in step S25 and F5=0 in step S47), MD display processing will be made. Namely, the MD mode screen is displayed on the liquid crystal display 15*j* and the MD mode guiding screen is displayed on the center display 29.

In step S161, time counting is started in the second level display timer area in RAM 31*b*. Subsequently, in step S163, whether or not any one of the operation buttons 15*a*–15*h* has been pressed is verified on the basis of the outputs from the limit switches 16*a*–16*h*.

In step S163, if NO, the processing proceeds to S201. If YES, whether or not the operation button 15*a* for allotted for song data display (FIG. 7) has been pressed is verified (step S165). In step S165, if NO, the processing proceeds to step S175 described later.

On the other hand, in step S165, if YES, information of a disk tile or song name(s) recorded on an MD being. reproduced is taken in (step S167). Further, the MD mode guiding screen on the center display 29 is changed to the disk title and song name taken in from the MD player 50 for a prescribed time (step S169). After the prescribed time elapsed, the display of the center display is returned to the original default mode guiding screen (step S171). Subsequently, the timer value T1 of the second level display timer is reset to zero (step S173). Therefore, the processing returns to step S121.

In step S165, if NO, whether or not the operation button 15*c* allotted for the ON/OFF switching of the repeat operation has been pressed is verified (step S175). If NO, the processing proceeds to step S181 described later.

On the other hand, in step S175, if YES, the MD mode guiding screen center display 29 is updated according to the ON/OFF switching of the repeat operation corresponding to the pressed operation button 15*c*. The MD mode screen on the liquid crystal display 15*j* is also updated so that the display at the operation button 15*c* is changed from a crosshatched inverted display to an on-white normal display, and vice versa (step S177). Subsequently, the timer value T1 of the second level display timer is reset to zero (step S179). Thereafter, the processing returns to step S163.

In step S175, if NO, whether or not the operation button 15*d* allotted for the ON/OFF switching of the random reproduction has been pressed is verified (step S181). In step S181, if NO, the processing proceeds to processing P(step S187 in FIG. 34).

On the other hand, in step S181, if YES, the MD mode guiding screen center display 29 is updated according to the ON/OFF switching of the random reproduction corresponding to the pressed operation button 15*d*. The MD mode screen on the liquid crystal display 15*j* is also updated so that the display at the operation button 15*d* is changed from a crosshatched inverted display to an on-white normal display, and vice versa (step S183). Subsequently, the timer value T1 of the second level display timer is reset to zero (step S185). Thereafter, the processing returns to step S163.

In step S187 (FIG. 34), whether or not the operation button 15*e* allotted for audio control has been pressed is verified. If YES, the timer value T1 of the second level display timer is reset to zero (step S189). Thereafter, the processing returns to processing K (step S285 in FIG. 38).

In step S187, if NO, whether or not the operation button 15*f* allotted for random scan reproduction has been pressed is verified (step S191). In step S191, if NO, the processing proceeds to processing S151.

On the other hand, in step S191, if YES, the MD mode guiding screen center display 29 is updated according to the ON/OFF switching of the random scan reproduction corresponding to the pressed operation button 15*f*. The CD mode screen on the liquid crystal display 15*j* is also updated so that the display at the operation button 15*f* is changed from a crosshatched inverted display to an on-white normal display, and vice versa (step S193). Subsequently, the timer value T1 of the second level display timer is reset to zero (step S195). Thereafter, the processing returns to step S163.

In step S191, if NO, the MD mode screen on the liquid crystal display 15*j* and the MD mode guiding screen on the center display 29 are updated according to changes in the track number corresponding to the operated operation button 15*g* or 15*h* (step S197). Subsequently, the timer value T1 of the second level display timer is reset to zero (step S199). Therefore, the processing returns to step S163.

In step S163, if NO, whether or not the timer value T1 has reached a prescribed time-up value $T1_{MAX}$ (step S201). In step S201, if NO, the processing returns to step S121. If YES, the time-counting by the timer is completed, and the timer value T1 is reset to zero. Thereafter, the processing proceeds to processing L (step S7 in FIG. 26).

When the temperature setting knob 27 is operated in step S41, as seen from FIG. 35, from step S205, an air conditioner mode display processing will be made. Namely, the air conditioner mode screen is displayed on the liquid crystal display 15j (step S205). The set value of a changed target temperature is acquired on the basis of the output from the temperature setting switch 27a (step S207). The default mode guiding screen on the center display 29 keeps the emphatic display of only the setting value of the target value thus acquired for a prescribed time (step S209). After the prescribed time elapsed, the display of center display 29 is changed into the air conditioner guiding screen (step S211). The processing proceeds to step S207 described below.

In step S35, if YES (operation button 15g allotted for selection of the air conditioner 70 is pressed), in step S213, the air conditioner mode display processing is made. Namely, the air conditioner mode screen is displayed on the liquid crystal display 15j and the airconditioner mode guiding screen is displayed on the center display 29. The processing proceeds to step S215 directly.

In step S211, time-counting is started by the second level timer. Further, in step S217, whether any of the operation buttons 15a–15h has been pressed (FIG. 9) is verified (step S217).

Figure 37:
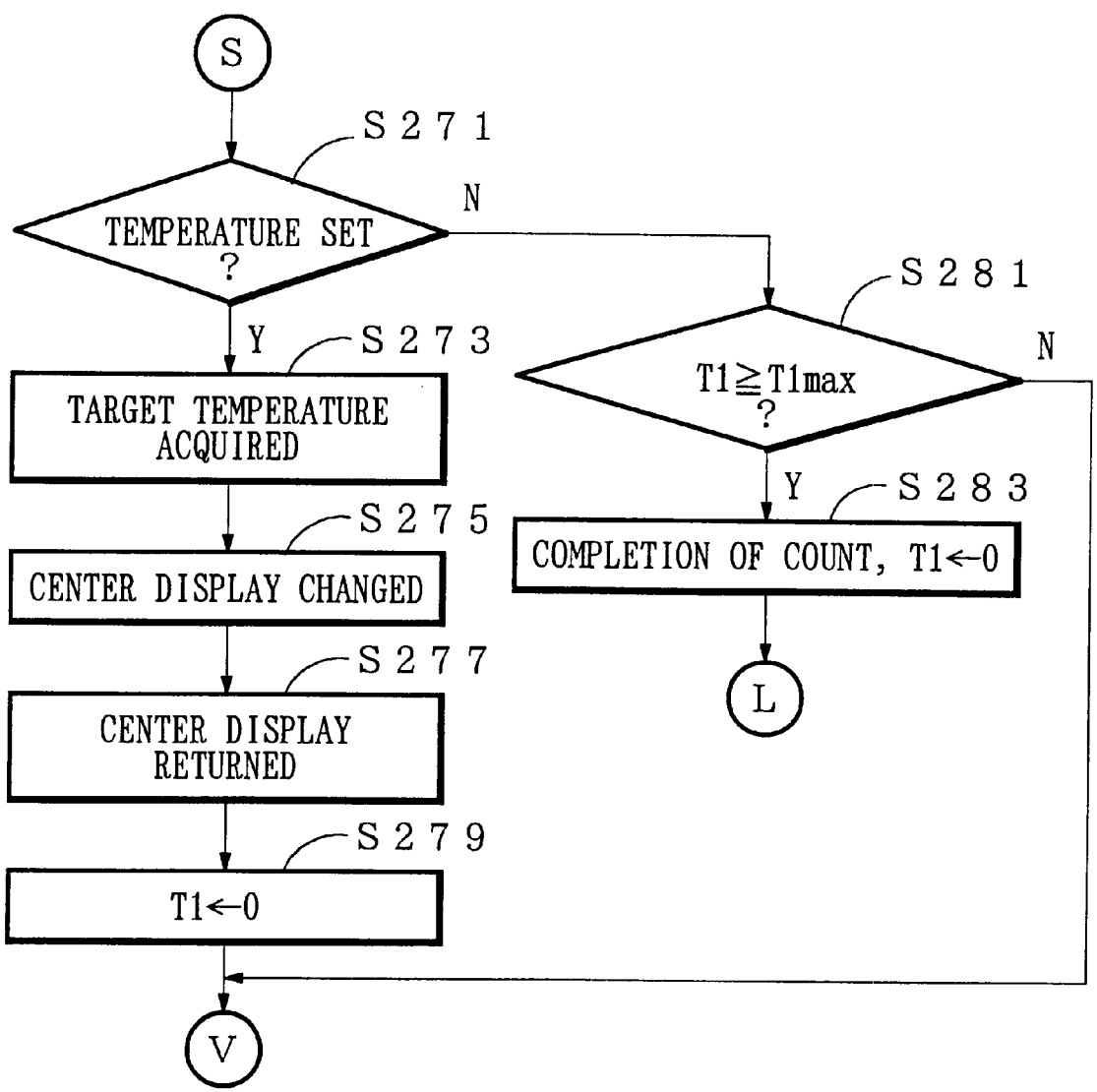

In step S217, if NO (none of the operation buttons 15a–15h has been pressed), the processing proceeds to processing S (step 271 in FIG. 37). If YES, whether or not anyone of the operation button 15a for setting OFF of the air conditioner, operation button 15b for setting manual ON thereof and operation button 15c for setting automatic ON thereof has been pressed is verified (step S219). In step S219, if NO, the processing proceeds step S225.

In step S219, if YES, the air conditioner mode guiding screen on the center display 29 is updated according to the ON/OFF switching of the air conditioner 70 corresponding to the pressed one of the operation buttons 15a–15c. The air conditioner mode screen on the liquid crystal display 15j is also updated so that the display at the pressed one of the operation buttons 15a–15c is changed from a crosshatched inverted display to an on-white normal display, and vice versa(step S221). Subsequently, the timer value T1 of the second level display timer is reset to zero (step S223). Thereafter, the processing returns to step S217.

In S225, whether or not the operation button 15d for switching of the air circulating mode has been pressed is verified. If NO, the processing proceeds to processing T (step S233 in FIG. 36).

In S225, if YES, the air conditioner mode screen on the liquid crystal display 15j is alternately updated between the symbol marks of "circulating" and "ventilating" (FIG. 10) (step S227).

In addition, the air conditioner mode guiding screen on the center display 29 is changed, for a prescribed time, into only the emphatic display of the symbol mark of either of "circulating" and "outside air" after changed (step S229). After the prescribed time elapsed, the display of the center display is returned to the original air conditioner mode guiding screen (step S230). Further, the timer value T1 of the second level timer is reset to zero (step S231). Thereafter, the processing returns to step S217.

Figure 36:
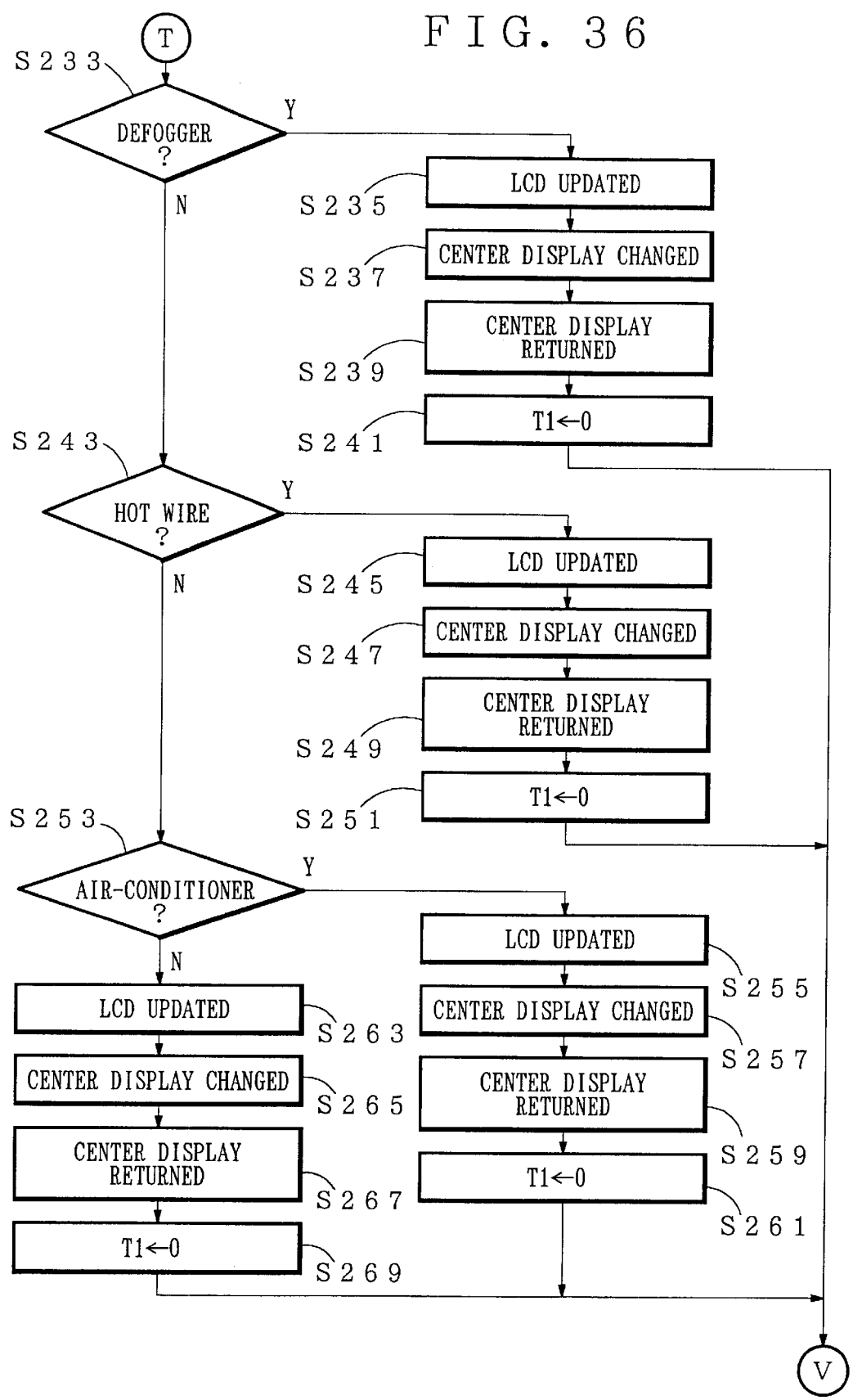

In step 233 in FIG. 36 coming from "N" in step S225, whether or not the operation button 15e (FIG. 9) for switching the defogger has been pressed is verified. In step S233, if NO, the processing proceeds to step S243 described later.

In step S233, if YES, the air conditioner mode screen on the liquid display 15j is updated from a crosshatched inverted display to an on-white normal display, and vice versa in the display at operation button 15e (step S235).

In addition, the air conditioner mode guiding screen on the center display 29 is changed, for a prescribed time, into only the emphatic display of the symbol mark of the defogger and the character of its ON/OFF state after changed (step S237). After the prescribed time elapsed, the display of the center display 29 is returned to the original air conditioner mode guiding screen (step S239). The timer value T1 of the second level timer is reset at zero (step S241). Thereafter, the processing returns to step S217.

In step S243, whether or not the operation button 15f (FIG. 9) for switching the ON/OFF of the hot wire rear window heater has been pressed is verified. If NO, the processing proceeds to step S253.

In step S243, if YES, the air conditioner mode screen on the liquid display 15j is updated from a crosshatched inverted display to an on-white normal display, and vice versa in the display at operation button 15f (step S245).

In addition, the air conditioner mode guiding screen on the center display 29 is changed, for a prescribed time, into only the emphatic display of the symbol mark of the defogger and the character of its ON/OFF state after changed (step S247). After the prescribed time elapsed, the display of the center display is returned to the original air conditioner mode guiding screen (step S239). The timer value T1 of the second level timer is reset at zero (step S251). Thereafter, the processing returns to step S217 (FIG. 35).

In step S253, whether or not the operation button 15g for changing the wind drafting mode has been pressed is verified. If NO, the processing proceeds to step S263.

In step S253, if YES, the air conditioner mode screen on the liquid display 15j is updated from a crosshatched inverted display to an on-white normal display, and vice versa in the display at operation button 15g (step S255).

In addition, the air conditioner mode guiding screen on the center display 29 is changed, for a prescribed time, into only the emphatic display of the symbol mark of the defogger and the character of its ON/OFF state after changed (step S257). After the prescribed time elapsed, the display of the center display is returned to the original air conditioner mode guiding screen (step S259). The timer value T1 of the second level timer is reset at zero (step S261). Thereafter, the processing returns to step S217 (FIG. 35).

In step S263, the air conditioner mode screen on the liquid display 15j is updated according to the drafting level changed by the operation button 15h.

In addition, the air conditioner mode guiding screen on the center display 29 is changed, for a prescribed time, into only the emphatic display of the symbol mark of the drafting level (step S265). After the prescribed time elapsed, the display of the center display 29 is returned to the original air conditioner mode guiding screen (step S267). The timer value T1 of the second level timer is reset at zero (step S269). Thereafter, the processing returns to step S217 (FIG. 35).

In step 271 in FIG. 37 coming from "N" in step S217 in FIG. 35 (none of the operation buttons 15a–15h in FIG. 9 has been pressed), whether or not the temperature setting knob 27 has been rotated on the basis of the temperature setting switch 27a is verified. If No, the processing proceeds to step S281.

In step S271, if YES, the set value of a changed target temperature is acquired on the basis of the output from the temperature setting switch 27a (step S273). The air conditioner mode guiding screen on the center display 29 keeps the emphatic display of only the setting value of the target value thus acquired for a prescribed time (step S275). After the prescribed time elapsed, the display of center display 29 is changed into the air conditioner guiding screen (step S277). The timer value T1 of the second level timer is reset at zero (step S279). The processing returns to step S217.

In step S271, if NO, whether or not the timer value T1 has reached a prescribed time-up value $T1_{MAX}$ (step S281). In step S281, if NO, the processing returns to step S121. If YES, the time-counting by the timer is completed, and the timer value T1 is reset to zero. Thereafter, the processing proceeds to processing L (step S7 in FIG. 26).

In step S285 coming from step S63 (FIG. 29), step S97 (FIG. 30), step S143 (FIG. 32) and step S189 (FIG. 34), the audio control mode screen on the liquid crystal display 15j is changed into the audio control mode screen. Subsequently, the time counting is started in the third level display timer area in RAM 31b (step S287). Further, whether or not any one of the operation buttons 15a–15h (FIG. 9) have been pressed is verified on the basis of the outputs from the limit switches 16a–16h (step S288).

In step S289, if NO (i.e. none of the operation buttons 15a–15h has been pressed), the processing proceeds to step S305. If YES, whether or not any one of the operation buttons 15a–15d allotted for adjusting the sound volume balance have been pressed is verified (step S291). If NO, the processing proceeds to step S299 described later.

On the other hand, in step S291, if YES, the display of the center display 29 is changed into the symbol marks of sound volume balance and its adjusting state according to the pressed one of the operation buttons 15a–15d (step S293). Upon completion of the operation of the operation button 15a–15d, the display of the center display 29 is returned to the original mode guiding screen (step S295). The timer value T3 of the second level timer is reset at zero (step S297). Thereafter, the processing returns to step S289 (FIG. 35).

In step S291, if NO, it is decided that any one of operation buttons 15e–15h allotted for adjusting the sound quality balance has been pressed, and until the operation of the pressed operation button is completed, the display of the center display 29 is changed into the symbol marks of sound quality balance and its adjusting state according to the pressed one of the operation buttons 15e–15h (step S299). Upon completion of the operation of the pressed operation button 15e–15h, the display of the center display 29 is returned to the original mode guiding screen (step S301). The timer value T3 of the second level timer is reset at zero (step S303). Thereafter, the processing returns to step S289 (FIG. 35).

In step S288, if NO (i.e. none of the operation buttons 15a–15h has been pressed), whether or not the timer value T3 has reached a prescribed time-up value $T3_{MAX}$ (step S305). In step S305, if NO, the processing returns to step S289. If YES, the time-counting by the timer is completed, and the timer value T3 is reset to zero (step S307). Thereafter, whether or not the AM flag F1 is "0" is verified (step S309).

In step S309, if NO (i.e. F1=1), the display of the liquid crystal display 15j is changed into the AM radio mode screen (step S311). The processing returns to step S51 (FIG. 29). In step S309, if YES, whether or not the FM flag F3 is "0" is verified (step S313).

In step S313, if NO (i.e. F3=1), the display of the liquid crystal display 15j is changed into the FM radio mode (step S315). The processing returns to step S85 (FIG. 30). In step S313, if YES, whether the CD flag F5 is "0" is verified (step S317).

In step S317, if NO (i.e. F5=1), the display on the liquid crystal display 15j is changed into the CD mode screen (step S319). The processing returns to step S119. If YES (i.e. F 5=0, F7=1), the display on the liquid crystal display 15j is changed into the MD mode screen (step S321) The processing returns to step S161 (FIG. 33).

As understood from the description, step S7 in FIG. 26 can be referred to as first level display executing means 31A in claims. Step S49 in FIG. 29, step S83 in FIG. 30, step S117 in FIG. 31, step 159 in FIG. 33, step S205 in FIG. 35, step S285 in FIG. 38 can be referred to as the second level display executing means 31C.

Figure 27:
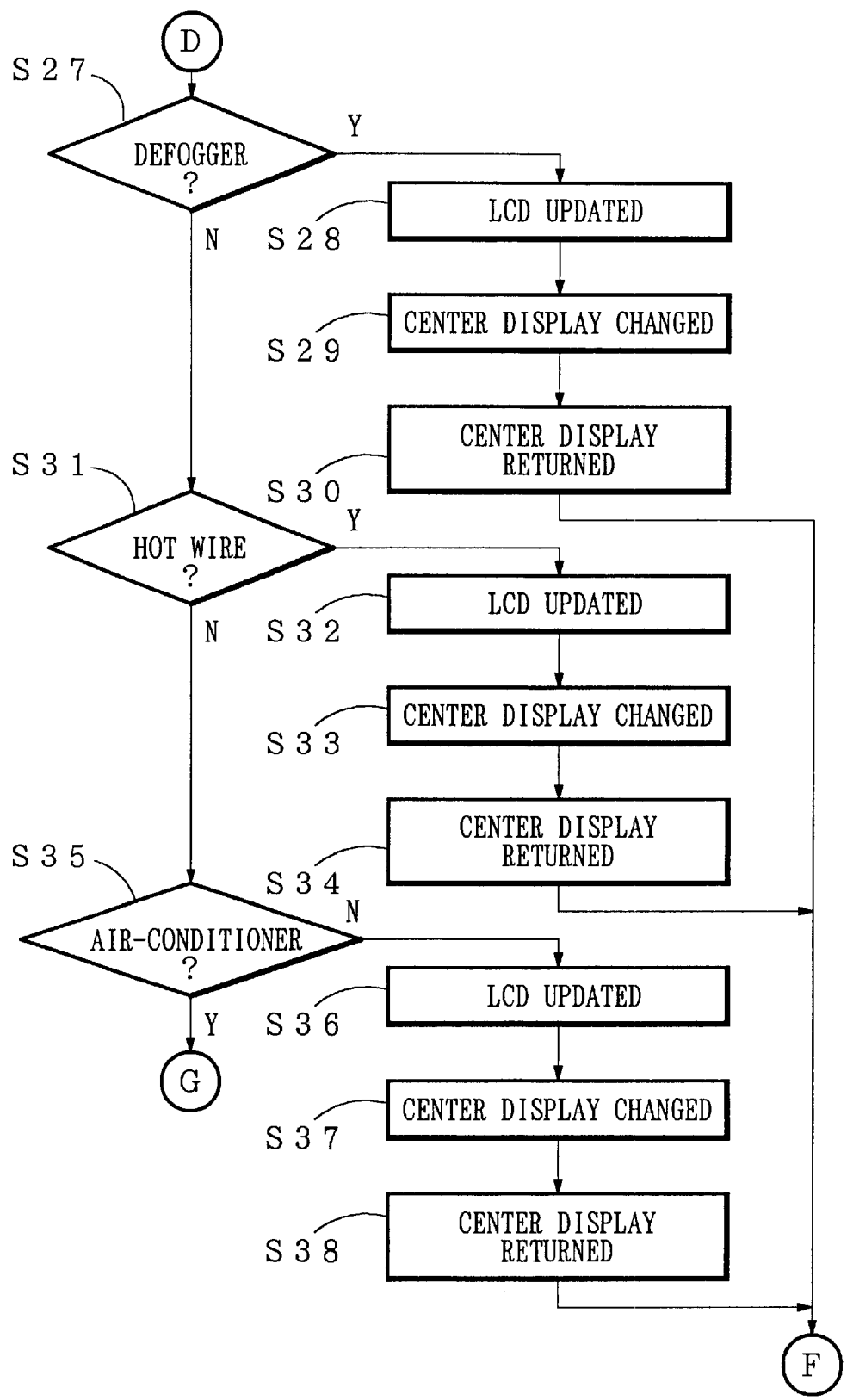
Figure 29:
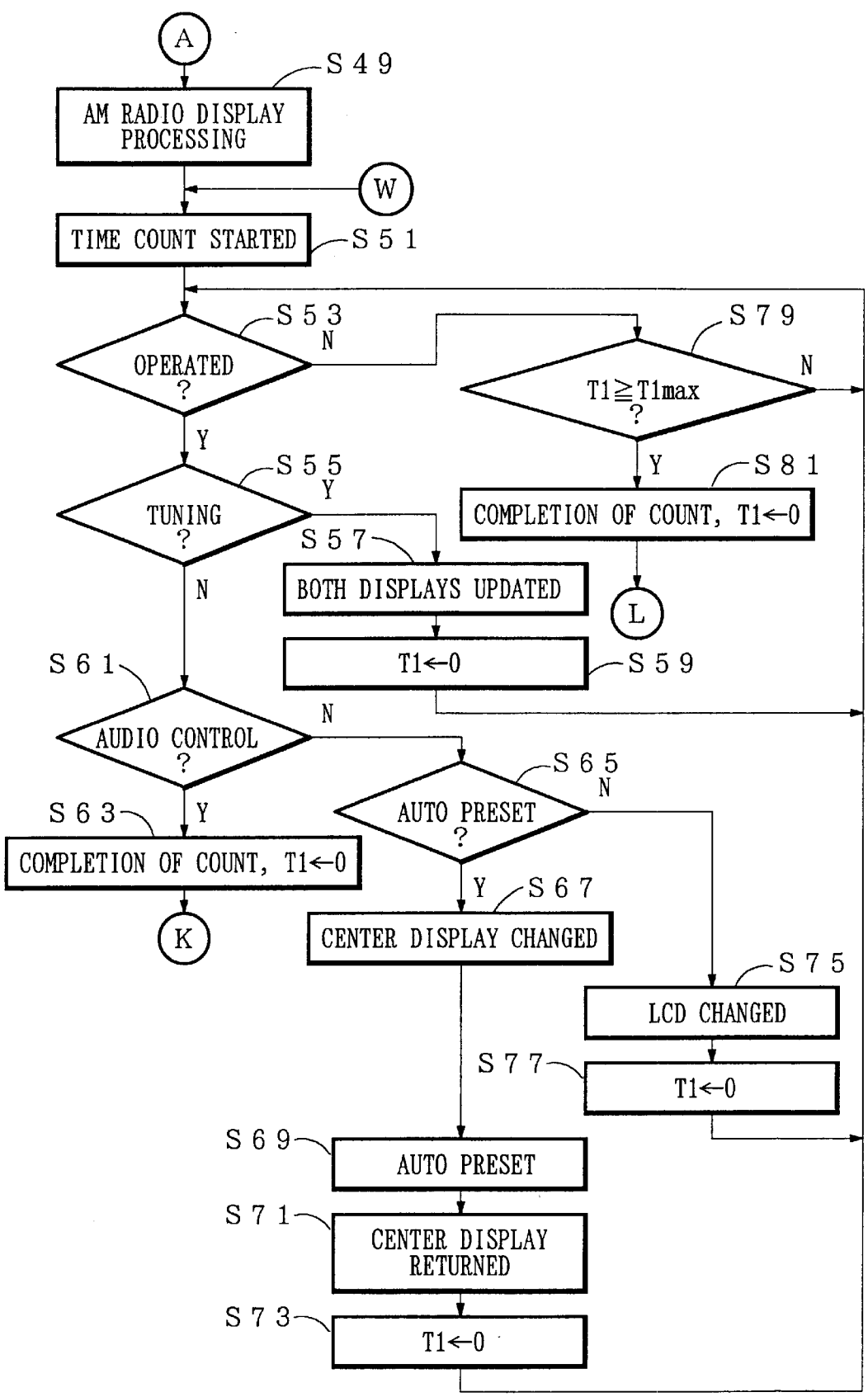
Figure 32:
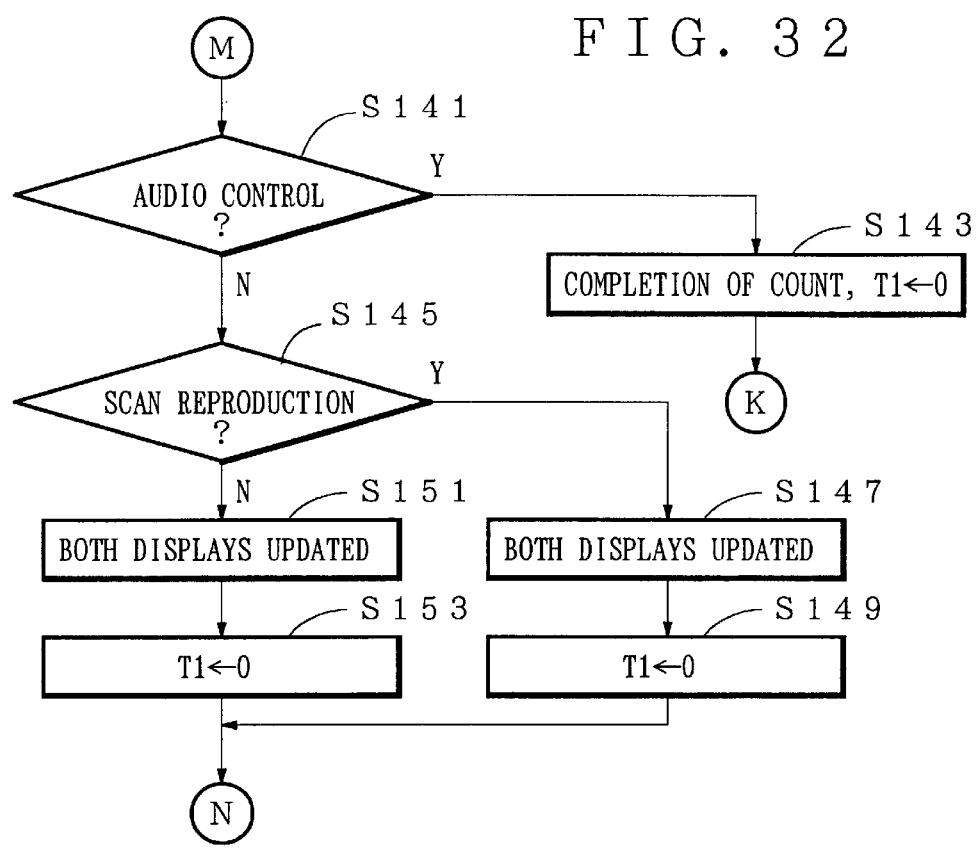
Figure 34:
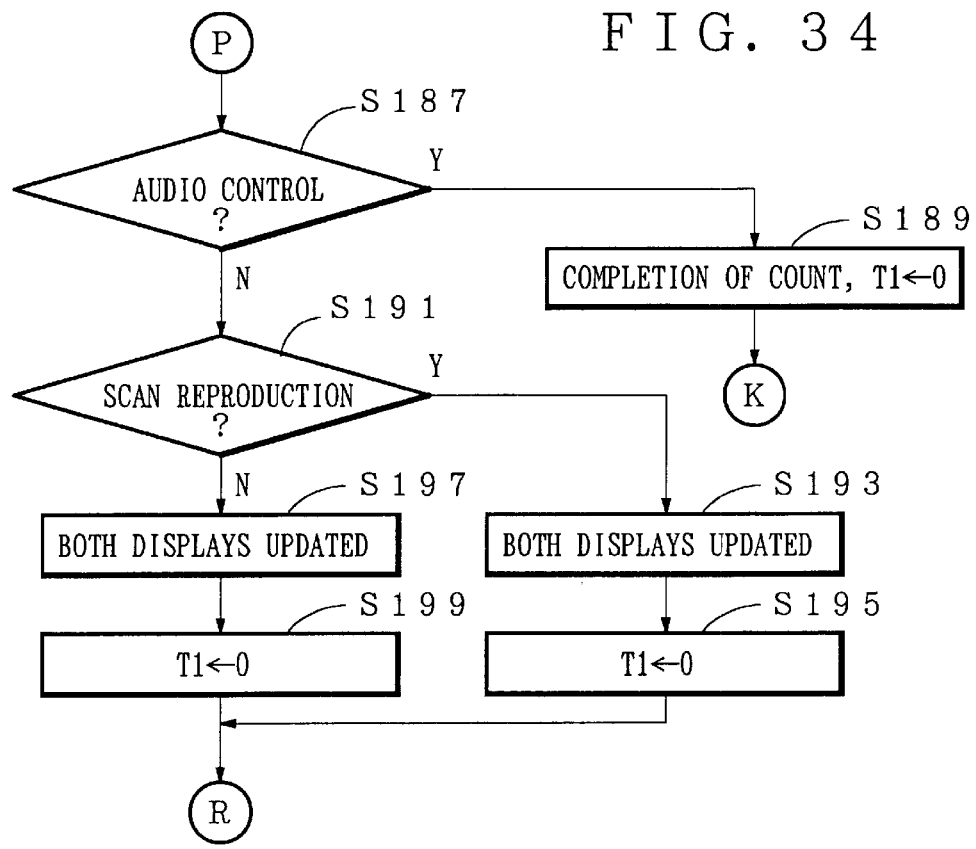

Steps S11, S15, S19 and S23 in FIG. 26, step S35 in FIG. 27, step S61 in FIG. 29, step S95 in FIG. 30, step S141 in FIG. 32, step S187 in FIG. 34 can be referred to as display image specifying means 31B.

Step S3 in FIG. 26 can be referred to as appliance image setting means 31D and specific-appliance function image setting means 31E in claims. Step S9 in FIG. 26, step S53 in FIG. 29, step S87 in FIG. 30, step S121 in FIG. 31, step S161 in FIG. 33, step S217 in FIG. 25 and step S289 in FIG. 38 as well as the limit switches 16a–16h can be generally referred to as operation button operation detecting means B.

Steps S39 and S41 in FIG. 26 and step 271 in FIG. 36 as well as the volume switch 25a or temperature setting switch 27a can be generally referred to as a specific-operation-button operation detecting means C.

The CD player 40, MD player 50, tuner 60 and air conditioner 70 can be generally referred to as an object appliance A. The operation buttons 15a–15h are referred to as operation buttons α1–αn. The volume knob 25 and temperature setting knob 27 correspond to a specific operation button β.

The default mode screen corresponds to an initial level display image. The AM radio mode screen, FM radio mode screen, CD mode screen, MD mode screen, audio control mode and air conditioner mode screen corresponds to second level display image. The liquid crystal display 15j corresponds to display means.

The characters of "AM", "FM", "CD", and "MD" and symbol marks indicative of the air conditioner, etc. can be referred to as an object appliance.

The symbol marks indicative of the defogger, hot wire rear window, receiving frequency DOWN, receiving frequency UP, selected disk number DOWN, selected disk number UP, reproduced track UP, and reproduced track DOWN and characters indicative of the functions of "AUDO CONT." "AUTO PRESET", "RTP", "RND", "audio control" and "SCAN" can be referred to as a function of a specific appliance, respectively.

The symbol marks of ▲ and ▼ corresponds to a symbol predictive of the presence of the second level screen.

An explanation will be given of the operation of the multi-function switch 30 according to the first embodiment.

When the accessory switch of a motor vehicle is turned on, the default mode screen is displayed on the liquid crystal display 15j. As a result, the multi-switch section 15 falls into a default mode displayed state where the characters and symbol marks indicative of objects to be selected, such as "AM", "FM", "CD", "MD" defogger, hot wire rear window, air conditioner and traffic information are viewed at the operation buttons 15a–15h as shown in FIG. 4.

In this default mode displayed condition, the symbol marks of ▲ or ▼ as well as the characters of "AM", "FM", "CD","MD" and symbol indicative of the air conditioner are viewed at the operation buttons 15a–15d and 15g. Therefore, when the function of "AM", "FM", "CD", "MD" or the air conditioner is selected, the next level display is made.

In the default mode display state, the center display 29 on the dash board 1 displays the default mode guiding screen as shown in FIG. 13.

In the default mode display state of the multi-switch section 15, when the operation button 15a is pressed, the display of the liquid crystal display 15j is changed from the default mode screen to the AM mode screen. As result, the multi-switch section 15 falls into the AM radio mode display state where the names of the AM broadcasting stations previously set, "AUDIO CONT.", "AUDIO PRESET", ∧ indicative of the increase in the receiving frequency and ∨ indicative of the decrease in the receiving frequency are viewed at the operation buttons 15a–15h as shown in FIG. 5.

When the multi-switch section 15 is changed from the default mode display state into the AM radio mode display state, correspondingly, the display of the center display 29 is changed from the default mode guiding screen into the AM radio mode guiding screen as shown in FIG. 14.

In the default mode display state of the multi-switch section 15, when the operation button 15a is pressed, the display of the liquid crystal display 15j is changed from the default mode screen to the FM mode screen. As result, the multi-switch section 15 falls into the FM radio mode display state where the names of the FM broadcasting stations previously set, "AUDIO CONT.", "AUDIO PRESET", ∧ indicative of the increase in the receiving frequency and ∧ increase of the decrease in the receiving frequency are viewed at the operation buttons 15a–15h like the AM radio mode display state.

When the multi-switch section 15 is changed from the default mode display state into the FM radio mode display state, correspondingly, the display of the center display 29 is changed from the default mode guiding screen into the FM radio mode guiding screen as shown in FIG. 14.

In the default mode display state of the multi-switch section 15, when the operation button 15c is pressed, the display of the liquid crystal display 15j is changed from the default mode screen into the CD mode screen. As a result, the multi-switch section 15 falls into the CD mode display state where symbols of "selected disk number DOWN", "selected disk number UP", "RTP", "RAND" "AUDIO CONT.", "SCAN", reproduced track UP", and "reproduced track DOWN" are viewed at the operation buttons 15a–15h.

When the multi-switch section 15 is changed from the default mode display state into the CD mode display state, correspondingly, the display of the center display 29 is changed from the default mode guiding screen into the CD mode guiding screen as shown in FIG. 16.

In the default mode display state of the multi-switch section 15, when the operation button 15c is pressed, the display of the liquid crystal display 15j is changed from the default mode screen into the MD mode screen. As a result, the multi-switch section 15 falls into the MD mode display state where symbols of "DISP", blank, "RTP", "RAND", "AUDIO CONT.", "SCAN", "reproduced track UP", and "reproduced track DOWN" are viewed at the operation buttons 15a–15h as shown in FIG. 7.

When the multi-switch section 15 is changed from the default mode display state into the MD mode display state, correspondingly, the display of the center display 29 is changed from the default mode guiding screen into the MD mode guiding screen as shown in FIG. 17.

In the default mode display state of the multi-switch section 15, when the operation button 15g is pressed, the display of the liquid crystal display 15j is changed from the default mode screen into the air conditioner mode screen. As a result, the multi-switch section 15 falls into the air conditioner mode display state where symbols of "OFF", "A/C", "AUTO", "air circulating mode ", defogger", "hot wire rear window", "wind drafting mode", and "drafting level" are viewed at the operation buttons 15a–15h as shown in FIG. 9.

When the multi-switch section 15 is changed from the default mode display state into the air conditioner mode display state, correspondingly, the display of the center display 29 is changed from the default mode guiding screen into the air conditioner mode guiding screen as shown in FIG. 19.

When the volume knob 25 is operated after the multi-switch section 15 has fallen into each of the AM radio, FM radio, CD or MD modes described above and before a prescribed time-out T1 time elapses, the sound volume in each mode can be adjusted according to the operated quantity of the volume knob 25.

When the temperature setting knob 27 is operated after the multi-switch section 15 has fallen in the air conditioner mode display state and before a prescribed time-out time T1 elapses; the value of the target temperature is adjusted according to the operated quantity of the temperature setting knob 27. Correspondingly, as shown in FIG. 20, the display of the center display 29 is changed from the default mode guiding screen into the emphatic display of only the changed target temperature. This emphatic display is maintained for a certain time. After the time has elapsed, the display of the center display 29 returns to the initial default mode guiding screen.

After the multi-switch section 15 has fallen in each of the display modes described above, before the prescribed time-out time T1 elapses, if each operation button, volume knob 25 or temperature setting knob 27 is not operated, the multi-switch section 15 automatically returns to the default mode display state. Correspondingly, the display of the center display 29 also automatically returns to the default mode guiding screen.

The above explanation is directed to where the operation button 15a–15d or 15g equipped with a viewed symbol ▲ is pressed in the default mode display state of the multi-switch section 15. The operation when the operation button 15e, 15h or 15h with no viewed symbol is pressed will be explained below.

When the operation button 15e with the symbol of the defogger viewed is pressed in the default mode display state of the multi-switch section 15, the display of the liquid crystal display 15j remains the default mode screen. However, the state viewed at the operation button 15e is changed according to its ON/OFF from a crosshatched inverted display (ON) to an on-white normal display (OFF) and vice versa.

Correspondingly, the display of the center display 29 is changed from the default mode guiding screen into the emphatic display of only the symbol of the defogger and its ON/OFF state after changed, as shown in FIG. 23. This display state is maintained for a prescribed time and returns to the initial default mode guiding screen.

When the operation button 15*f* with the symbol of the hot wire rear window viewed is pressed in the default mode display state of the multi-switch section 15, the display of the liquid crystal display 15*j* remains the default mode screen. However, the state viewed at the operation button 15*f* is changed according to its ON/OFF from a crosshatched inverted display (ON) to an on-white normal display (OFF) and vice versa.

Correspondingly, the display of the center display 29 is changed from the default mode guiding screen into the emphatic display of only the symbol of the hot wire rear window and its ON/OFF state after changed. This display state is maintained for a prescribed time and returns to the initial default mode guiding screen.

When the operation button 15*h* with the symbol of the traffic information viewed is pressed in the default mode display state of the multi-switch section 15, the display of the liquid crystal display 15*j* remains the default mode screen. However, the state viewed at the operation button 15*h* is changed according to its ON/OFF from a crosshatched inverted display (ON) to an on-white normal display (OFF) and vice versa.

Correspondingly, the display of the center display 29 is changed from the default mode guiding screen into the emphatic display of only the symbol of the traffic information and its ON/OFF state after changed. This display state is maintained for a prescribed time and returns to the initial default mode guiding screen.

When the operation button 15*a*–15*d* with the broadcasting station name viewed is pressed in the AM radio mode display state or FM radio mode display of the multi-switch section 15, the display of the center display 29 still remains the AM radio mode guiding screen or the FM radio mode guiding screen. However, the display of the liquid crystal display 15*j* is changed in such a manner that the state viewed at the operation button 15*a*–15*d* is changed according to its pressed or un-pressed state from a crosshatched inverted display (pressed) to an on-white normal display (un-pressed) and vice versa.

When the operation button 15*f* with "AUTO PRESET" viewed is pressed in the AM radio mode display state or FM radio mode display of the multi-switch section 15, the automatic presetting is performed. In the meantime, the display of the liquid crystal display 15*j* remains the AM radio mode or the FM radio mode. However, the display of the center display 29 is changed from the AM radio mode guiding screen or the FM radio mode guiding screen into the emphatic display of only "AUTO PRESET". Upon completion of the automatic presetting, the display of the center display 29 automatically returns to the initial AM radio mode guiding screen or FM radio mode guiding screen.

When the operation button 15*f* with ∧ (receiving frequency UP) or ∨ (receiving frequency DOWN) viewed is pressed in the AM radio mode display state or FM radio mode display of the multi-switch section 15, the manual setting of the receiving frequency is performed. In the meantime, the display of the liquid crystal display 15*j* remains the AM radio mode or the FM radio mode. However, the display of the receiving frequency on the center display 29 is correspondingly changed.

When the operation button 15*c*, 15*d* or 15*f* with "RPT", "RAND" or "SCAN" viewed is pressed in the CD mode display state or MD radio mode display of the multi-switch section 15, the CD mode guiding screen or MD mode guiding screen is changed according to the ON/OFF switching of the function of "RTP", "RAND", or "SCAN".

Correspondingly, the display of the liquid crystal display 15*j* is changed in such a manner that the state viewed at the operation button 15*c*, 15*d* or 15*f* is changed according to its pressed or un-pressed state from a crosshatched inverted display (pressed) to an on-white normal display (un-pressed) and vice versa.

When the operation button 15*g* or 15*h* with the symbol indicative of the "reproduced track DOWN" or "reproduced track UP" and the track number being viewed is pressed in the CD mode display state or MD radio mode display of the multi-switch section 15, the display of the liquid crystal display 15*j* remains the CD mode screen or MD mode screen, whereas the CD mode guiding screen or MD mode guiding screen on the center display 29 is changed with a change in the number of the track selected for reproduction.

When the operation button 15*a* or 15*b* with the symbol indicative of the "reproduced disk DOWN" or reproduced disk UP" and the disk number being viewed is pressed in the CD mode display state of the multi-switch section 15, the display of the liquid crystal display 15*j* remains the CD mode screen, whereas the CD mode guiding screen on the center display 29 is changed with a change in the number of the disk selected for reproduction.

When the operation button 15*a* with "DISP" viewed is pressed in the MD mode display state of the multi-switch section 15, the display of the liquid crystal display 15*j* remains the MD mode screen, whereas the MD mode guiding screen on the center display 29 is changed from the MD mode guiding screen into the emphatic display of only the disk title and song name. This display is maintained for a prescribed time, and thereafter returns to the initial MD mode guiding screen.

In the each of the AM radio mode, FM radio mode, CD mode or MD mode display states, when the operation button 15*e* with "AUDIO CONT" and ▼ being viewed is pressed, the display of the liquid crystal display 15*j* is changed from each mode screen into an audio control mode screen.

As a result, the multi-switch section 15 falls into an audio control mode display state as shown in FIG. 8 where the symbols of "REAR", "FRONT", "LEFT", "RIGHT", "BASS weak" "BASS strong", "TREBLE strong" and "TREBLE weak" are viewed at the operation buttons 15*a*–15*h*.

Thereafter, before a prescribed time T3 elapses, when any one of the operation buttons 15*a*–15*h* is pressed, the sound balance or sound quality will be adjusted according to the operated quantity by the pressed operation button.

When any one of the operation buttons 15*a*–15*h* is pressed in the audio control mode display state of the multi-switch section 15, the display of the center display 29 is changed from the each of the AM, FM, CD and MD mode guiding screen into the emphatic display of only "AUTO PRESET". This display is maintained for a prescribed time, and thereafter returns to each initial mode guiding screen.

In the audio control mode display state, before a prescribed time T3 elapses, when none of the operation buttons 15*a*–15*h* is pressed, the multi-switch section 15 automatically returns to each initial mode display screen. The display of the center display 29 automatically returns to each mode guiding screen.

In the air conditioner display mode of the multi-switch section 15, when any one of the operation buttons 15a–15c with "OFF", "A/C", and "AUTO" being viewed is pressed, the air conditioner guiding mode screen on the center display 29 is changed according to the ON/OFF of the "A/C" or "AUTO".

Correspondingly, the display of the liquid crystal display 15j is changed in such a manner that the state viewed at the operation button 15a, 15b or 15c is changed according to its pressed or un-pressed state from a crosshatched inverted display (pressed) to an on-white normal display (un-pressed) and vice versa.

In the air conditioner display mode of the multi-switch section 15, when any one of the operation buttons 15d, 15g and 15h with the symbols of "wind circulating mode", "wind drafting mode" and "wind drafting level mode" are pressed, setting is changed according to the pressed operation button. The display of the liquid crystal display 15j remains the air conditioner mode screen (FIG. 9), whereas the air conditioner guiding screen on the center display 29 is changed into the mode after changed.

In the air conditioner mode display state of the multi-switch section 15, when the operation button 15e with the symbol of the defogger viewed is pressed, the display of the liquid crystal display 15j remains the air conditioner display mode screen like the case of the default mode display state, whereas the state viewed at the operation button 15e is changed according to its ON/OFF from a crosshatched inverted display (ON) to an on-white normal display (OFF) and vice versa.

Correspondingly, the display of the center display 29 is changed from the default mode guiding screen into the emphatic display of only the symbol of the defogger and its ON/OFF state after changed, as shown in FIG. 23. This display state is maintained for a prescribed time and returns to the initial air conditioner mode guiding screen.

In the air conditioner mode display state of the multi-switch section 15, when the operation button 15f with the symbol of the hot wire rear window viewed is pressed like the case of the default mode display state, the display of the liquid crystal display 15j remains the air conditioner mode screen, whereas the state viewed at the operation button 15f is changed according to its ON/OFF from a crosshatched inverted display (ON) to an on-white normal display (OFF) and vice versa.

Correspondingly, the display of the center display 29 is changed from the default mode guiding screen into the emphatic display of only the symbol of the hot wire rear window and its ON/OFF state after changed. This display state is maintained for a prescribed time and thereafter returns to the initial air conditioner guiding screen.

In the multi-switch according to the first embodiment of the first aspect of the present invention, the operation buttons 15a–15h can be commonly used for both selection of an appliance (CD player 40, MD player 50, FM/AM tuner 60, air conditioner 70) and the operation of the selected appliance by selecting the symbols viewed at the operation buttons on the default screen (appliance selection) and mode screen of the appliance (operation selection) on the liquid crystal display 15j.

Therefore, without increasing the number of the operation buttons dedicated to the appliance and the operations (function) thereof, the multi-function of each operation button and reduction in the space occupied by the operation buttons can be realized simultaneously.

The symbols of ▲ or ▼ viewed at the operation buttons 15a–15d and 15g can be omitted. However, these symbols, which can predict the presence of the concrete function to be performed for the selected appliance, makes it unnecessary for an operator to know the concrete functions of the appliance.

At the redundant operation button where no symbol is viewed (15b in the MD mode screen in FIG. 7), supplemental information on the other operation button may be displayed.

In this embodiment, in the state where the default mode screen is displayed on the liquid crystal display 15j, when the volume knob 25 is operated, the display on the liquid crystal display 15j is forcibly changed into each of the AM, FM, CD, MD modes, and when the temperature setting knob 27 is operated, the display is forcibly changed into the air conditioner display mode.

Such a configuration may be omitted. However, when either of the volume knob 25 and temperature setting knob 25 is operated on the default mode screen, the relative function of the corresponding appliance can be continuously performed.

The contents of each mode screen to be displayed on the liquid crystal display 15j may be previously stored in a memory. On the other hand, in this embodiment, they were determined on the basis of the information of the appliance and function acquired from each appliance through the multiplex bus line BL. However, the configuration of this embodiment is advantageous since the mode screen can be set according to different appliances and functions by only connecting the switch 30 to the multiplex bus line BL.

Further, in place of the configuration describe above, using an external terminal or by operating the operation buttons 15a–15h, volume knob 25, temperature setting knob 27, etc., each of the mode screens to be displayed on the liquid crystal display 15j may be optionally set. In such a configuration, the menu for setting/selecting the operation of each of the CD player 40, MD player 50, AM/FM tuner 60 and air conditioner 70 can be optionally structured in accordance with a user's ease of use.

Embodiment 2

An explanation will be given of the concrete configuration of the switch device according to the second embodiment.

Figure 39:
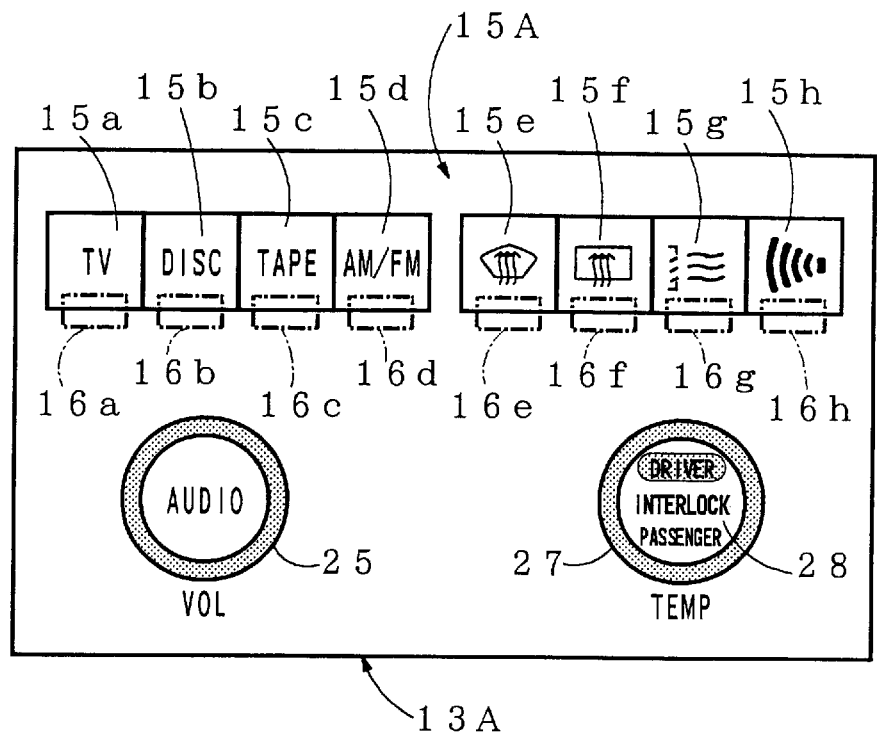
FIG. 39 is a front view of the main part of the switch device according the second embodiment of the first aspect of the present invention.

FIG. 39 is a front view of the main part of a switch device according to the second embodiment. As seen from FIG. 39, the combination panel 13A according to this embodiment is different from that according to the first embodiment as shown in FIG. 4 in that eight operation buttons 15a–15h in the multi-switch section 15A are allotted four for each of right and left two rows.

On the combination panel 13 shown in FIG. 39, below the left four operation buttons 15a–15d, a volume knob 25 for audio appliances is arranged, whereas below the right four operation buttons 15e–15d, a temperature setting knob 27 for an air conditioner is arranged. The temperature setting knob 27a is formed in a ring shape. Inside the ring-shaped temperature setting knob 27a, a seat setting operation button 28 is arranged.

On the combination panel 13A according to this embodiment also, there are actually arranged limit switches 16a–16h, CD slot 17, eject operation button 19, MD slot 21 and eject operation button 23. But, for convenience of illustration, they are not shown in FIG. 39.

On the liquid crystal display 15j behind the multi-switch section 15A, several mode screens are displayed so that they can be viewed at the operation buttons 15a–15h.

In addition to the default mode display as shown in FIG. 39, there are display screens inclusive of an AM/FM radio mode, TV mode, CD/MD composite disk mode, cassette mode, preset operation mode, preset tuning mode, air conditioner mode and room-temperature adjusting mode.

In the default mode display as shown in FIG. 39, the default mode display screen is displayed on the liquid crystal display 15j in such a manner that at the left side four operation buttons 15a–15d, "TV", "DISK", "TAPE" and "AM/FM" which are appliances to be selected are viewed, respectively, and at the right side four operation buttons 15e–15h, symbols indicative of a defogger, hot wire rear window heater, air conditioner and traffic information are viewed.

In the default mode display, the symbols at the operation buttons 15e, 15f and 15h other than the operation button 15g are viewed as a crosshatched inverted display (ON) or an on-white normal display (OFF), respectively according to their ON/OFF state.

Figure 40:
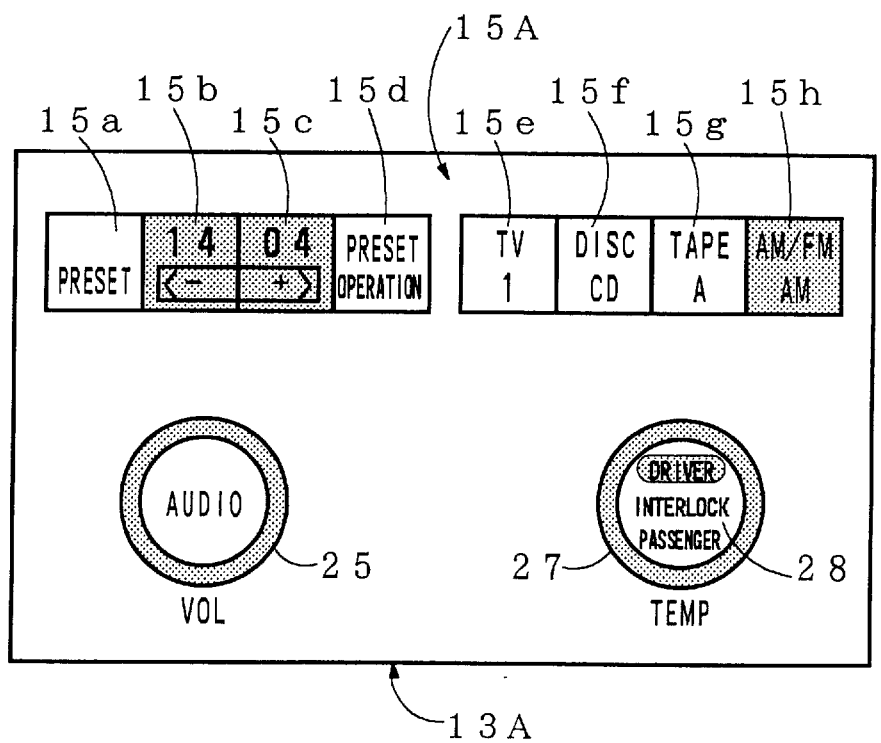
FIG. 40 is a front view of the main part of the switch device showing the state where an AM/FM radio mode display is made on the multi-switch section in FIG. 39.

In the AM/FM radio mode, as seen from FIG. 40, the AM/FM radio mode screen is displayed on the liquid crystal display 15j. Specifically, the symbols of "TV", "DISK", "TAPE" and "AM/FM" which represent appliances to be selected are viewed at the right side four operation buttons 15e–15h, respectively as in the default mode display. Further, the channel selected of the channels previously set is also viewed at the operation button 15e; "MD" or "CD" is also viewed at the operation button 15f; "A" or "B" which is a face to be reproduced is also viewed at the operation button 15g; and "AM" or "FM" which is an appliance being selected is also viewed at the operation button 15h.

In the AM/FM radio mode, the symbols of "PRESET", "–mark with an arrow", "+with an arrow", and "preset operation" are further viewed at the left four operation buttons 15a, 15b, 15c and 15d, respectively. The receiving frequency of the AM or FM" being selected is viewed at the area extending over the operation buttons 15b and 15c.

In the TV mode display, the TV mode display screen is displayed on the liquid crystal display 15j (not shown). In this case, the channel number being selected is viewed at the area extending over the operation buttons 15b and 15c in place of the receiving frequency of the AM/FM mode radio mode screen.

In the disc mode display, the disc mode display screen is displayed on the liquid crystal display 15j (not shown). In this case, the track number being selected and elapsing time for reproduction are viewed at the area extending over the operation buttons 15b and 15c in place of the receiving frequency of the AM/FM radio mode screen.

In the cassette mode, the cassette mode display screen is displayed on the liquid crystal display 15j (not shown). In this case, the symbol of "<<" representative of rewinding is viewed at the operation button 15a in place of "PRESET" on the AM/FM radio mode screen , ">>" representative of fast forward is viewed at the bottom 15d in place of the "presetting operation", and "PLAY", "FF", "REW", "SKIP", etc. indicative of the operation state of the cassette deck is viewed at the area extending over the operation buttons 15b and 15c in place of the receiving frequency on the AM/FM radio mode display.

Incidentally, in this cassette mode display, the "–" are not viewed at the operation buttons 15b and 15c.

In the displays of the AM/FM radio mode, TV mode, disc mode, and cassette mode on the liquid crystal display 15j described above, for example, as seen from FIG. 40, the symbols at the operation buttons 15b and 15c on the left side and one of the operation buttons 15e–15h being selected on the right side are viewed as a crosshatched inverted display and the symbols at the remaining operation buttons are viewed as an on-white normal display.

In the presetting operation mode display, as seen from FIG. 41, the presetting operation mode display screen is displayed on the liquid crystal display 15j. Specifically, the preset numbers 1–6 and the corresponding receiving frequencies and or preset channels are viewed at the operation buttons 15a–15c and 15e–15h. Further, the symbol of "return" is viewed at the operation button 15d and the symbol of "AUTO PRESET" is viewed at the operation button 15h.

In the presetting tuning mode display, the presetting tuning mode display screen is displayed on the liquid crystal display 15j (not shown). In this case, the blank state is viewed at the operation button 15h in place of "AUTO PRESET" in the presetting operation mode display.

Figure 42:
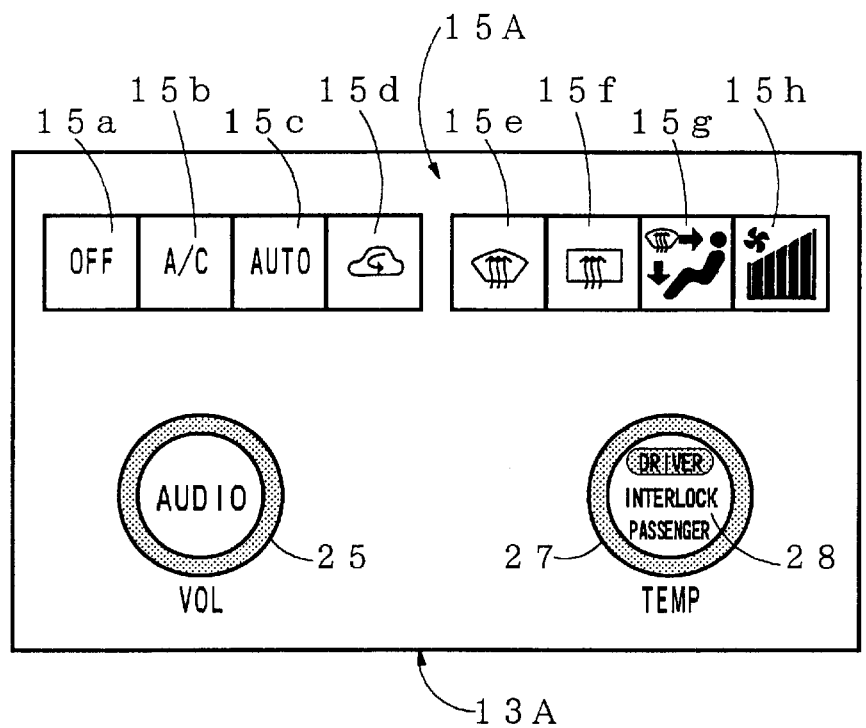
FIG. 42 is a front view of the main part of the switch device showing the state where an air conditioner mode display is made on the multi-switch section in FIG. 9.

In the air conditioner mode display, as seen from FIG. 42, the air conditioner mode display screen is displayed on the liquid crystal display 15j. Specifically, "OFF" indicative of the state of the air conditioner is viewed at the operation button 15a, and "A/C (manual)" and "AUTO" indicative of the function of the air conditioner are viewed at the operation buttons 15b and 15c.

In the air conditioner mode display, at the operation button 15d on the left side and the four operation buttons 15e, 15f, 15g and 15h on the left side, the symbols of "air circulating mode", "defogger", "heat-wave rear window heater", "wind drafting mode" and "wind drafting level" indicative of the function of the air conditioner, respectively, are viewed.

Incidentally, in the air conditioner mode display, it should be noted that at the two operation buttons 15b and 15c on the right side and the two operation buttons 15e and 15f on the left side, the symbol indicative of the function in "ON" is viewed as a crosshatched inverted display and that in "OFF" is viewed as a normal on-white normal display.

In the air conditioner mode display, it should be noted that whenever the setting of the air conditioner circulating mode viewed at the operation button 15d is changed, its symbol changes alternately between the symbols of "circulating" and "ventilating" as shown in FIG. 10 relative to the first embodiment. Further, in the air conditioner mode display, it should be noted that whenever the setting of the wind drafting mode viewed at the operation button 15g at the lower row changes is changed, its symbol mark changes in a sequence of six patterns of "no drafting", "only head", "both head and leg", "only leg", "only leg with defogger" and "head and leg with defogger" as indicated by arrows in FIG. 11 relative to the first embodiment.

In the air conditioner mode display, further, it should be noted that the setting of the wind drafting level viewed at the operation button 15h at the lower row is changed, its symbol mark changes in six levels from 0 to 5 (maximum) of the wind drafting amount as indicated by arrows in FIG. 12 relative to the first embodiment.

Figure 43:
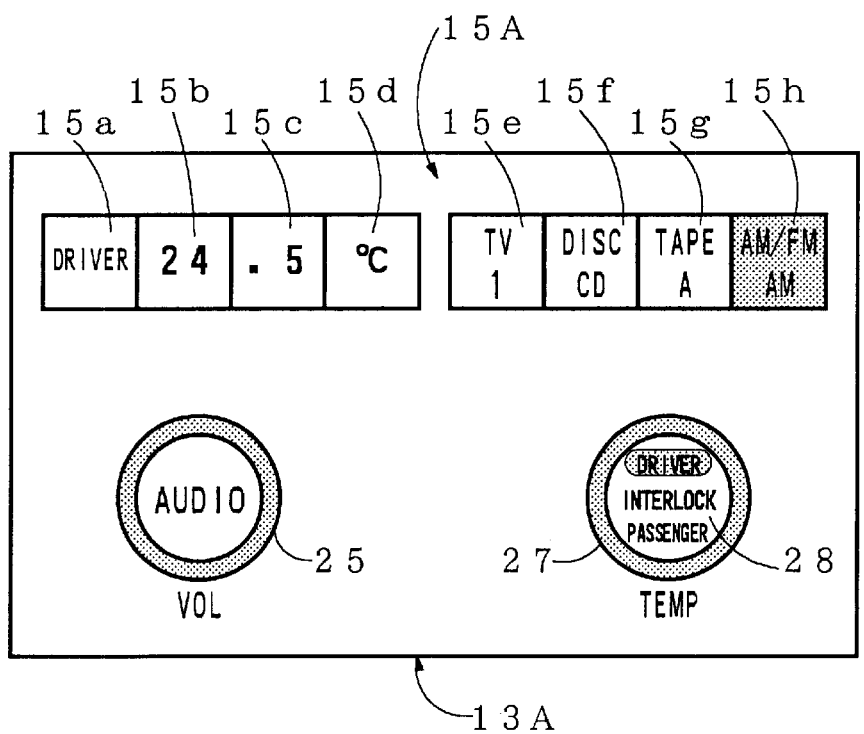
FIG. 43 is a front view of the main part of the switch device showing the state where a room temperature adjusting mode display is made on the multi-switch section in FIG. 39.

In the room temperature adjusting mode display, as seen from FIG. 43, the room temperature adjusting mode screen is displayed on the liquid crystal display 14j. Specifically, as seen from FIGS. 43, 44A and 45A, "driver seat", "interlock" (representative of both "driver seat" and "passenger seat") or "passenger seat" indicative of a selected temperature adjusting area is viewed at the operation button 15a in place of "PESET" in FIG. 40.

In the room temperature adjusting mode display, further, it should be noted that whenever selection of the room temperature adjusting area is changed, its symbol viewed at the operation button 15a changes in the order of "driving seat" in FIG. 43, "interlock" in FIG. 44A, "passenger's seat" in FIG. 45A, "driving seat" in FIG. 43, The seat setting operation button 28 as well as the multi-switch section 15A constitutes a switch device according to the second embodiment, and is made of a transparent material so that an image displayed on a liquid crystal display 15k (not shown) located behind the seat setting operation button 28 can be directly viewed from the front at the operation button 28.

The liquid crystal display 15k may be located not only behind the seat setting operation button 28, but also at any optional place within the center console 5. In this case. The light from the displayed image on the liquid crystal display 15k may be led to behind the seat setting operation button 28 through a light conducting means (not shown).

Behind the seat setting operation button 28, a limit switch 16j (not shown in FIG. 39)for detecting the pressing of the seat setting button 28 is arranged not so as to interfere with the image light from the liquid crystal display 15k.

It should be noted that whenever selection of the room temperature adjusting area is changed on the display of the operation button 15k, its symbol viewed at the operation button 28 changes in the order of "driving seat" in FIG. 43, "interlock" in FIG. 44B, "passenger's seat" in FIG. 45B, "driving seat" in FIG. 43.

An explanation will be given of the schematic electric configuration of the switch device according to the second embodiment.

Figure 46:
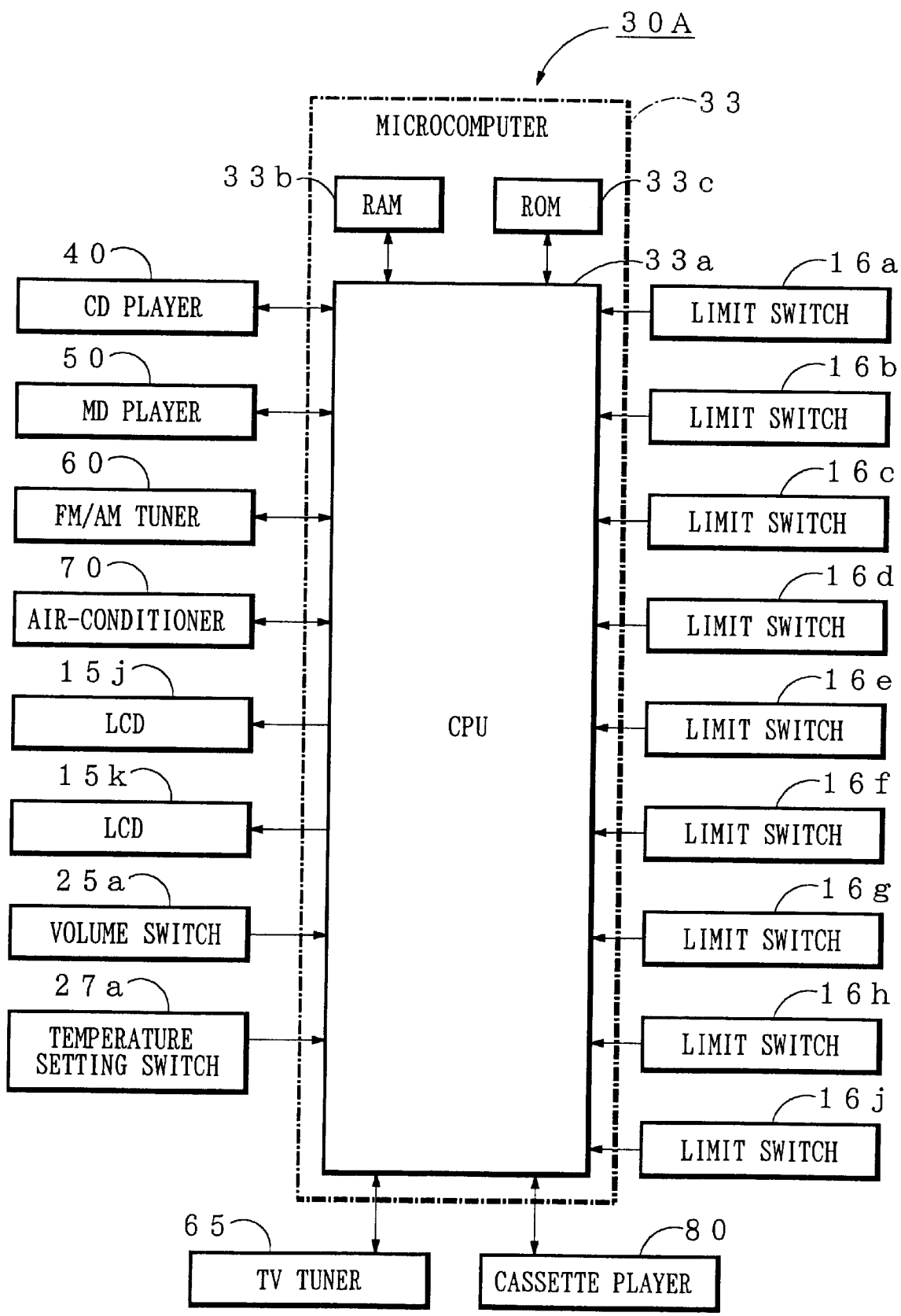
FIG. 46 is a block diagram showing the electric schematic configuration of the switch device of FIG. 39.

As seen from FIG. 46, the switch device 30A includes a microcomputer 31 for controlling the display of the liquid crystal displays 15j and 15k described above.

The microcomputer 33 includes a CPU 33a, RAM 33b and ROM 33c. The CPU 33a is connected to the CD player 40, MD player 50, AM/FM tuner 60, TV tuner 65, air conditioner 70 and cassette player 80. The CPU 33a is connected to limit switches 16a–16j, liquid displays 15j, 15k, volume switch 25a an output of which is changed by the rotation of the volume knob 25, a temperature setting switch 27a an output of which is changed by the rotation of the temperature setting knob 27.

The RAM 33b includes a data area and a work area used for various kinds of processing. The work area includes sub-areas used various kinds of flags and a buffer. The ROM 33c stores a control program for performing various kinds of processing operations.

Now referring to flowcharts of FIGS. 47–57, an explanation will be given of the processing carried out by the CPU 33a in accordance with the control program stored in the ROM 33c.

By turning on an accessory switch (not shown), the microcomputer 33 is booted up by power supply from a battery (not shown) loaded in the vehicle. Then, a program starts. As seen from FIG. 47, first, the CPU 33a makes initial setting inclusive of setting various kinds of flags at "0" (Step SA1).

Upon completion of the initial setting in step SA1, the default processing for displaying the default mode screen on the liquid crystal display 15j is made (step SA3). Whether or not any one of the operation buttons 15a–15h has been pressed is verified on the basis of the outputs from the limit switches 16a–16h (step SA5).

If NO, the processing proceeds to step S35. If YES, if or not the operation button 15a allotted to the TV tuner 65 in the default mode display has been pressed is verified (step SA7). If YES, the flag FA1 of the TV flag area in the RAM 31b is set at "1", whereas the flags F3, F5 and F7 in the disk, cassette and radio flag areas in the RAM 31b are set at "0", respectively (step SA9). The processing will proceed to processing a(step SA47 described later).

In step SA7, if NO, whether or not the operation button 15b allotted to the CD player 40 and MD player 50 has been pressed is verified (step SA11).

In step SA11, if YES, the disk flag F3 is set at "1", whereas the TV flag FA1, cassette flag FA5 and radio flag FA7 are set at "0" (step SA13). The processing will proceed to processing b (step SA77). In step S11, if NO, whether or not the operation button 15c allotted to the cassette player 80 has been pressed is verified (step SA15).

Figure 48:
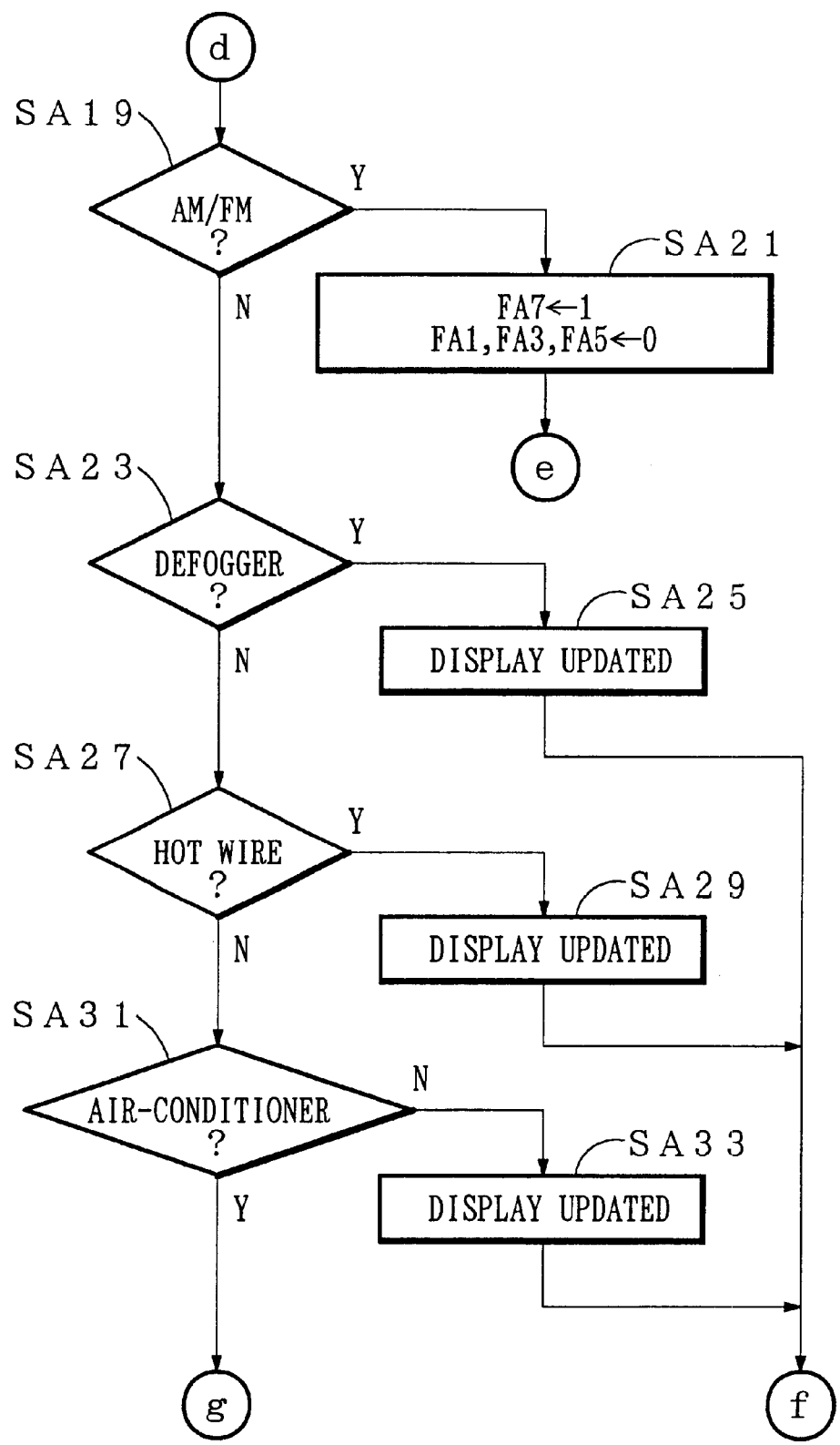

In step SA15, if YES, the cassette flag FA5 is set at "1", whereas the TV flag FA1, disk flag FA3 and radio flag FA7 are set at "0" (step SA17). The processing will further proceed to processing c (step SA107 described later). In step SA17, if NO, whether or not the operation button 15d allotted to the AM/FM tuner 60 has been pressed is verified (step SA19) (FIG. 48).

In step SA19, if YES, the radio flag FA7 is set at "1", whereas the TV flag FA1, disk flag FA3 and cassette flag FA5 are set at "0"(step SA21). The processing will proceed to processing e (step SA137 described later). In step SA19, if NO, whether or not the operation button 15e allotted to the ON/OFF switching of the defogger has been pressed is verified (step SA23).

In step SA23, if YES, the display at the operation button 15e in the default mode on the liquid display 15j is updated from a crosshatched inverted display to an on-white normal display, and vice versa (step SA25). The processing returns to processing f (step SA5). In step SA23, if NO, whether or not the operation button 15f allotted to the ON/OFF switching of the hot wire rear window heater has been pressed is verified (SA27).

In step SA27, if YES, the display at the operation button 15f in the default mode on the liquid display 15j is updated from a crosshatched inverted display to an on-white normal display, or vice versa (step SA29). The processing returns to processing f (step SA5). In step SA27, if NO, whether or not the operation button 15f allotted to the air conditioner has been pressed is verified (SA31).

In step SA27, if NO, the display at the operation button 15g in the default mode on the liquid display 15j is updated from a crosshatched inverted display to an on-white normal display, and vice versa (step SA33). The processing returns to processing f (step SA5). In step SA27, if YES, the processing proceeds to processing g (step SA2 described later).

Figure 47:
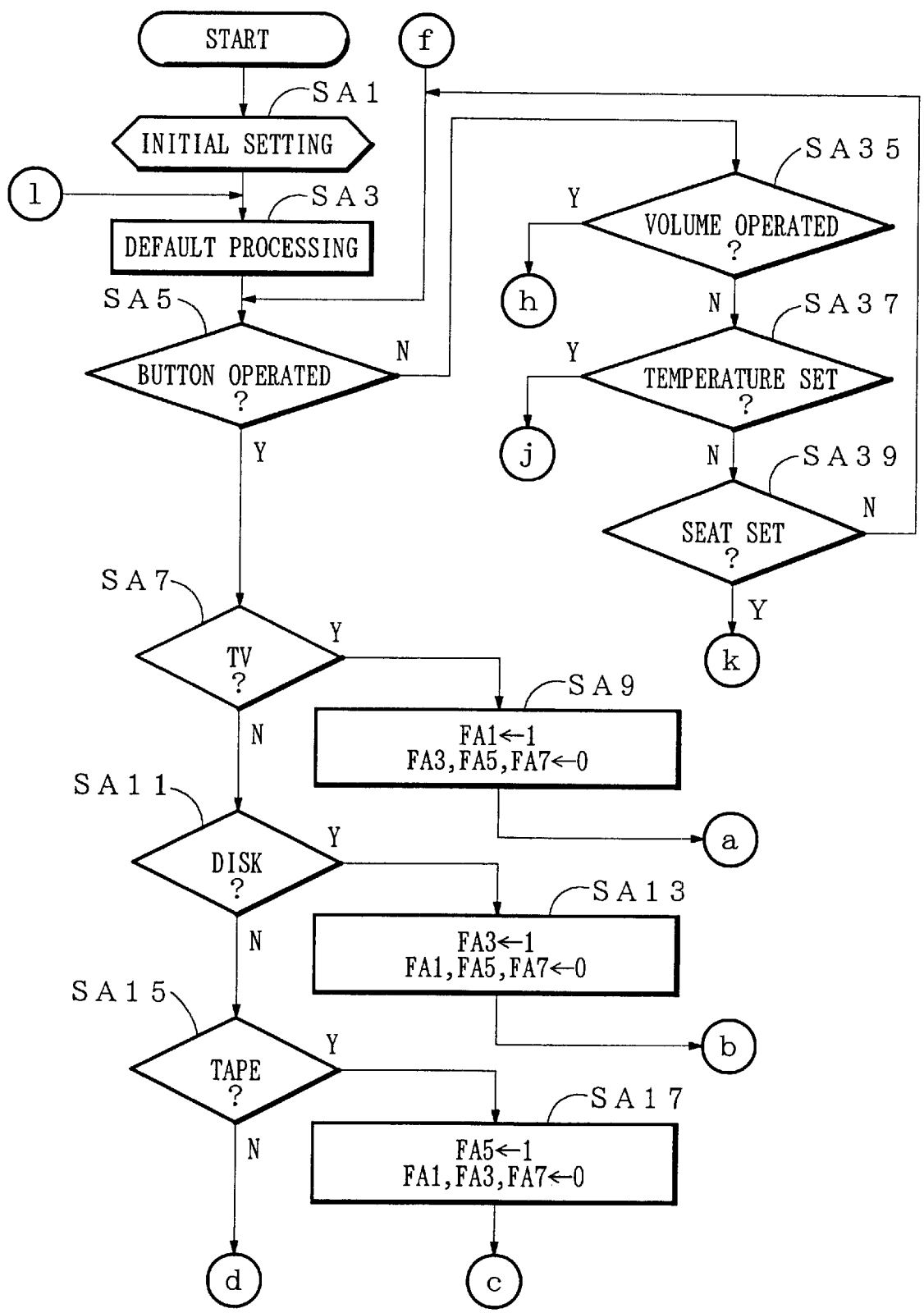
FIGS. 47 to 57 are flowcharts of the processing which is performed by a CPU in accordance with the control program stored in the ROM of the microcomputer shown in FIG. 25.

In step SA5, if NO (no operation button has been pressed), as seen from FIG. 47, whether or not the volume knob 25 has been operated (rotated) is verified on the basis of the output from the volume switch 25a (step SA35). In step SA35, if YES, the processing proceeds to processing h (step SA41). If No, whether the temperature setting knob 27 has been operated (rotated) is verified on the basis of the output from the temperature setting switch 27a (step SA37).

In step SSA37, if YES, the processing proceeds to processing k (step SA289 described later). If NO, whether or not the seat setting operation button 28 has been pressed is verified on the basis of the output form the limit switch 16j (step SA39).

In step SA39, if YES, the processing proceeds to processing k (step SA295 described later). If NO, the processing returns to processing h (step SA39).

Figure 49:
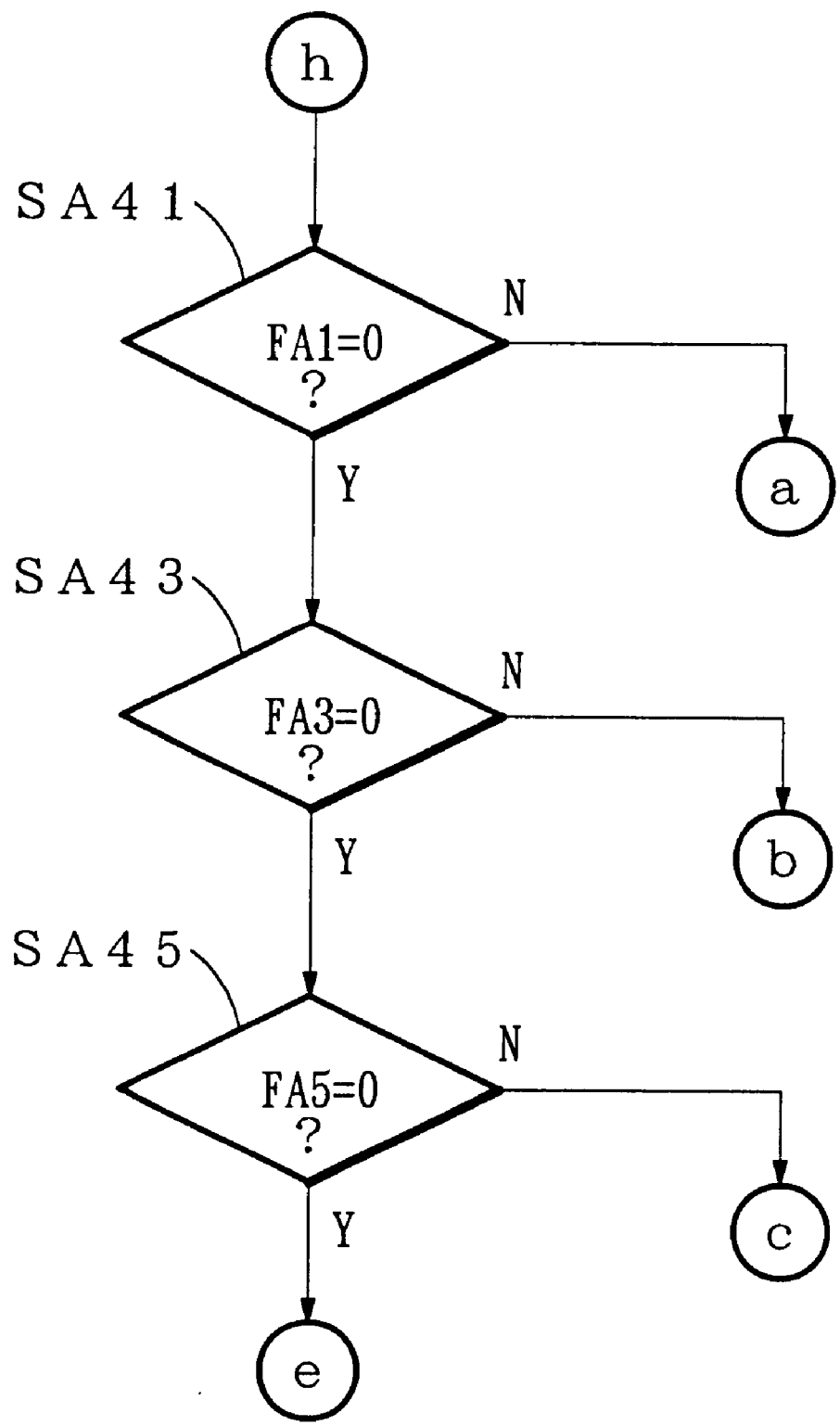

As seen from FIG. 49, in step SA41, whether or not the TV flag FA1 is "0" is verified. If NO, the processing proceeds to processing a (step SA47 in FIG. 50). If YES, whether or not the disk flag F3 is "0" is verified (step SA43).

Figure 51:
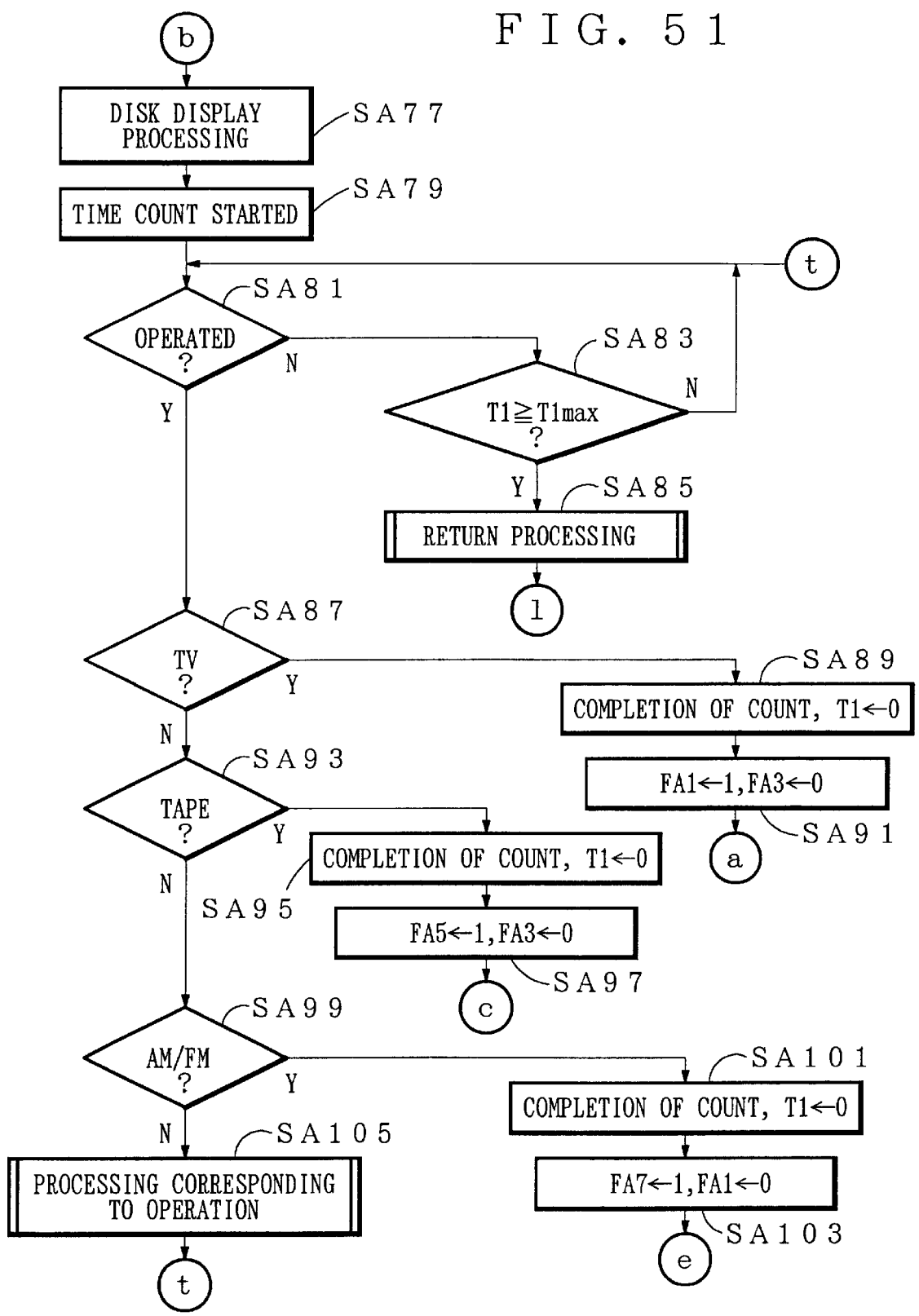

In step S45, if NO, the processing proceeds to processing b (step SA77 in FIG. 51). If YES, whether or not the cassette flag F5 is "0" is verified (step SA45). In step S45, if NO, the processing proceeds to processing c (step SA107 in FIG. 52). If YES, the processing proceeds to processing e (step SA137 in FIG. 53).

As seen from FIG. 50, in step S47 (FA1=1 in steps SA9 and SA41), TV display processing will be made. Namely, the TV mode screen is displayed on the liquid crystal display 15j.

In step SA49, time counting is started in the timer area in RAM 31b. Subsequently, in step SA51, whether or not each of the operation buttons 15a–15h has been pressed is verified on the basis of the outputs from the limit switches 16a–16h (step SA51).

In step SA51, if YES, the processing proceeds to step SA57 described later. If NO, whether or not the timer value T1 has reached a prescribed time-up value $T1_{MAX}$ is verified (step SA53).

If NO, the processing returns to step SA51. If YES, the time-counting by the timer is completed, and the timer value T1 is reset to zero (restore processing). The processing returns to processing 1 (step SA3 in FIG. 47).

In step SA57, whether or not the operation button 15f allotted for selection of the CD player 40 and MD player 50 has been pressed is verified. If YES, the time counting by the timer is completed and the timer value T1 is reset to zero (step SA59). The disk flag FA3 is set at "1", and the TV flag FA1 is set at "0" (step SA61). Thereafter, the processing proceeds to processing b (step SA77 in FIG. 51).

In step SA57, if NO, whether or not the operation button 15g allotted for selection of the cassette player 80 has been pressed is verified (step SA63). If YES, the time counting by the timer is completed and the timer value T1 is reset to zero (step SA65). The cassette flag FA5 is set at "1", and the TV flag FA1 is set at "0" (step SA67). Thereafter, the processing proceeds to processing c (step SA107 in FIG. 52).

In step SA63, if NO, whether or not the operation button 15h allotted for selection of the AM/FM tuner 60 has been pressed is verified (step SA69). If YES, the time counting by the timer is completed and the timer value T1 is reset to zero (step SA71). The radio flag FA7 is set to "1", and the TV flag FA1 is set to "0" (step SA73). Thereafter, the processing proceeds to processing e (step SA137 in FIG. 53).

In step SA69, if NO, the processing corresponding to any of the operation buttons 15a–15e which has been pressed is made (step SA75). Which of the operation buttons 15a–15e has been pressed is identified on the basis of the outputs from the limit switches 16a–16e. Thereafter, the processing returns to step SA51.

As seen from FIG. 51, in step S77(FA3=1 in steps SA13 and SA43), disk mode display processing will be made. Namely, the disk mode screen is displayed on the liquid crystal display 15j.

In step SA79, time counting is started in the timer area in RAM 31b. Subsequently, whether or not any one of the operation buttons 15a–15h has been pressed is verified on the basis of the outputs from the limit switches 16a–16h (step SA81).

In step SA51, if YES, the processing proceeds to step SA87 described later. If NO, whether or not the timer value T1 has reached a prescribed time-up value $T1_{Max}$ is verified (step SA83).

If NO, the processing returns to step SA81. If YES, the time-counting by the timer is completed, and the timer value T1 is reset to zero (restore processing) (step SA85). The processing returns to processing 1 (step SA3 in FIG. 47).

In step SA 87, whether or not the operation button 15e allotted for selection of the TV tuner 65 has been pressed is verified. If YES, the time counting by he timer is completed and the timer value T1 is reset to zero (step SA89). The TV flag FA1 is set at "1", and the disk flag FA3 is set at "0" (step SA91). Thereafter, the processing returns to processing a (step SA 47 in FIG. 50).

In step SA87, if NO, whether or not the operation button 15g allotted for selection of the cassette player 80 has been pressed is verified (step SA93). If YES, the time counting by the timer is completed and the timer value T1 is reset to zero (step SA95). The cassette flag FA5 is set at "1", and the disk flag FA3 is set at "0" (step SA97). Thereafter, the processing proceeds to processing c (step SA107 in FIG. 52).

In step SA93, if NO, whether or not the operation button 15h allotted for selection of the AM/FM tuner 60 has been pressed is verified (step SA99). If YES, the time counting by the timer is completed and the timer value T1 is reset to zero (step SA101). The radio flag FA7 is set at "1", and the disk flag FA3 is set at "0"(step SA103). Thereafter, the processing proceeds to processing e (step SA137 in FIG. 53).

In step SA99, if NO, the processing corresponding to any of the operation buttons 15a–15d and 15f which has been pressed is made (step SA105). Which of the operation buttons 15a–15d and 15f has been pressed is identified on the basis of the outputs from the limit switches 16a–16d and 16f. Thereafter, the processing returns to step SA81.

As seen from FIG. 52, in step S107 (cassette flag FA5=1 in steps SA17 and SA45), disk mode display processing will be made. Namely, the cassette mode screen is displayed on the liquid crystal display 15j.

In step SA109, time counting is started in the timer area in RAM 31b. Subsequently, whether or not any of the operation buttons 15a–15h has been pressed is verified on the basis of the outputs from the limit switches 16a–16h (step SA111).

In step SA111, if YES, the processing proceeds to step SA117 described later. If NO, whether or not the timer value T1 has reached a prescribed time-up value $T1_{MAX}$ is verified (step SA113).

If NO, the processing returns to step SA111. If YES, the time-counting by the timer is completed, and the timer value T1 is reset to zero (restore processing) (step SA115). The processing returns to processing 1 (step SA3 in FIG. 47).

In step SA 117, whether or not the operation button 15e allotted for selection of the TV tuner 65 has been pressed is verified. If YES, the time counting by he timer is completed and the timer value T1 is reset to zero (step SA119). The TV flag FA1 is set at "1", and the cassette flag FA5 is set at "0" (step SA121). Thereafter, the processing returns to processing a (step SA 47 in FIG. 50).

In step SA117, if NO, whether or not the operation button 15f allotted for selection of the CD player and MD player 50 has been pressed is verified (step SA123). If YES, the time counting by the timer is completed and the timer value T1 is reset to zero (step SA125). The disk flag FA3 is set at "1", and the cassette flag FA5 is set at "0" (step SA127). Thereafter, the processing returns to processing c (step SA77 in FIG. 51).

In step SA123, if NO, whether or not the operation button 15h allotted for selection of the AM/FM tuner 60 has been pressed is verified (step SA129). If YES, the time counting by the timer is completed and the timer value T1 is reset to zero (step SA131). The radio flag FA7 is set at "1", and the cassette flag FA5 is set at "0" (step SA133). Thereafter, the processing proceeds to processing e (step SA137 in FIG. 53).

In step SA129, if NO, the processing corresponding to any of the operation buttons 15a–15d and 15g which has been pressed is made (step SA135). In this case, which of the operation buttons 15a–15d and 15g has been pressed is identified on the basis of the outputs from the limit switches 16a–16d and 16g. Thereafter, the processing returns to step SA111.

Figure 53:
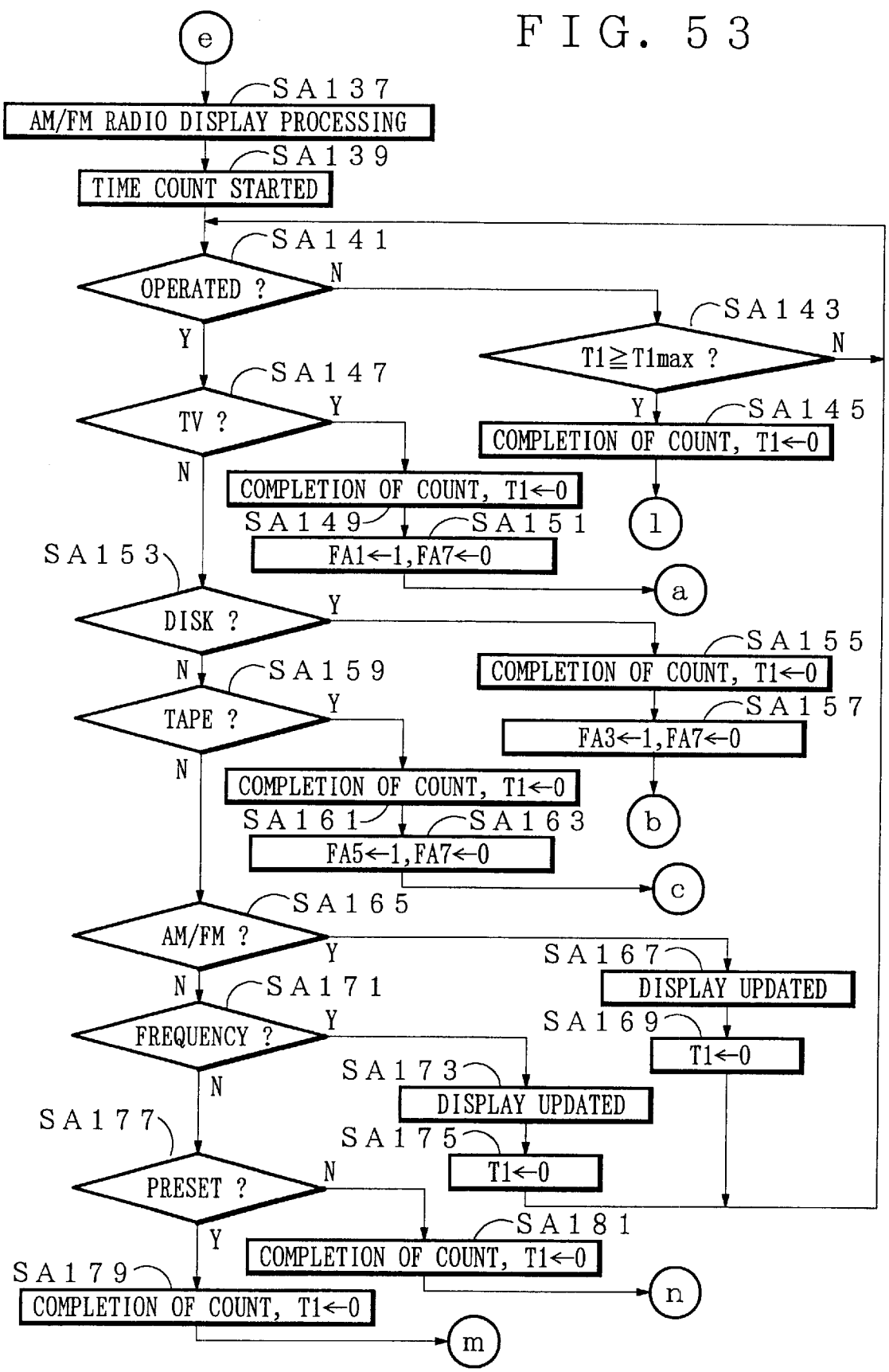

As seen from FIG. 53, in step S107(radio flag FA7=1 in steps SA21 and FA5=0 in step SA45), AM/FM radio mode display processing will be made. Namely, the AM/FM radio mode screen is displayed on the liquid crystal display 15j.

In step SA139, time counting is started in the timer area in RAM 31b. Subsequently, whether or not any one of the operation buttons 15a–15h has been pressed is verified on the basis of the outputs from the limit switches 16a–16h (step SA141).

In step SA141, if YES, the processing proceeds to step SA147 described later. If NO, whether or not the timer value T1 has reached a prescribed time-up value $T1_{MAX}$ is verified (step SA143).

If NO, the processing returns to step SA141. If YES, the time-counting by the timer is completed, and the timer value T1 is reset to zero (restore processing) (step SA145). The processing returns to processing 1 (step SA3 in FIG. 47).

In step SA 147, whether or not the operation button 15e allotted for selection of the TV tuner 65 has been pressed is verified. If YES, the time counting by he timer is completed and the timer value T1 is reset to zero (step SA149). The TV flag FA1 is set at "1", and the radio flag FA7 is set at "0" (step SA151). Thereafter, the processing returns to processing a (step SA 47 in FIG. 50).

In step SA147, if NO, whether or not the operation button 15f allotted for selection of the CD player and MD player 50 has been pressed is verified (step SA153). If YES, the time counting by he timer is completed and the timer value T1 is reset to zero (step SA155). The disk flag FA3 is set at "1" and the radio flag FA7 is set at "0" (step SA157). Thereafter, the processing returns to processing b (step SA107 in FIG. 51).

In step SA153, if No, whether or not the operation button 15f allotted for selection of the cassette player 80 has been pressed is verified (step SA159). If YES, the time counting by the timer is completed and the timer value T1 is reset to zero (step SA161). The cassette flag FA5 is set at "1", and the radio flag FA7 is set at "0" (step SA163). Thereafter, the processing returns to processing c (step SA107 in FIG. 52).

In step SA159, if NO, whether or not the operation button 15g allotted for selection of the AM/FM tuner 60 has been pressed is verified (step SA165). If YES, the display of the AM/FM radio mode screen at the liquid crystal display 15j is changed from one being selected from the other not being selected. The timer value T1 is reset to zero (step SA169). The processing returns to step SA141.

In step SA165, if NO, whether any one of the operation button 15b and 15c allotted for increasing and decreasing in the receiving frequency has been pressed is verified. If YES, the display of the AM/FM radio mode screen is updated in accordance with the operation by the operation button 15b or 15c (step SA173). The timer value T1 is reset to zero (step SA175). The processing returns to step SA141.

In step SA171, if none of the operation buttons 15b and 15c has been pressed, whether the operation button 15a allotted for calling up a preset station has been pressed is verified (step SA177). In step SA177, if YES, the time counting by the timer is completed and the timer value T1 is reset to zero (step SA179). The processing proceeds to processing m (step SA183 in FIG. 54 described later).

In step SA179, if NO, the time counting by the timer is completed and the timer value T1 is reset to zero (step SA181). The processing proceeds to processing n(step SA207 in FIG. 55 described later).

As seen from FIG. 54, in step SA183, preset tuning display processing display processing will be made. Namely, the preset tuning mode screen is displayed on the liquid crystal display 15j.

In step SA185, time counting is started in the timer area in RAM 31b. Subsequently, whether or not any of the operation buttons 15a–15h has been pressed is verified on the basis of the outputs from the limit switches 16a–16h (step SA187).

In step SA141, if YES, the processing proceeds to step SA195 described later. If NO, whether or not the timer value T1 has reached a prescribed time-up value $T1_{MAX}$ is verified (step SA189).

If NO, the processing returns to step SA187. If YES, the time-counting by the timer is completed, and the timer value T1 is reset to zero (step SA191). Subsequently, whether or not the TV flag FA1 is "0" or not is verified (step SA193).

Figure 50:
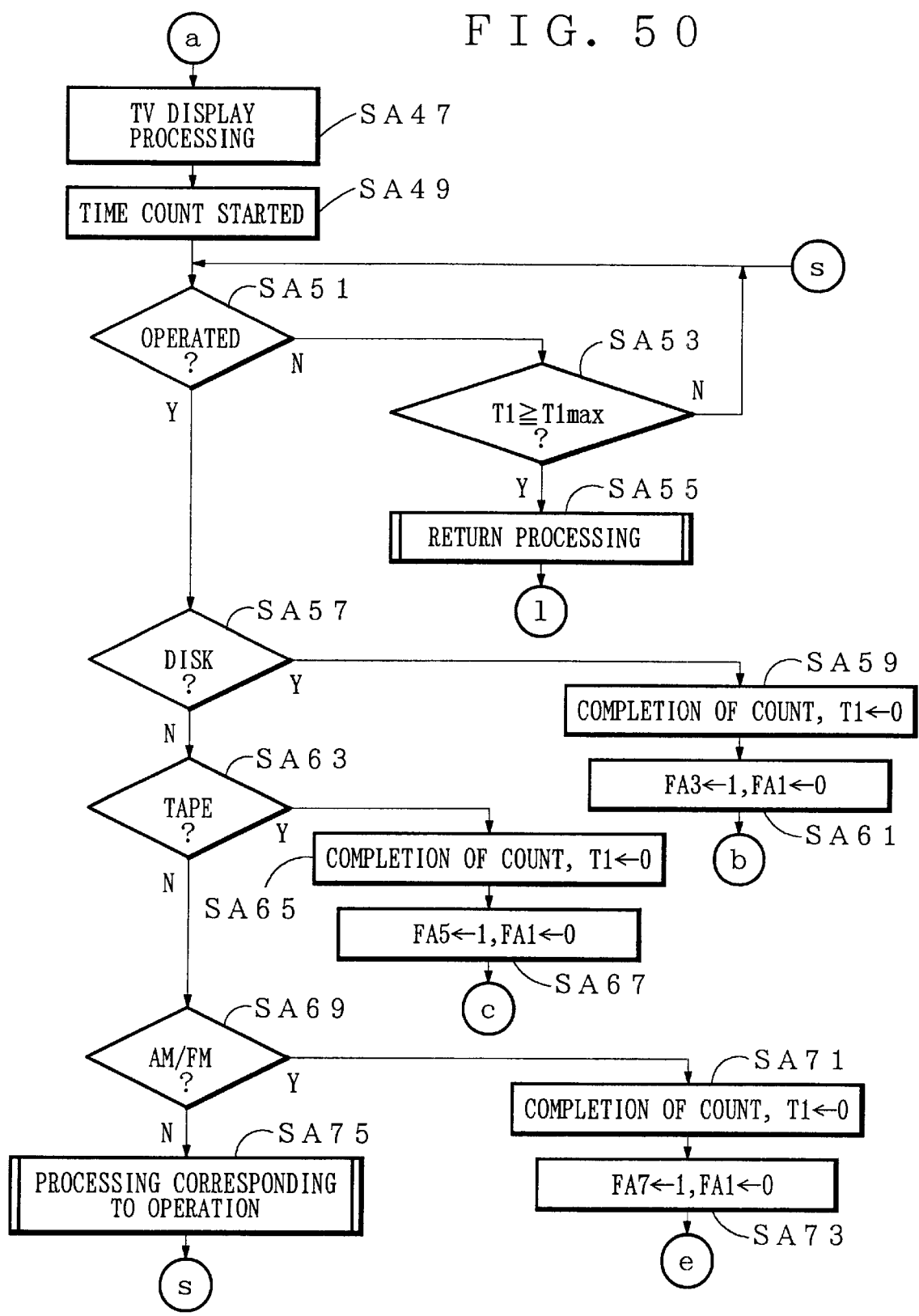

In step SA193, if YES, the processing returns to processing a (step SA47 in FIG. 50). If NO, the processing returns to processing e (step SA137 in FIG. 53).

In step SA 195, whether or not the operation button 15d allotted for instructing return to the previous screen has been pressed is verified. If NO, the display at the pressed operation button in the preset tuning mode on the liquid display 15j is updated as a crosshatched inverted display whereas the non-pressed remaining operation buttons are updated as an on-white normal display. In this case, which of the operation buttons 15a–15c and 15e–15g has been pressed is verified on the basis of the outputs from the limit switches 16a–16c and 16e–16g (step SA197).

The timer value T1 is reset to zero (step SA199). The processing returns to step SA187.

In step SA195, if YES, the time counting by the timer is completed and the timer value T1 is reset to zero (step SA203). Whether or not the TV flag FA1 is "0" is verified (step SA205). If YES, the processing returns to processing a (SA47 in FIG. 50). If NO, the processing returns to processing e (step SA137 in FIG. 53).

As seen from FIG. 55, in step SA207 coming from step SA181 in FIG. 53, presetting operation display processing display processing will be made. Namely, the presetting operation mode screen is displayed on the liquid crystal display 15j.

In step SA209, time counting is started in the timer area in RAM 31b. Subsequently, whether or not any of the operation buttons 15a–15h has been pressed is verified on the basis of the outputs from the limit switches 16a–16h (step SA211).

In step SA211, if YES, the processing proceeds to step SA219 described later. If NO, whether or not the timer value T1 has reached a prescribed time-up value $T1_{MAX}$ is verified (step SA213).

If NO, the processing returns to step SA211. If YES, the time-counting by the timer is completed, and the timer value T1 is reset to zero (step SA215). Subsequently, whether or not the TV flag FA1 is "0" or not is verified (step SA217).

In step SA217, if YES, the processing returns to processing a (step SA47 in FIG. 50). If NO, the processing returns to processing e (step SA137 in FIG. 53).

In step SA 219, whether or not the operation button 15*h* allotted for auto-presetting has been pressed is verified. If YES, the auto-presetting operation is performed (step SA221). The display on the liquid crystal display 15*j* is updated so that the frequency or channel preset by the auto-presetting operation is displayed at the operation buttons 15*a*–15*c* and 15*e*–15*g* (step SA223)(see FIG. 41).

In step SA219, if NO, whether or not the operation button 15*d* allotted for instructing return to the previous screen has been pressed is verified (step SA227). If NO, the display at the pressed operation button in the presetting tuning mode on the liquid display 15*j* is updated as a crosshatched inverted display with a newly preset frequency and channel, whereas the non-pressed remaining operation buttons are updated as on-white normal display. In this case, which of the operation buttons 15*a*–15*c* and 15*e*–15*g* has been pressed is verified on the basis of the outputs from the limit switches 16*a*–16*c* and 16*e*–16*g* (step SA229).

The timer value T1 is reset to zero (step SA231). The processing returns to step SA211.

In step SA227, if NO, the time counting by the timer is completed and the timer value T1 is reset to zero (step SA235). Whether or not the TV flag FA1 is "0" is verified (step SA237). If YES, the processing returns to processing a (SA47 in FIG. 50). If NO, the processing returns to processing e (step SA137 in FIG. 53).

Figure 56:
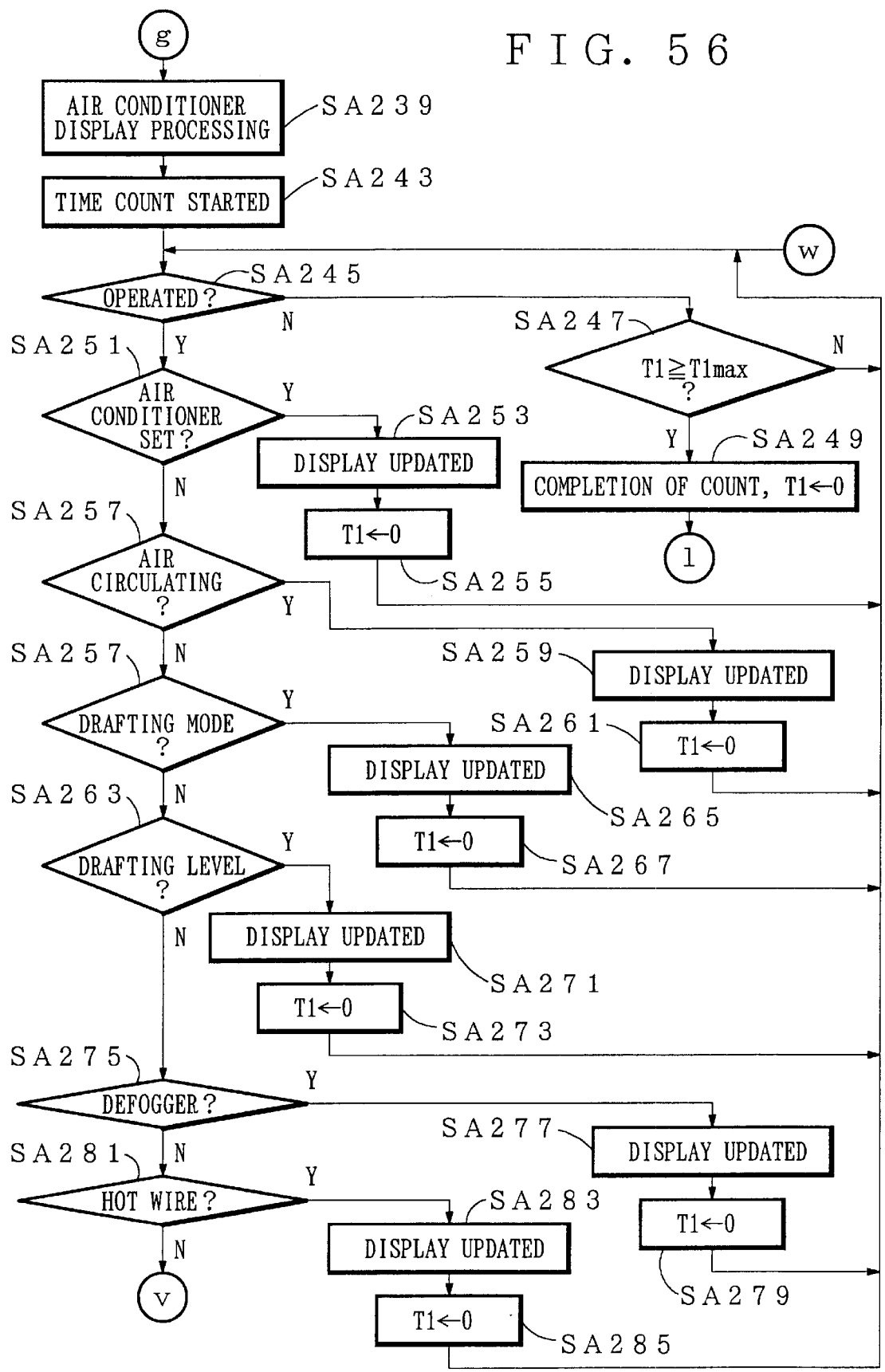

As seen from FIG. 56, in step SA239 coming from step SA31 in FIG. 48, air conditioner mode display processing will be made. Namely, the air conditioner mode screen is displayed on the liquid crystal display 15*j*.

In step SA243, time counting is started in the timer area in RAM 31*b*. Subsequently, whether or not any of the operation buttons 15*a*–15*h* has been pressed is verified on the basis of the outputs from the limit switches 16*a*–16*h* (step SA245).

In step SA245, if YES, the processing proceeds to step SA251 described later. If NO, whether or not the timer value T1 has reached a prescribed time-up value T1, is verified (step SA247).

In step SA247, if NO, the processing returns to step SA245. If YES, the time-counting by the timer is completed, and the timer value T1 is reset to zero (step SA249). The processing returns to processing 1 (step SA3 in FIG. 47).

In step SA251, whether or not any of the operation button 15*a* allotted for OFF setting of the air conditioner, operation button 15*b* allotted for manual ON setting thereof and operation button 15*c* allotted for automatic OFF setting thereof has been pressed is verified (see FIG. 42). If NO (none of these operation buttons has not pressed), the processing proceeds to step SA257 described later.

In step SA251, if YES, the air conditioner mode screen on the liquid crystal display 15*j* is updated so that the display at the pressed one of the operation buttons 15*a*–15*c* is changed from a crosshatched inverted display to an on-white normal display, and vice versa (step SA253). The time value T1 is reset to zero (step SA255). The processing returns to step SA245.

In step SA257, whether or not the operation button 15*d* allotted for switching of the air circulating mode has been pressed is verified. If NO, the processing proceeds to step SA263 described later.

In step SA257, if YES, the air conditioner mode screen on the liquid crystal display 15*j* is updated so that the display at the operation button 15*d* is changed from one of the symbols of air circulating and air ventilating to the other thereof (step SA259). The time value T1 is reset to zero (step SA261). The processing returns to step SA245.

In step SA263, whether or not the operation button 15*g* allotted for switching of the drafting mode has been pressed is verified. If not, the processing proceeds to step SA269.

In step SA263, if YES, the air conditioner mode screen on the liquid crystal display 15*j* is updated in accordance with the switching of the drafting mode by the operation button 15*g*. The timer value T1 is reset to zero (step SA267). The processing returns to step SA245.

In step SA269, whether or not the operation button 15*h* (FIG. 42) allotted for changing the drafting level has been pressed is verified. If NO, the processing proceeds to step SA275 described later.

In step SA269, if YES, the air conditioner mode screen on the liquid crystal display 15*j* is updated so that the display at the operation button 15*h* is changed according to changing of the drafting level by the operation button 15*h*. The timer value T1 is reset to zero (step SA273). The processing returns to step SA245.

In step SA275, whether or not the operation button 15*e* allotted for ON/OFF switching of the defogger has been pressed is verified. If NO, the processing proceeds to step SA281 described later.

In step SA281, if YES, the air conditioner mode screen on the liquid crystal display 15*j* is updated so that the display at the operation button 15*f* is changed from a crosshatched inverted display to an on-white normal display, and vice versa (step SA283). The time value T1 is reset to zero (step SA285). The processing returns to step SA245.

Figure 57:
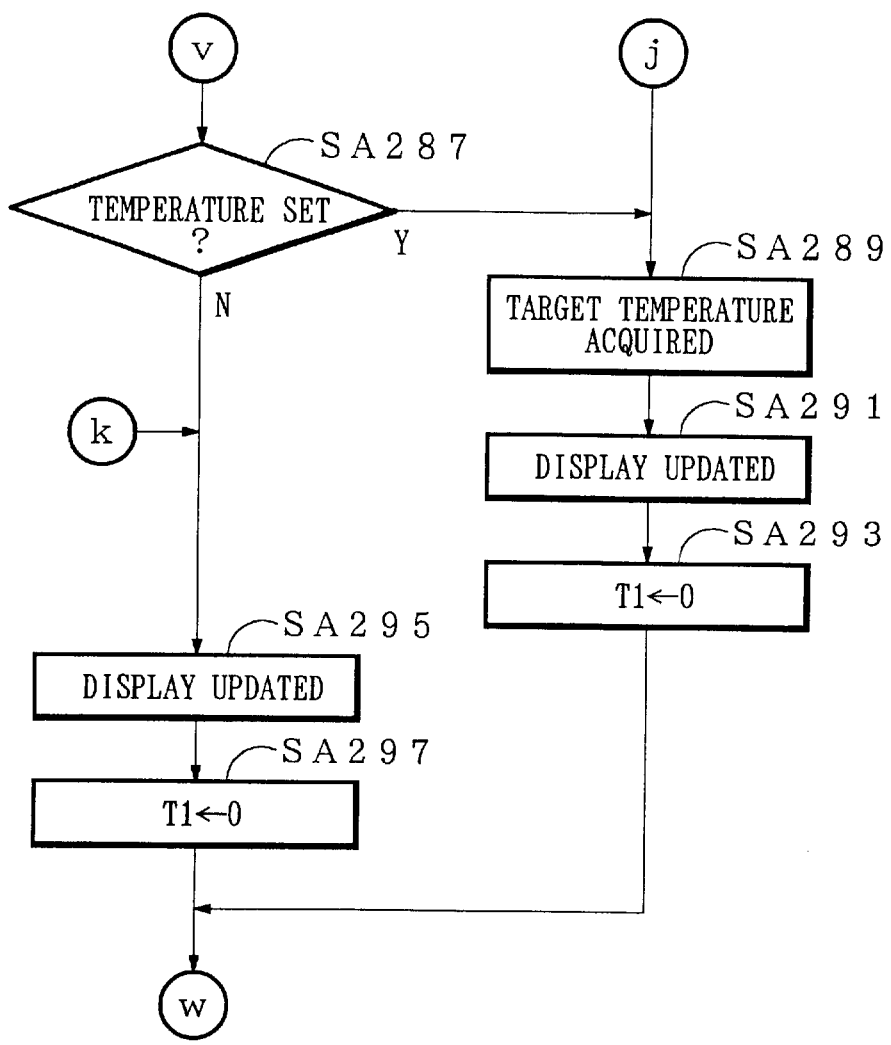

In step SA287, as seen from FIG. 57, whether or not the temperature setting knob 27 has been rotated or the operation button 15*b* or 15*c* has been pressed is verified on the basis of the outputs from the temperature setting switch 27*a* and limit switches 16*b* and 16*c*. If NO (i.e. none of them has not been pressed), the processing proceeds to step SA295. If YES (either one of them has been operated), the processing proceeds to step SA289.

In step SA289 (which also comes from step SA37 in FIG. 47), the setting value of a target temperature changed on the basis of the outputs from the temperature setting switch 27*a* and the limit switches 16*b* and 16*c* is acquired. On the liquid crystal display 15*j*, the display at operation buttons 15*b*–15*d* is updated to represent the setting value acquired of the target temperature (step SA291). The timer value T1 is reset to zero (step SA293). The processing returns to step SA245.

In step SA295 which also comes from step SA39 in FIG. 47, on the liquid crystal display 15*j*, the display at the operation button 15*a* is updated in the cycle of "driver's seat", "interlock", "passenger's seat", "driver's seat" . . . On the liquid crystal display 15*k* also, the inverted crosshatched display at the seat setting operation button 28 is updated to change in the cycle of "driver seat", "interlock", "passenger's seat", "driver's seat", . . . (FIGS. 43–45). Thereafter, the timer value T1 is reset to zero (step SA297). The processing proceeds to step SA245.

Figure 52:
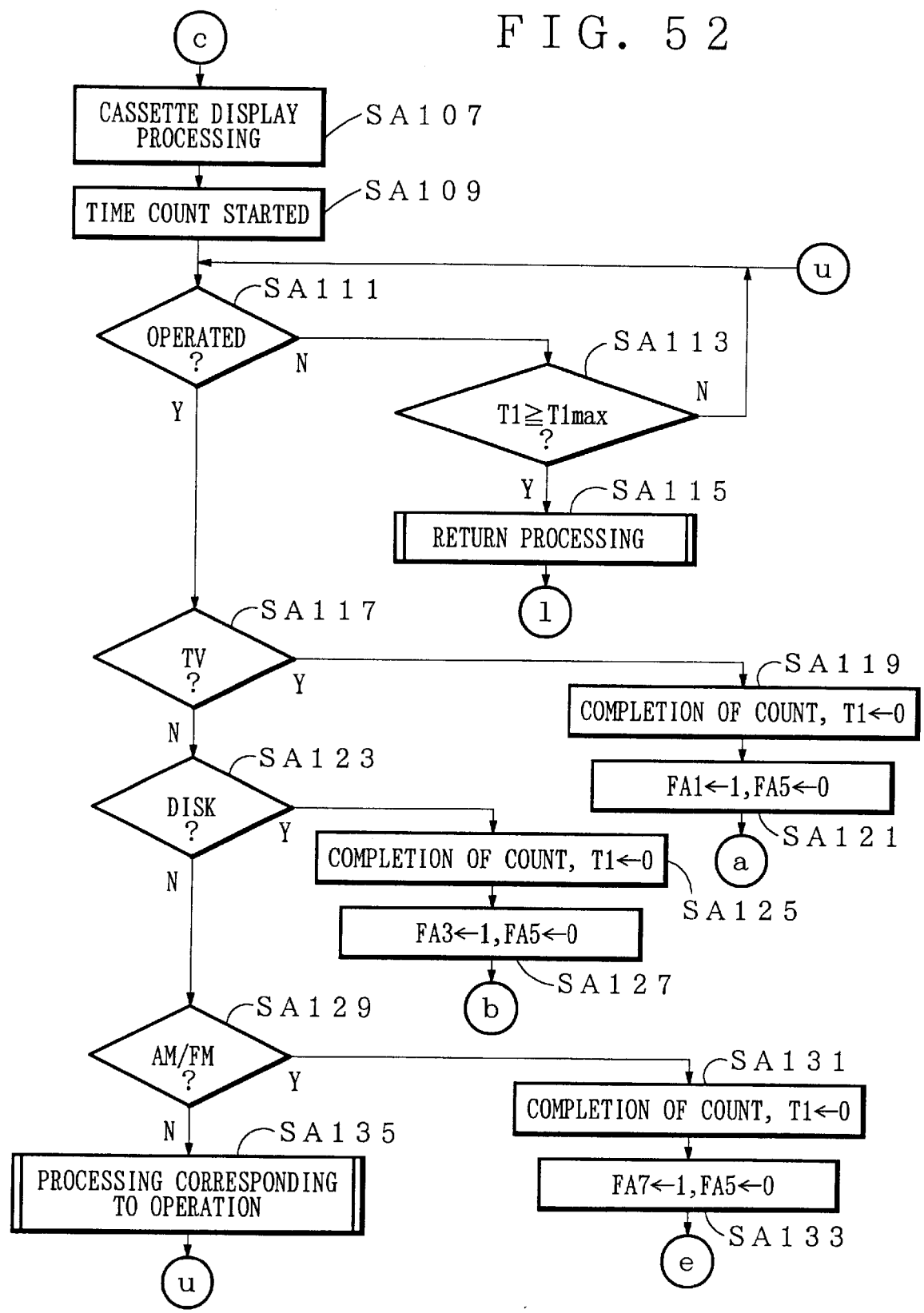

As understood from the description hitherto made, in connection to the second embodiment, steps SA35–SA39 in FIG. 47, SA41–SA45 in FIG. 49, SA47 in FIG. 50, SA77 in FIG. 51, SA107 in FIG. 52, and SA289, SA291, SA295 in FIG. 57 are generally referred to as the display changing means 33A defined in claims.

In connection with the second embodiment, the volume knob 27, temperature setting knob 27, seat setting operation button 28, operation buttons 15b and 15c with "+" and "−" in the TV mode display state and AM/FM mode display state and operation button 15d with "presetting operation" are generally referred to as an operation button λ for changing setting defined in claims.

An explanation will be given of the operation of the multi-function switch 30A according to the second embodiment.

When the accessory switch of a motor vehicle is turned on, the default mode screen is displayed on the liquid crystal display 15j. As a result, the multi-switch section 15A falls into a default mode displayed state where the characters and symbol marks indicative of objects to be selected, such as "TV", "DISK", "TAPE", "AM/FM", defogger, hot wire rear window, air conditioner and traffic information are viewed at the operation buttons 15a–15h as shown in FIG. 39.

In this default mode displayed condition, at the seat setting operation button 28, "driver's seat", "interlock" and "passenger's seat" are viewed, and only the character being selected at present is viewed as an inverted as a crosshatched inverted display.

In the default mode display state of the multi-switch section 15A, when operation button 15a with "TV" viewed is pressed, the display on the liquid crystal display 15j is changed from the default mode screen into the TV mode screen so that the multi-switch section 15A falls into the TV mode displayed state.

In the default mode display state of the multi-switch section 15A, when operation button 15b with "DISC" viewed is pressed, the display on the liquid crystal display 15j is changed from the default mode screen into the disc mode screen so that the multi-switch section 15A falls into the disc mode displayed state.

In the default mode display state of the multi-switch section 15A, when operation button 15c with "TAPE" viewed is pressed, the display on the liquid crystal display 15j is changed from the default mode screen into the cassette mode screen so that the multi-switch section 15A falls into the cassette mode displayed state.

In the default mode display state of the multi-switch section 15A, when operation button 15d with "AM/FM" viewed is pressed, the display on the liquid crystal display 15j is changed from the default mode screen to the AM/FM radio mode screen so that the multi-switch section 15A falls into the AM/FM radio mode displayed state as shown in FIG. 40.

Further, when the volume knob 25 is operated, regardless of the mode displayed state of the multi-switch section 15A, the display of the liquid display 15j is changed from the screen of the present mode into the latest screen of the TV mode, disc mode, cassette mode, and AM/FM mode before it returns to the default mode screen. Thus, the multi-switch section 15A returns to the next previous mode displayed state.

In the TV mode or AM/FM radio displayed state of the multi-switch section 15A, when the receiving frequency or station is increased or decreased by operating the operation buttons 15b and 15c, the corresponding frequency or station is viewed at these operation buttons. In addition, when the operation button 15d is pressed, the display of the liquid crystal display 15j is changed into the TV mode screen or AM/FM radio mode screen into the presetting operation mode. Thus, the multi-switch section 15A falls into the presetting mode displayed state as shown in FIG. 41.

Figure 58:
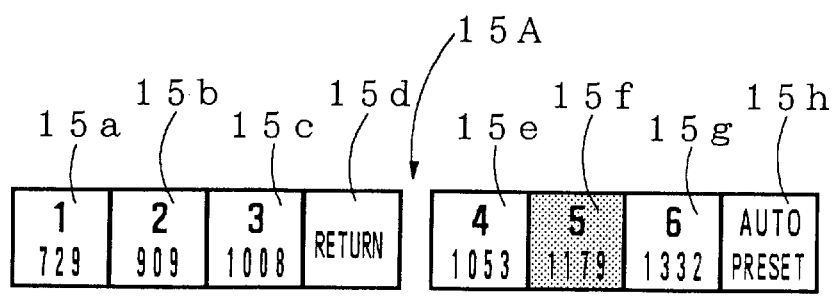
FIGS. 58 to 60 are views showing an example of the display state of a preset operation mode by the multi-switch section in FIG. 39, respectively.
Figure 59:
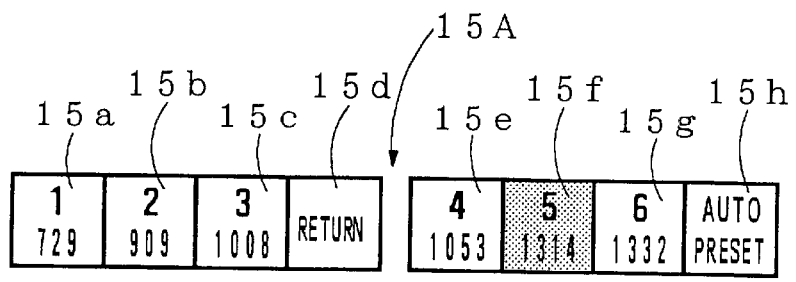

In this state, when any one of the operation buttons 15a–15c and 15e–15g is pressed, the pressed operation button is viewed as a crosshatched display like the operation button 15f in FIG. 58. Further, as shown in FIG. 59, the display at the pressed operation button is changed into the receiving frequency or station set in the next previous TV mode or AM/FM mode displayed state.

Figure 60:
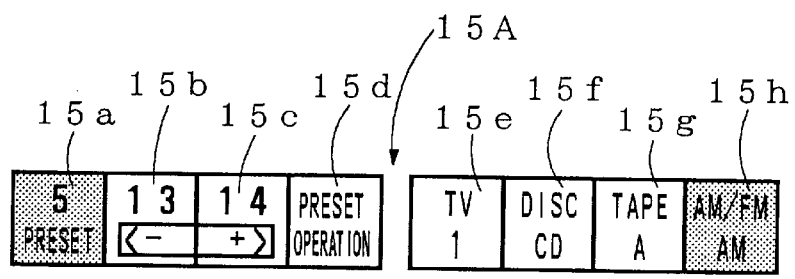

Thereafter, when the multi-switch section 15A returns to the previous mode displayed state, as shown in FIG. 60, the fact of the new presetting is displayed like "PRESET" at the operation button 15a.

In the TV mode displayed state or AM/FM radio mode displayed state, when the operation button 15a is pressed, the display of the liquid crystal display 15j is changed from the TV mode or AM/FM radio mode screen into the preset tuning screen. Thus, the multi-switch section 15A falls into the preset tuning mode displayed state.

In the presetting operation mode displayed state or preset tuning mode displayed state, when the operation button 15d with "return" viewed is pressed, the display of the liquid crystal display 15j returns to the next previous mode displayed state of these mode displayed screens. Thus, the multi-switch section 15A returns to the next previous mode displayed state of these mode screens.

In the presetting operation mode displayed state, when the operation button 15h with "AUTO PRESET" is pressed, auto-presetting is executed so that the receiving frequency or receiving station viewed at the operation buttons 15a–15c and 15e–15g is changed into the contents automatically preset by auto-presetting.

In the default mode display state of the multi-switch section 15A, when the operation button 15h with the symbol of the air conditioner viewed is pressed, the display of the liquid crystal display 15j is changed from the default mode screen into the air conditioner mode screen. Thus, the multi-switch section 15A falls into the air conditioner display state where the symbols of "OFF", "A/C", "AUTO", "air circulating mode", "defogger" "hot wire rear window heater", "wind drafting mode" and "wind drafting level mode" are viewed at the operation buttons 15a–15h as shown in FIG. 42.

In the default mode displayed state of the multi-switch 15A, when the operation button 15e with "defogger", 15f with "hot wire rear window heater" and 15f with "traffic information" are pressed, the display at each of these operation buttons is changed in the same manner as in the first embodiment.

Further, in the air conditioner mode displayed state of the multi-switch section 15A, when the operation buttons 15d–15h with "air circulating mode", "defogger", "hot wire rear window heater", "wind drafting mode" and "wind drafting level" are pressed, the display at each of these operation buttons is changed in the same manner as in the first embodiment.

In the switch device 30A according to this embodiment, when the temperature setting knob 27 or seat setting operation button 28 is pressed, regardless of the mode displayed state of the multi-switch section 15A, the display of the liquid crystal display 15j is changed into the room temperature adjusting mode screen as shown in FIG. 43. Thus, the multi-switch 15A falls into the room temperature adjusting mode displayed state.

In the room temperature adjusting mode displayed state of the multi-switch section 15A, when the temperature setting knob 27 is rotated, the indication of the setting temperature viewed at the operation buttons 15b–15d is increased or decreased in accordance with the direction and degree of rotation. When the seat setting operation button 28 or the operation button 15*a* is pressed, in accordance with the number of times of pressing, the character of the temperature adjusting area viewed at the operation button 15*a* changes in the cycle of "driver's seat" in FIG. 43, "interlock" in FIG. 44A, "passenger's seat" in FIG. 45A, "driver's seat" . . .

In accordance with the change in the character at the operation button 15*a*, the crosshatched inverted display viewed at the seat setting operation button 28 also changes in the cycle of "driver's seat" in FIG. 43, "interlock" in FIG. 44B, "passenger's seat" in FIG. 45B, "driver's seat" . . .

In the other state than the default mode of the multi-switch section 15A, if the operation buttons 15*a*–15*h*, volume knob 25, temperature setting knob 27 and seat setting knob 28 are not operated until a predetermined time T1max elapses, the display of the liquid crystal display 15*j* is changes into the default mode screen. Thus, the multi-switch 15A falls into the default mode displayed state.

In accordance with the second embodiment also, without increasing the number of the operation buttons dedicated to the appliance and the operations (function)thereof, the multi-function of each operation button and reduction in the space occupied by the operation buttons can be realized simultaneously.

As described above, in the switch device according to the second embodiment, when the volume knob 25 is operated, regardless of the mode displayed state of the multi-switch section 15A, the multi-switch section 15A is changed from the present mode into the latest mode of the TV mode, disc mode, cassette mode, and AM/FM mode, which are relative to the volume knob 25, before it returns to the default mode. Further, when the temperature setting knob 27 or seat setting operation button 28 is pressed, regardless of the mode displayed state of the multi-switch section 15A, the multi-switch section 15A is changed into the room temperature adjusting mode relative to setting of the temperature of the air conditioner 70 and temperature adjusting area. For this reason, the operation for changing the multi-switch section 15A into the mode displayed state relative to the volume knob or temperature setting knob and seat setting knob can be omitted.

In the second embodiment, in the presetting operation mode displayed state or preset tuning displayed mode, the preset receiving frequency and receiving station is viewed at each of the operation buttons 15*a*–15*c* and 15*e*–15*g*. However, as shown in FIG. 61, "PRESET", receiving frequency/station with "+" and "−" may be viewed at the operation buttons 15*a*–15*c* like the TV mode or AM/FM radio mode, whereas a candidate of the preset station may be viewed at only each of the operation buttons 15*e*–15*h*.

Figure 61:
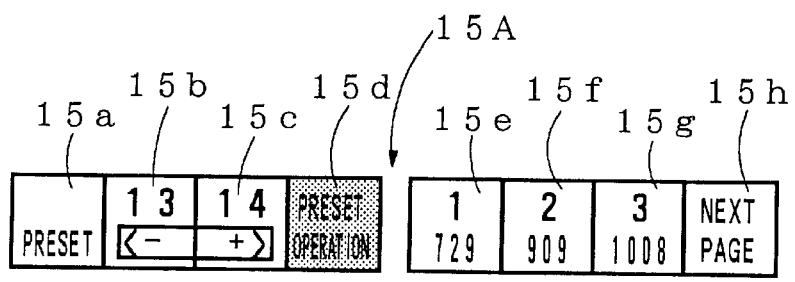
FIGS. 61 to 62 are views showing another example of the display state of a preset operation mode by the multi-switch section in FIG. 39, respectively.
Figure 62:
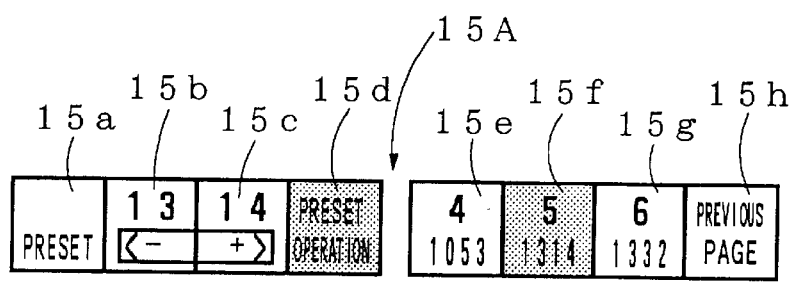

In this case, in order to compensate for the reduction of the number of the operation buttons where the candidates for the preset stations are viewed, the presetting operation mode displayed screen or preset tuning mode displayed screen on the liquid crystal display 15*j* is updated so that as shown in FIG. 61, "next page" is viewed in place of "AUTO PRESET" at the operation button 15*h*, and as seen from FIG. 62, in a state where next candidates for the preset stations can be viewed at the operation buttons 15*e*–15*g*, the character at the operation button 15*h* is changed from "next page" to "previous page".

Figure 54:
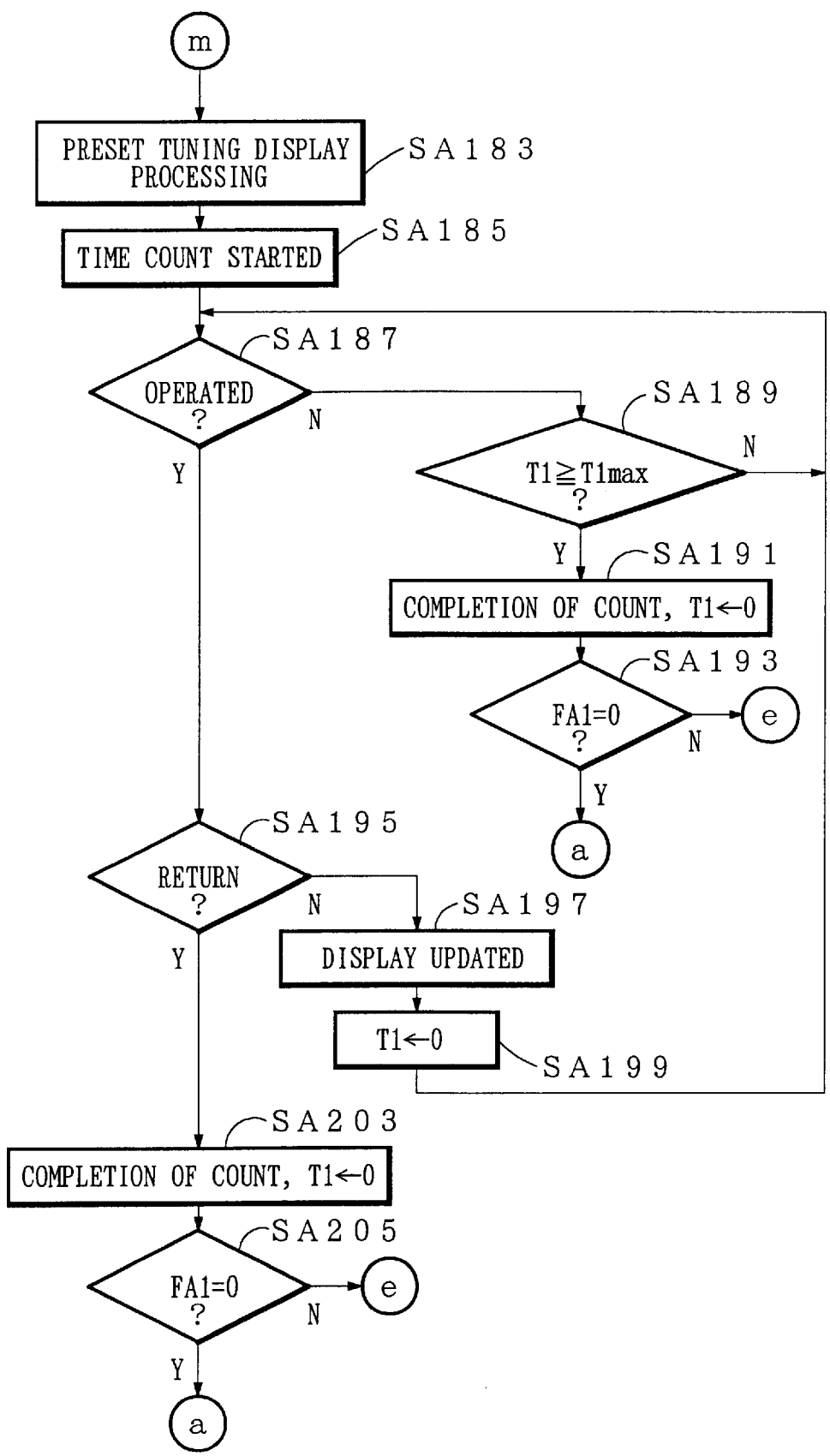
Figure 55:
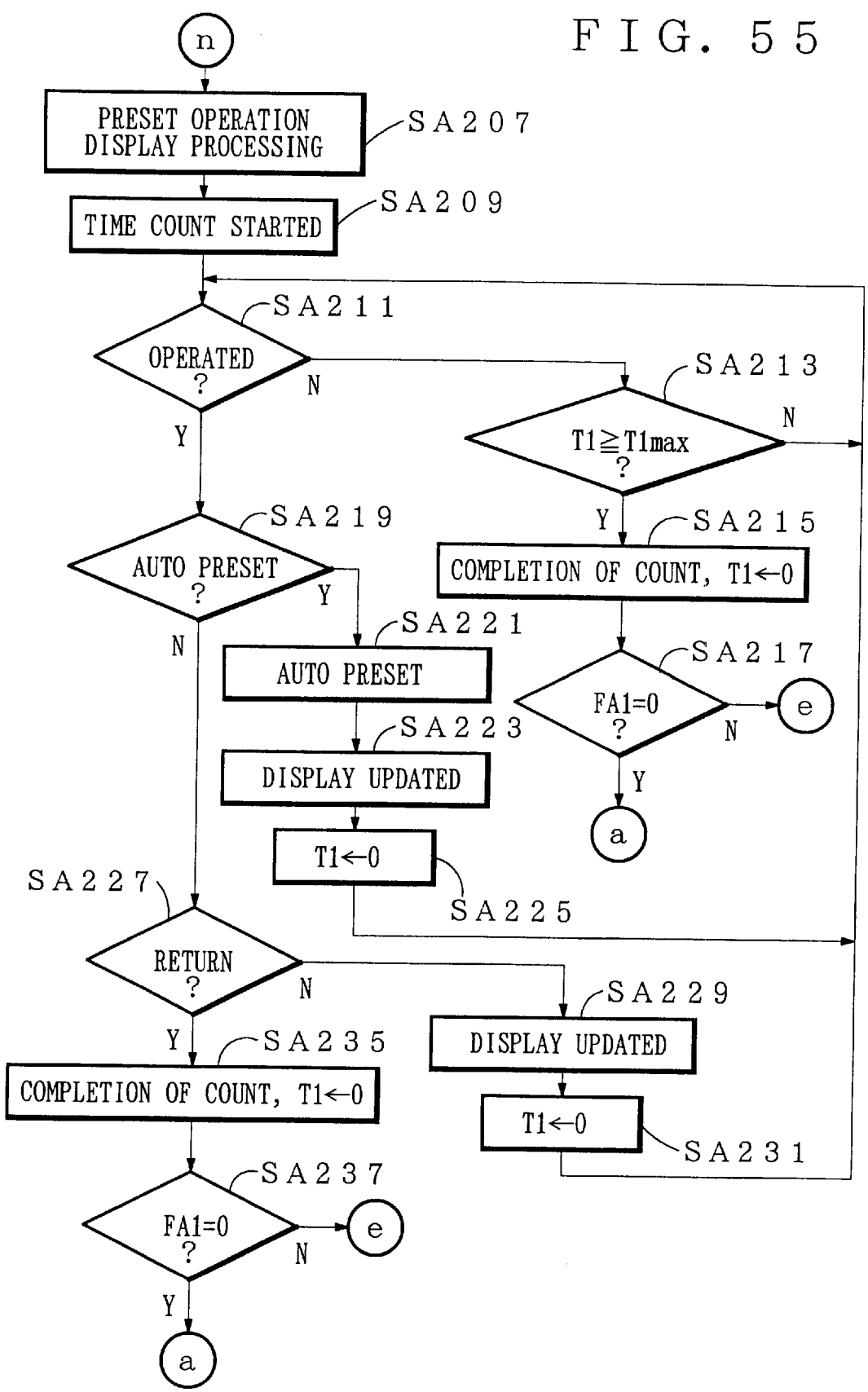
Figure 63:
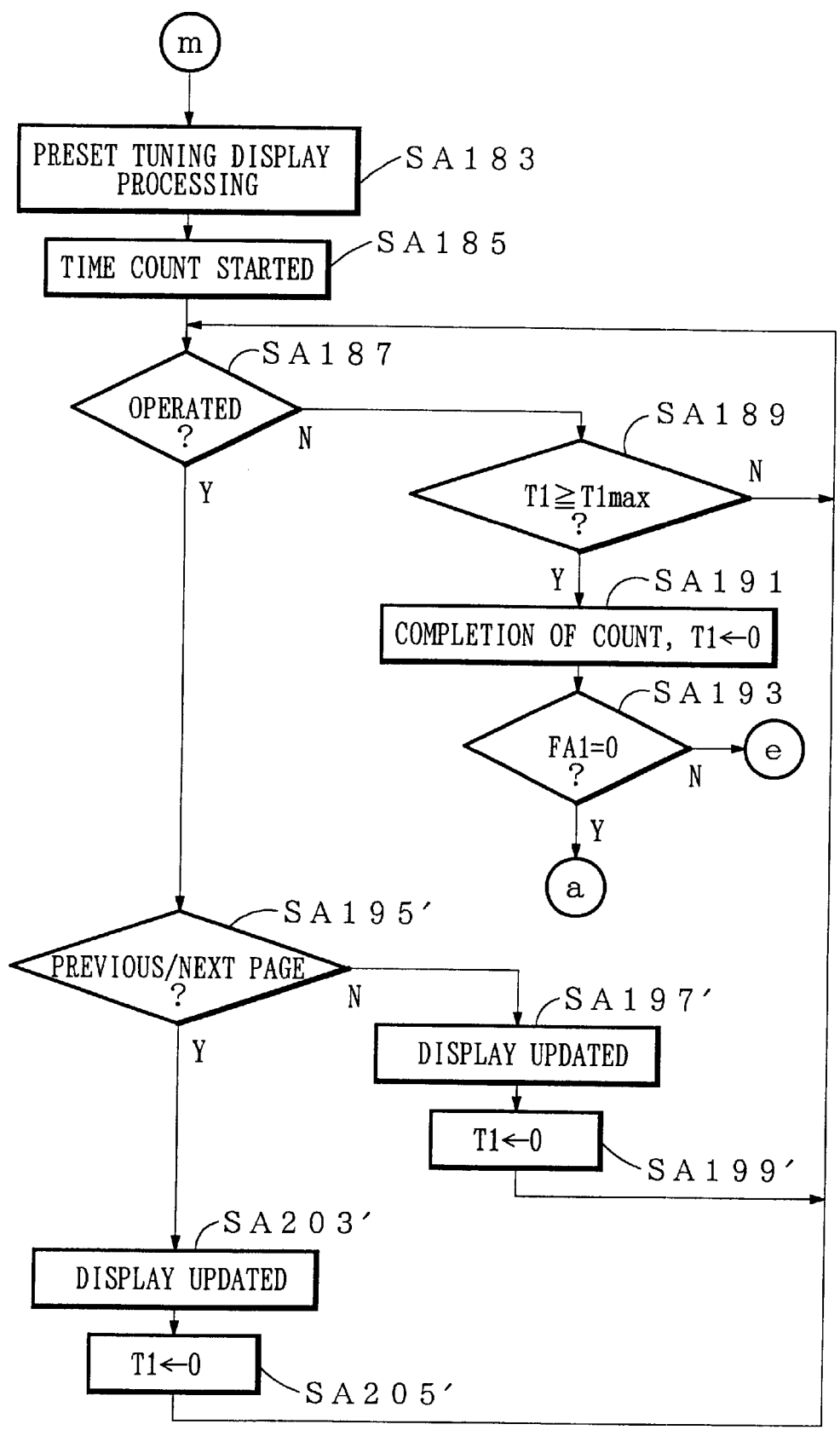
FIGS. 63 and 64 are flowcharts showing the main part of the processing which is performed by a CPU in accordance with the control program stored in an ROM of a microcomputer in FIG. 46, which is used to realize the preset operation mode display state in FIG. 62.
Figure 64:
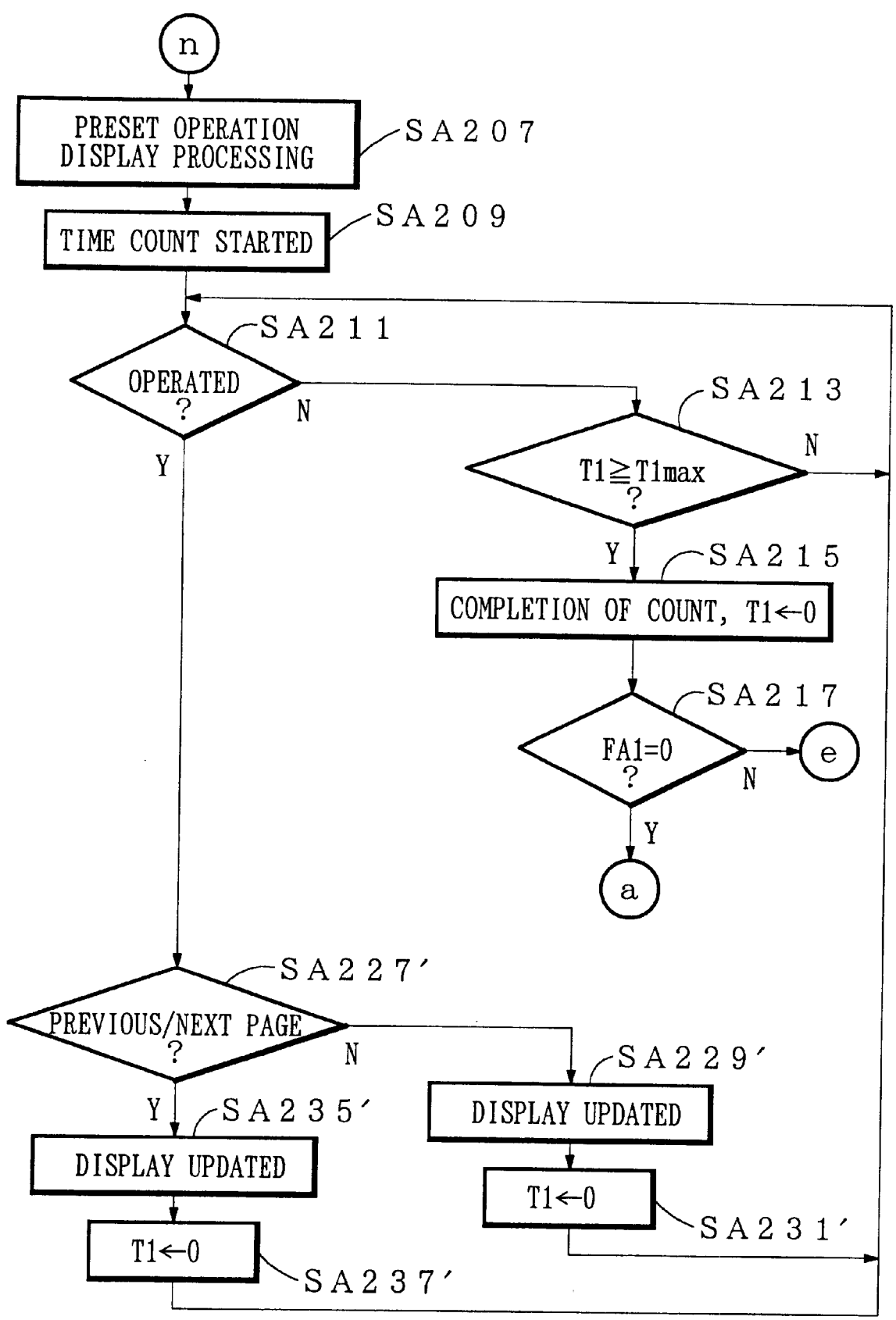

Such a configuration can be implemented in such a manner that the steps SA195–SA205 in FIG. 54 are replaced by steps SA195'–SA295' in FIG. 63, and steps SA219–SA237 in FIG. 55 are replaced by steps SA227–SA237' in FIG. 64.

An explanation will be given of the above process of SA1951'–SA205 in FIG. 63.

As seen from FIG. 63, in step SA187, whether or not any of the operation buttons 15*e*–15*g* has been pressed is verified. If YES, whether or not the operation button 15*h* allotted for exchange between "previous page" and "next page" has been pressed is verified (step SA195'). In step SA195', if NO, the preset tuning mode screen on the liquid crystal display 15*j* is updated so that the display at the pressed one of the 15*e*–15*g* is viewed as a crosshatched inverted display, and the display at the remaining operation buttons are viewed as a normal on-white display. In this case, which of the operation buttons 15*e*–15*g* has been pressed is discriminated on the basis of the outputs from the limit switches 16*e*–16*g* (step SA197').

After the timer value T1 is reset to zero (step SA199'), the processing returns to step SA187.

In step SA195', if YES, the preset tuning mode screen on the liquid crystal display 15*j* is updated so that the previous candidates of the preset stations viewed at the operation buttons 15*e*–15*g* are changed into the next ones, and the "next page" or "previous page" viewed at the operation button 15*h* is changed into the "previous page" or "next page", and vice versa (step SA203').

After the timer value T1 is reset to zero (step SA199'), the processing returns to step SA187.

An explanation will be given of the above process of SA211–SA225 in FIG. 64.

As seen from FIG. 64, in step SA211, whether or not any of the operation buttons 15*e*–15*g* has been pressed is verified. If YES, whether or not the operation button 15*h* allotted for exchange between "previous page" and "next page" has been pressed is verified (step SA227'). In step SA227', if NO, the presetting operation mode screen on the liquid crystal display 15*j* is updated so that the display at the pressed one of the 15*e*–15*g* is viewed as a crosshatched inverted display, and the display at the remaining operation buttons are viewed as a normal on-white display (step SA229'). In this case, which of the operation buttons 15*e*–15*g* has been pressed is discriminated on the basis of the outputs from the limit switches 16*e*–16*g*.

After the timer value T1 is reset to zero (step SA231'), the processing returns to step SA211.

In step SA227', if YES, the presetting operation mode on the liquid crystal display 15*j* is updated so that the previous candidates of the preset stations viewed at the operation buttons 15*e*–15*g* are changed into the next ones and the "next page" or "previous page" viewed at the operation button 15*h* is changed into the "previous page" or "next page", and vice versa (step SA235').

After the timer value T1 is reset to zero (step SA237'), the processing returns to step SA187.

In this way, in the presetting operation mode displayed state or preset tuning mode displayed state of the multi-switch section 15A, the presetting operation mode displayed screen or preset tuning mode displayed screen on the liquid crystal display 15*j* is updated so that as shown in FIG. 61, a candidate of the preset station is viewed at only each of the operation buttons 15*e*–15*h*, and "next page" is viewed in place of "AUTO PRESET" at the operation button 15*h*.

When the operation button 15*h* with "next page" viewed is pressed, the presetting operation mode display screen or preset tuning mode display screen on the liquid crystal display 15*j* is updated so that the candidates of the preset stations viewed at the operation buttons 15*e*–15*g* are changed into the next candidates of the preset stations and the "next page" viewed at the operation button 15h is changed into the "previous page".

When the operation button 15h with "previous page" viewed is pressed, the presetting operation mode display screen or preset tuning mode display screen on the liquid crystal display 15j is updated so that the candidates of the preset stations viewed at the operation buttons 15e–15g are restored to the previous ones and the "previous page" viewed at the operation button 15h is changed into the "next page".

Such a configuration also provide the same effect as the switch device 30A, and by operating the limited number of operation buttons 15e–15g, more candidates of the preset stations can be displayed on the multi-switch section 15A. Thus, the operation buttons 15a–15h can be effectively used.

Embodiment 3

Figure 65:
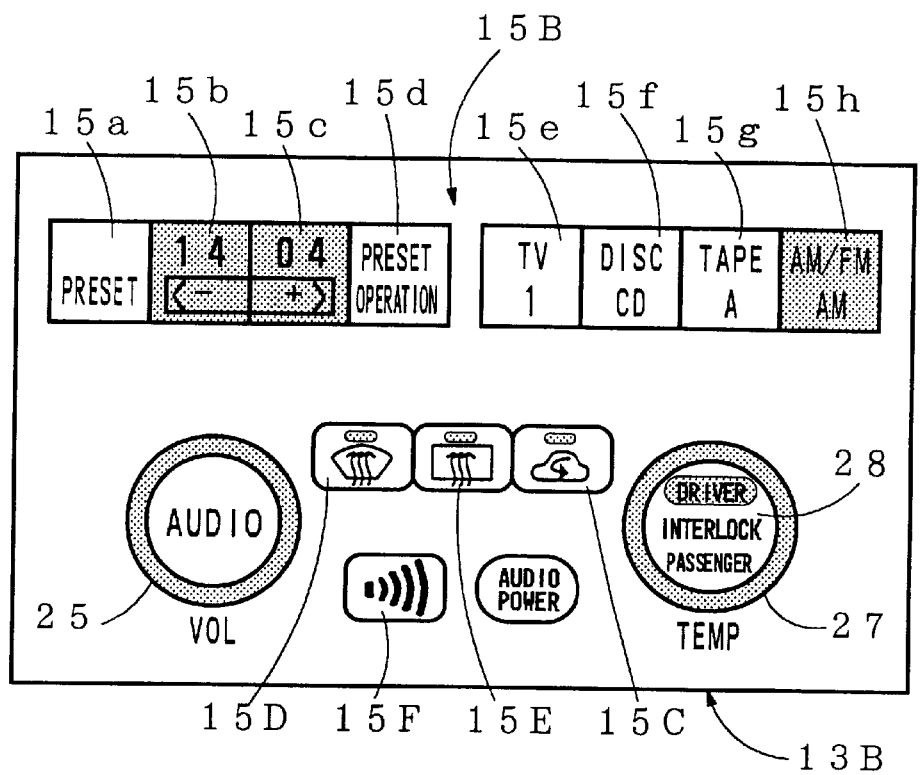
FIG. 65 is a front view of the main part of the switch device showing the state where an air conditioner mode display is made on the multi-switch section in FIG. 39.

In the first and second embodiments of the present invention, the functions of the air circulating mode, defogger, hot wire rear window heater, and traffic information were allotted to the operation buttons 15a–15h of the multi-switch section 15A as necessary. However, as seen from FIG. 65 which is a front view of the switch device according to the third embodiment, independently from the multi-switch section 15B on the combination panel 13B, the operation buttons for these functions (air circulating operation button 15E, defogger operation button 15D, hot wire rear window heater 15E, and traffic information operation button 15F) may be provided, whereas the remaining functions may be allotted to the operation buttons 15a–15h of the multi-switch section 15B.

Although not shown, in each of the first and the second embodiment, an optical sensor (not shown) for producing a signal corresponding to the brightness inside and outside a vehicle through a photoelectric converting element may be connected to the CPU 31a, 33a of the microcomputer 31, 33 so that the symbols at the operation buttons 15a–15h of the multi-switch sections 15, 15A, 15B can be wholly viewed as a white/black inverted display on the basis of the outputs from the optical sensor in the night time when the brightness is low.

In such a configuration, an interrupting routine is set during the control program stored in the ROM 31c, 33c which is executed by the CPU 31a, 33a of the microcomputer 31, 33.

Figure 66:
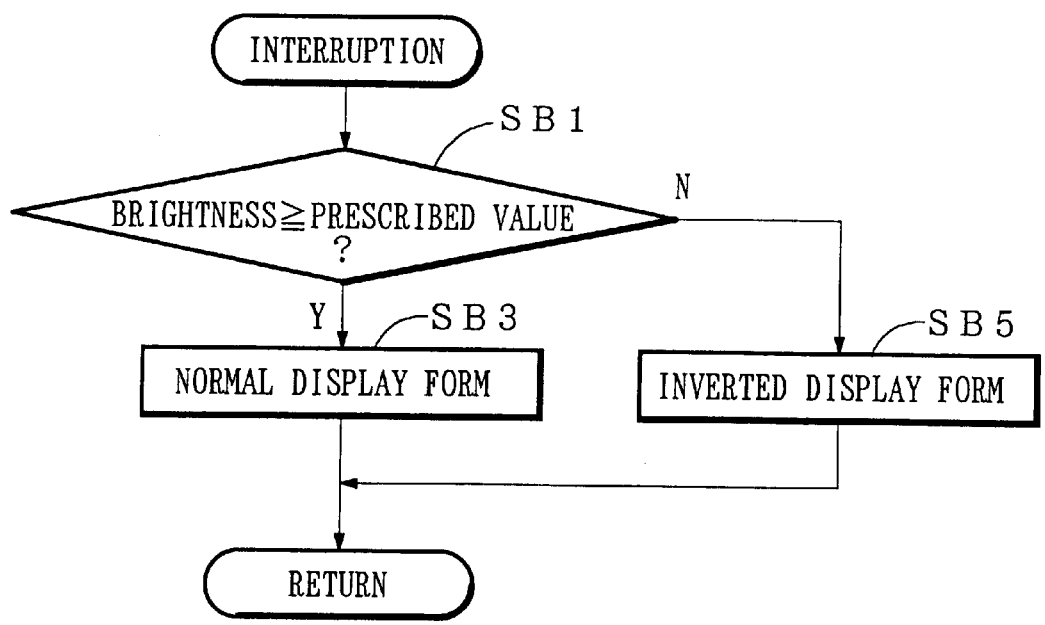
FIG. 66 is a flowchart showing interruption processing for exchanging the display of on a liquid crystal display on a multi-switch section between a normal display and an inverted display.

Specifically, as shown in the flowchart of FIG. 66, in step SB1, whether or not the brightness inside and outside a vehicle is not lower than a prescribed value is verified on the basis of the signal from the optical sensor (not shown). If YES, the display of the liquid crystal display 15j is located in a normal display state. Thereafter, the interrupting routine is completed. In step SB1, if NO, the display of the liquid crystal display 15j is located in a white/black inverted display state. Thereafter, the interrupting routine is completed.

Figure 67:
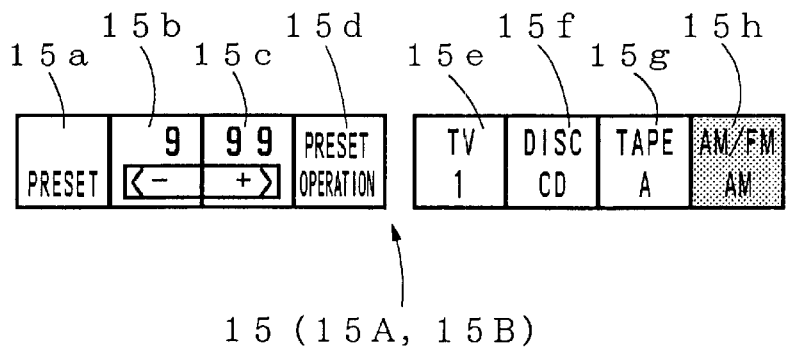
FIGS. 67 and 68 are views showing the normal display manner and inverted display manner on the liquid crystal display on the multi-switch section, respectively.
Figure 68:
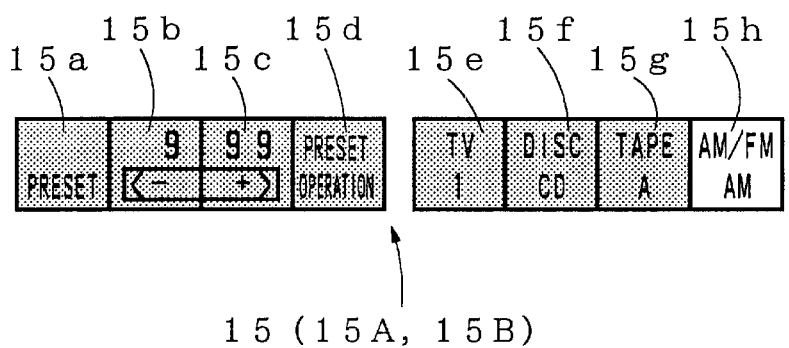

In this way, if the brightness inside or outside the vehicle is not lower than a prescribed value, as shown in FIG. 67, the display at the operation button now being selected is viewed as an crosshatched inverted display and the display at the remaining operation buttons are viewed as a normal on-white display. Inversely, if the brightness inside or outside the vehicle is than the prescribed value, as shown in FIG. 68, the display at the operation button now being selected is viewed as the normal on-white display whereas the display at the remaining operation buttons are viewed as the crosshatched inverted display.

In this case, the selecting means F defined in claims includes the optical sensor (not shown) and the CPU 31a, 33a for executing the interrupting routine in the flowchart of FIG. 66.

Such a configuration can always hold the visibility in each mode display of the multi-switch section 15, 15A, 15B in a preferable state even when the brightness inside or outside the vehicle is changed.

Exchange between the normal on-white display and the crosshatched inverted display by the liquid crystal display 15j may be made not only through the control by the microcomputer 31, 33 on the basis of the output from the optical sensor, but also through the mechanical ON/OFF control by a lamp switch for turning on or off a small lamp (not shown). The exchange may be executed not only in a single degree for each of dark and bright, but also stepwise in a plurality of degrees.

The explanation on each of the embodiments described hitherto was made in connection with the switch device which is arranged on the center console of a vehicle and used for selecting/setting the operation by the appliances and arranged on the center console of a vehicle. However, it is needless to say that the present invention can be also applied to a switch device which is used to select/set the operation of each of a plurality of object appliances using common operation buttons such as a collective setting device in indoor facilities.

Aspect II of the Invention

Embodiment 1

The first embodiment of this aspect can be realized in the air conditioner mode screen display in the first aspect (FIGS. 9, 11, 12 and FIGS. 35, 36).

Figure 69:
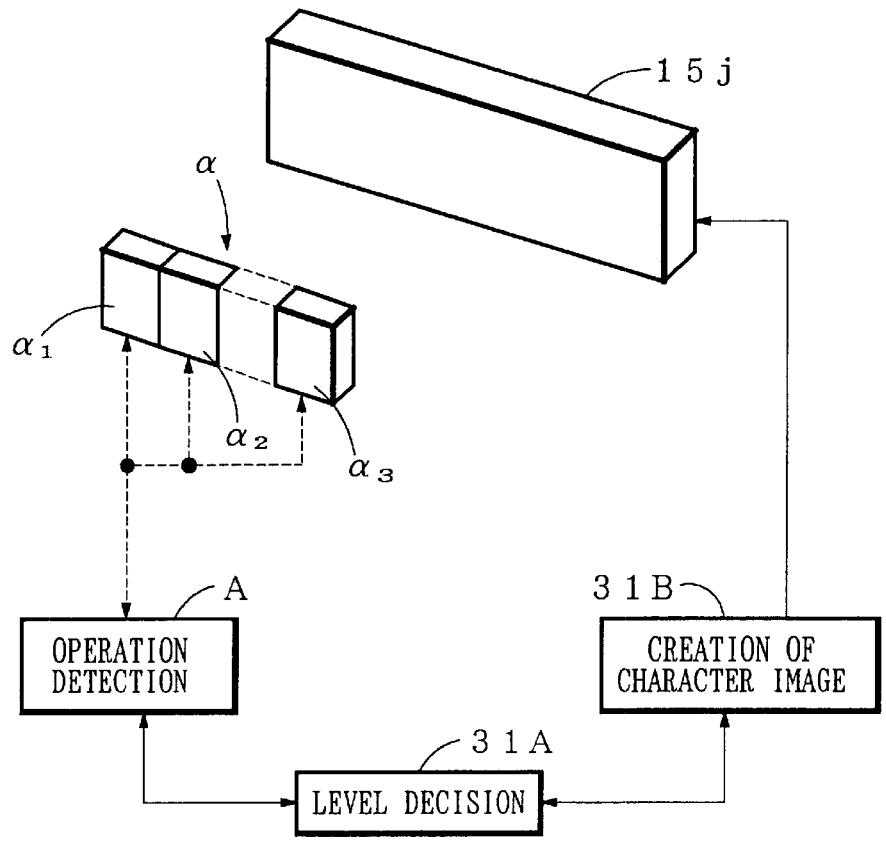
FIG. 69 is a block diagram of a basic configuration of the multi-function switch device according to the second aspect of the present invention.

The operation detecting means A shown in FIG. 69 and defined in claims corresponds to steps S217, S225 in the flow chart of FIG. 35 and step S253 in the flowchart of FIG. 36.

The step discriminating means 31A shown in FIG. 69 and defined in claims corresponds to steps S225, S227 in the flowchart of FIG. 35, steps S253, S255 and S263. The character image information creating means 31B shown in FIG. 69 and defined in claims corresponds to steps 253 and S263.

The object appliance defined in claims corresponds to an air conditioner 70. The display means defined in claims corresponds to a liquid crystal display 15j. The operation button defined in claims corresponds to the operation button 15g where the symbol of the drafting mode is viewed and operation button 15h where the symbol of the drafting level is viewed in the air conditioner mode displayed state on the multi-switch section 15 as shown in FIG. 8.

The character indicative of the operation of the object appliance in claims corresponds to the symbol indicative of the function of the drafting mode and drafting level.

The switch operation will be carried out by the same manner as that of the switch 30 in the first aspect.

In this embodiment, as described previously in connection with the air conditioner mode display, it should be noted that whenever the setting of the wind drafting mode viewed at the operation button 15g at the lower row is changed, its symbol mark changes in a sequence of six patterns of "no drafting", "only head", "both head and leg", "only leg" "only leg with defogger" and "head and leg with defogger" as indicated by arrows in FIG. 11.

In the air conditioner mode display, further, it should be noted that the setting of the wind drafting level viewed at the operation button 15h at the lower row is changed, its symbol mark changes in six levels from 0 to 5 (maximum) of the wind drafting amount as indicated by arrows in FIG. 12.

In this way, the stage of each of the drafting mode and drafting level in the air conditioner 70 can be known from the symbol mark thereof viewed at the operation buttons 15g and 15h so that their stepwise setting can be made using these operation buttons 15g and 15h which are also used for setting the operation of each of the other appliances in the display mode states other than the air conditioner mode displayed state of the multi-switch section 15. This permits the operation buttons 15 to be used in a multi-function manner.

Embodiment 2

In the first embodiment, the present set stage of each of the drafting mode and drafting level was viewed at the individual operation button 15g and 15h. However, it may be viewed at both operation buttons in this embodiment.

Figure 38:
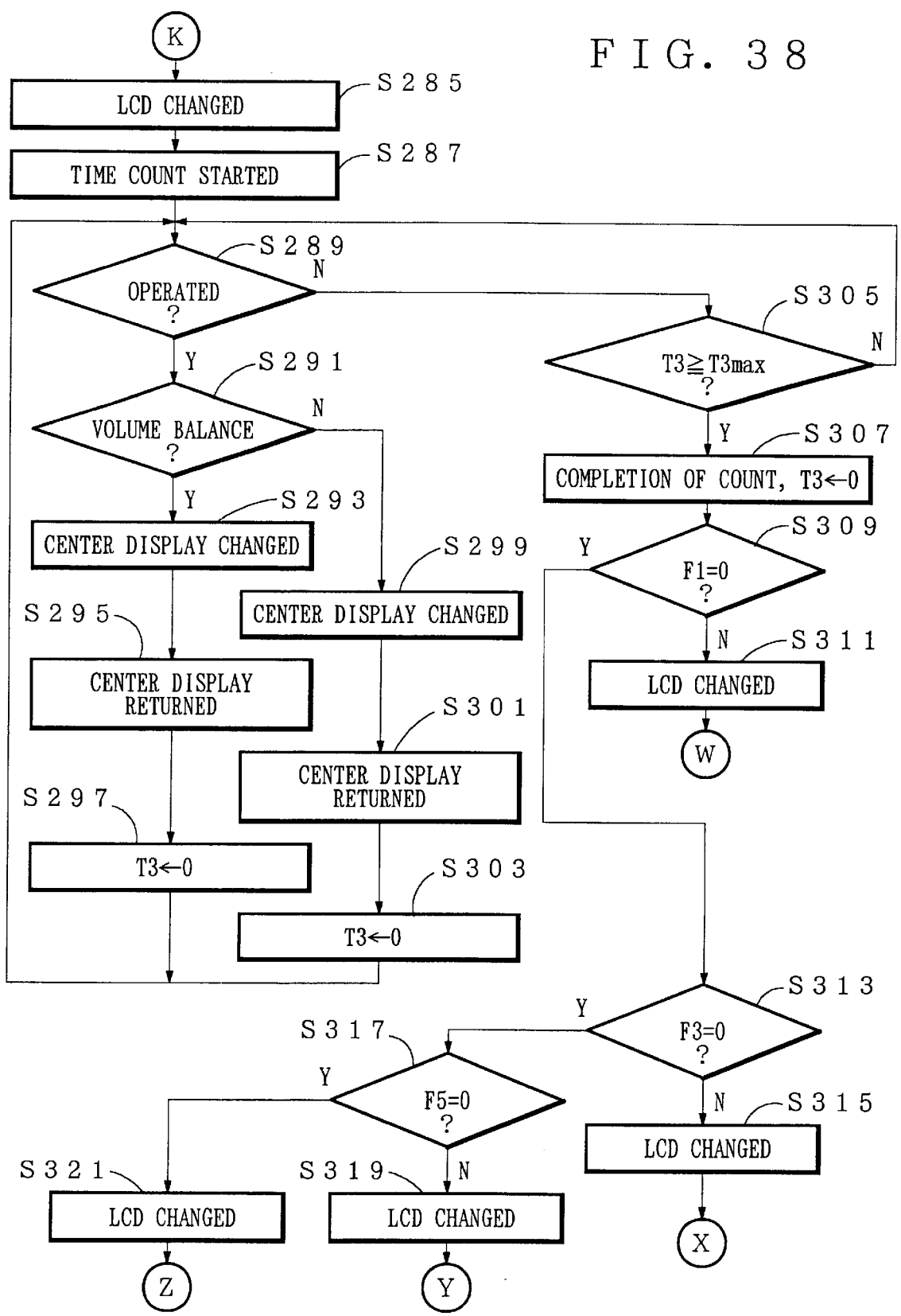

FIG. 38 shows the displayed state on the multi-switch section 15 according to this embodiment. As seen from FIG. 38, the present set stage of the drafting level of the air conditioner 70 is wholly viewed at both operation buttons 15g and 15h.

More specifically, at the operation button 15g, a left arrow, "−" and left half of the drafting level are viewed, whereas at the operation button 15h, a right arrow, "+" and right half of the drafting level are viewed.

Referring to the flowchart of FIGS. 71–73, an explanation will be given of the processing of displaying the drafting level of the air conditioner on the liquid crystal display 15j which is carried out according to the control program by the micro-computer 31.

Figure 71:
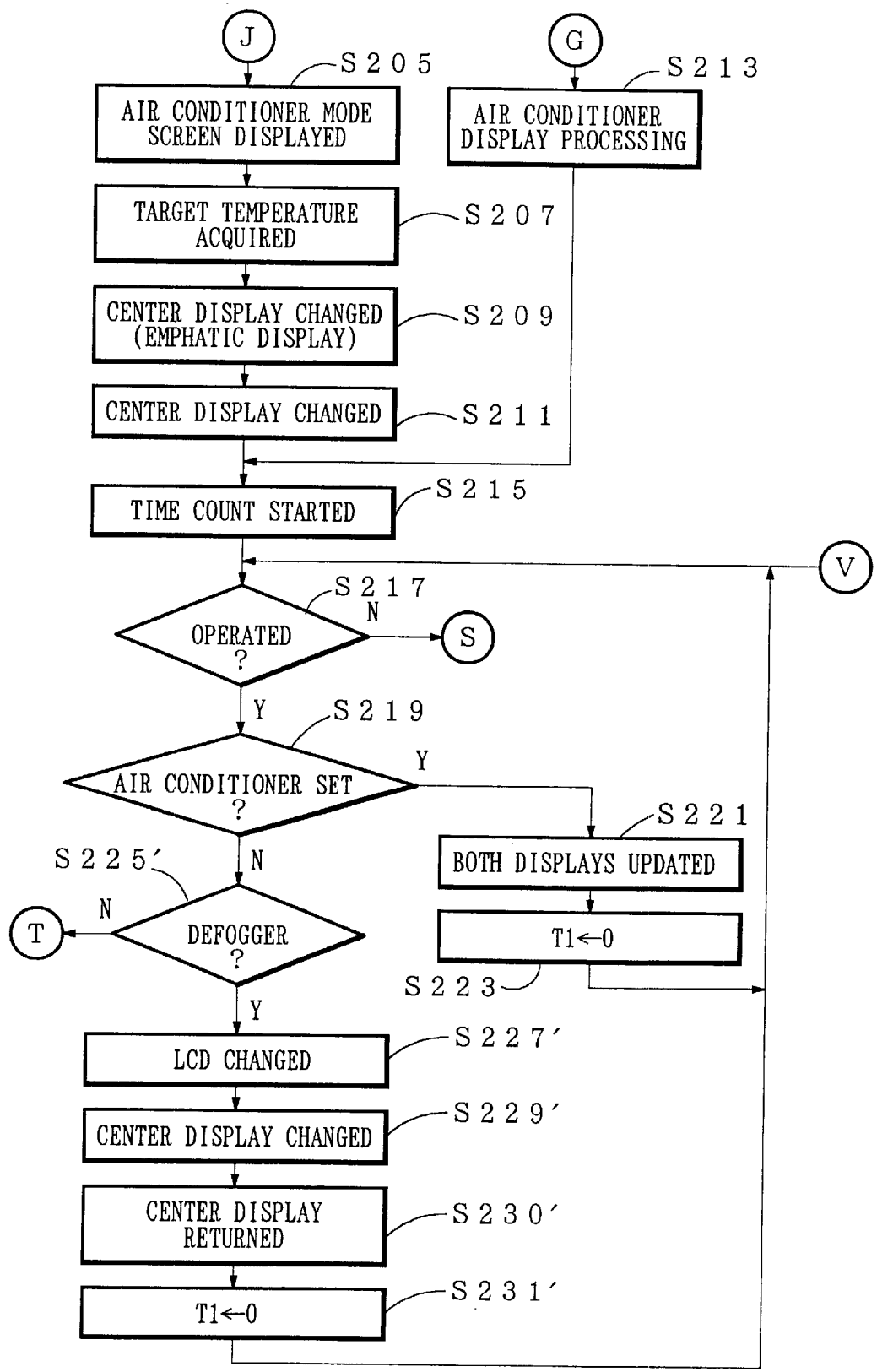

The steps S205–S223 in the flowchart in FIG. 71, which are entirely the same as steps S205–S223 in the flowchart in FIG. 35, are not explained here. The processing from when in step S219, the answer is No, i.e. none of the operation buttons 15a–15c has been pressed will be explained.

In step S219, if NO, whether or not the operation button 15e allotted for ON/OFF switching of the defogger has been pressed is verified (step S225'). In step S225', if NO, the processing proceeds to processing T (step S233 in FIG. 72).

If YES, the display at the operation button 15e in the air conditioner mode on the liquid display 15j is updated from a crosshatched inverted display to an on-white normal display, and vice versa (step S227').

In addition, the air conditioner mode guiding screen on the center display 29 is changed, for a prescribed time, into only the emphatic display of the symbol mark of the defogger and the character of its ON/OFF state after changed (step S229'). After the prescribed time elapsed, the display of the center display 29 is returned to the original air conditioner mode guiding screen (step S230'). Further, the timer value T1 of the second level timer is reset to zero (step S231'). Thereafter, the processing returns to step S217.

Figure 72:
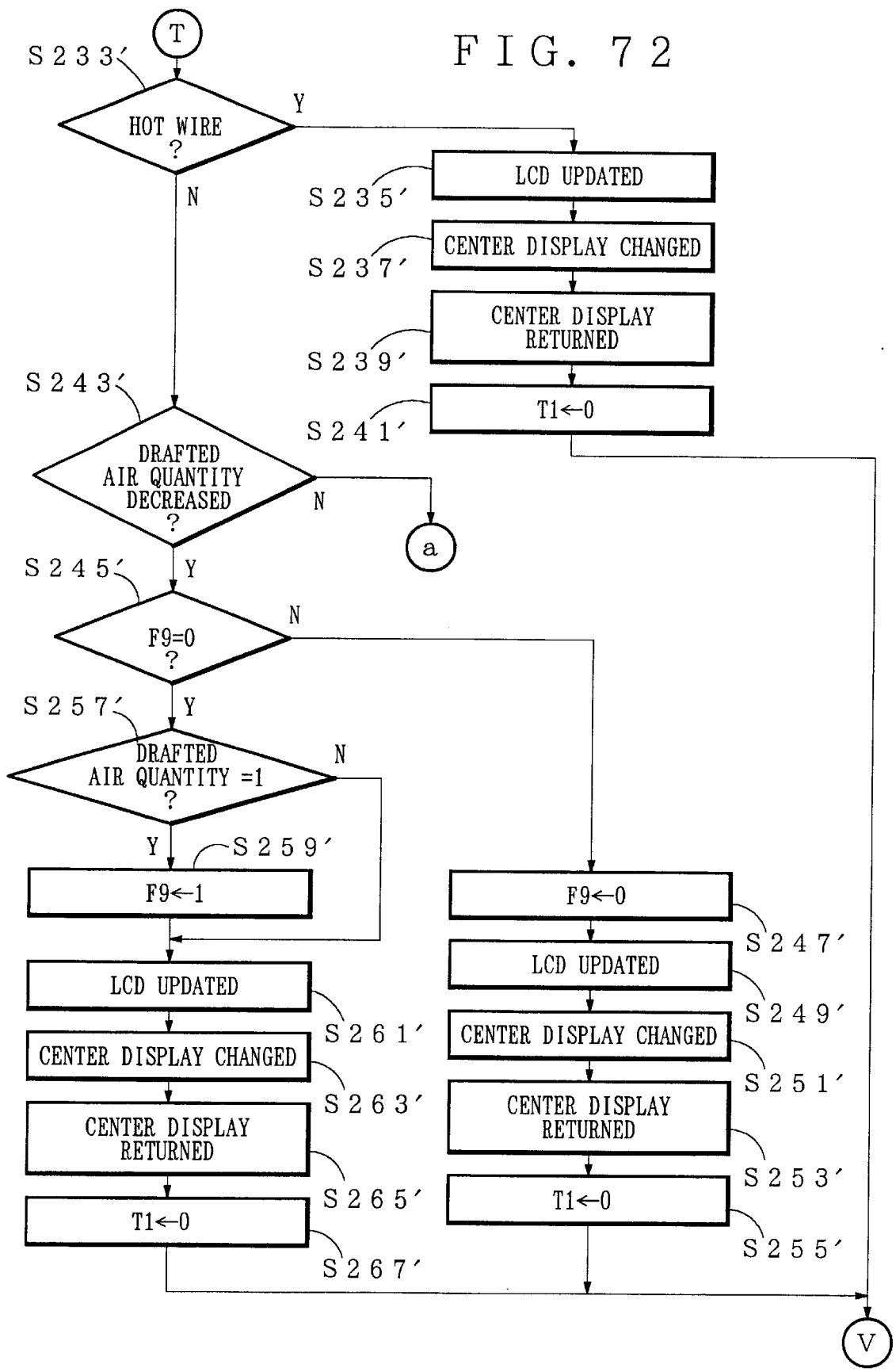

In step 233' in FIG. 72 coming from "N" in step S225', whether or not the operation button 15f (FIG. 9) for switching the hot wire rear window has been pressed is verified. In step S233', if NO, the processing proceeds to step S269' described later.

In step S233', if YES, the air conditioner mode screen on the liquid display 15j is updated from a crosshatched inverted display to on-white normal display, and vice versa in the display at operation button 15f (step S235').

In addition, the air conditioner mode guiding screen on the center display 29 is changed, for a prescribed time, into only the emphatic display of the symbol mark of the defogger and the character of its ON/OFF state after changed (step S237'). After the prescribed time elapsed, the display of the center display is returned to the original air conditioner mode guiding screen (step S239'). The timer value T1 of the second level timer is reset at zero (step S241'). Thereafter, the processing returns to step S217.

In step S243', whether or not the operation button 15g (FIG. 9) allotted for increasing or decreasing the quantity of drafted air has been pressed is verified. If NO, the processing proceeds to processing a' (step 269' in FIG. 41).

In step S243', if YES, whether or not the flag F9 in a minimum value flag area in RAM 31b is "0" is verified (step S257'). Instep S257, if YES, the processing proceeds to step S259' described later. If NO, the minimum value flag F9 is set at "0" (step S247'). The air conditioner mode display screen of the liquid crystal display 15j is updated to indicate the symbol mark of the drafted air quantity=5 (maximum) (step S249').

In addition, the air conditioner mode guiding screen on the center display 29 is changed, for a prescribed time, into only the emphatic display of the symbol mark of the drafted air quantity=5 (maximum)(step S237'). After the prescribed time elapsed, the display of the center display 29 is returned to the original air conditioner mode guiding screen (step S253'). The timer value T1 of the second level timer is reset at zero (step S255'). Thereafter, the processing returns to processing V (step S217 in FIG. 71).

In step S259', whether or not the present drafting air quantity is "1" is verified. If NO, the processing proceeds to step S261' described later. If YES, the minimum flag F9 is set at "1" (step S257'), and thereafter the processing proceeds to step S261'.

In step S261', the air conditioner mode screen on the liquid crystal display 15j is updated in accordance with changing of the drafting level corresponding to the pressed operation button 15h. In addition, the air conditioner mode guiding screen on the center display 29 is changed, for a prescribed time, into only the emphatic display of the symbol mark of the air drafting level (step S263'). After the prescribed time elapsed, the display of the center display is returned to the original air conditioner mode guiding screen (step S265'). The timer value T1 of the second level timer is reset at zero (step S267'). Thereafter, the processing returns to step S217.

In step S269' (FIG. 73) coming from step S243' (FIG. 72), whether or not the flag F11 of the maximum flag area in RAM 31b is "1" is verified. If YES, the processing proceeds to step S281'. If NO, the maximum flag F11 is set at "0" (step S271'). The air conditioner mode screen on the liquid crystal display 15j is updated so that the symbol mark of the air drafting level is air drafting level=1 (minimum) (step S273').

In addition, the air conditioner mode guiding screen on the center display 29 is changed, for a prescribed time, into only the emphatic display of the symbol mark of the drafted air quantity=1 (minimum)(step S275'). After the prescribed time elapsed, the display of the center display 29 is returned to the original air conditioner mode guiding screen (step S277'). The timer value T1 of the second level timer is reset at zero (step S79'). Thereafter, the processing returns to processing V (step S217 in FIG. 71).

In step S281', whether or not the present drafted air quantity is "4" is verified. If NO, the processing proceeds to step S285' described later. If YES, the maximum flag F11 is set at "1" (step S283'), and thereafter the processing proceeds to step S285'.

In step S285', the air conditioner mode screen on the liquid crystal display 15j is updated in accordance with changing of the drafting level corresponding to the pressed operation button 15h. In addition, the air conditioner mode guiding screen on the center display 29 is changed, for a prescribed time, into only the emphatic display of the symbol mark of the air drafting level (step S287'). After the prescribed time elapsed, the display of the center display is returned to the original air conditioner mode guiding screen (step S289'). The timer value T1 of the second level timer is reset at zero (step S291'). Thereafter, the processing returns to step S217.

As apparent from the explanation hitherto made, the step 217 in the flowchart in FIG. 71 and step 243' in the flowchart in FIG. 72 correspond to the processing by the operation detecting means A, and constitute the operation detecting means A together with the limit switches 16a–16h.

Figure 73:
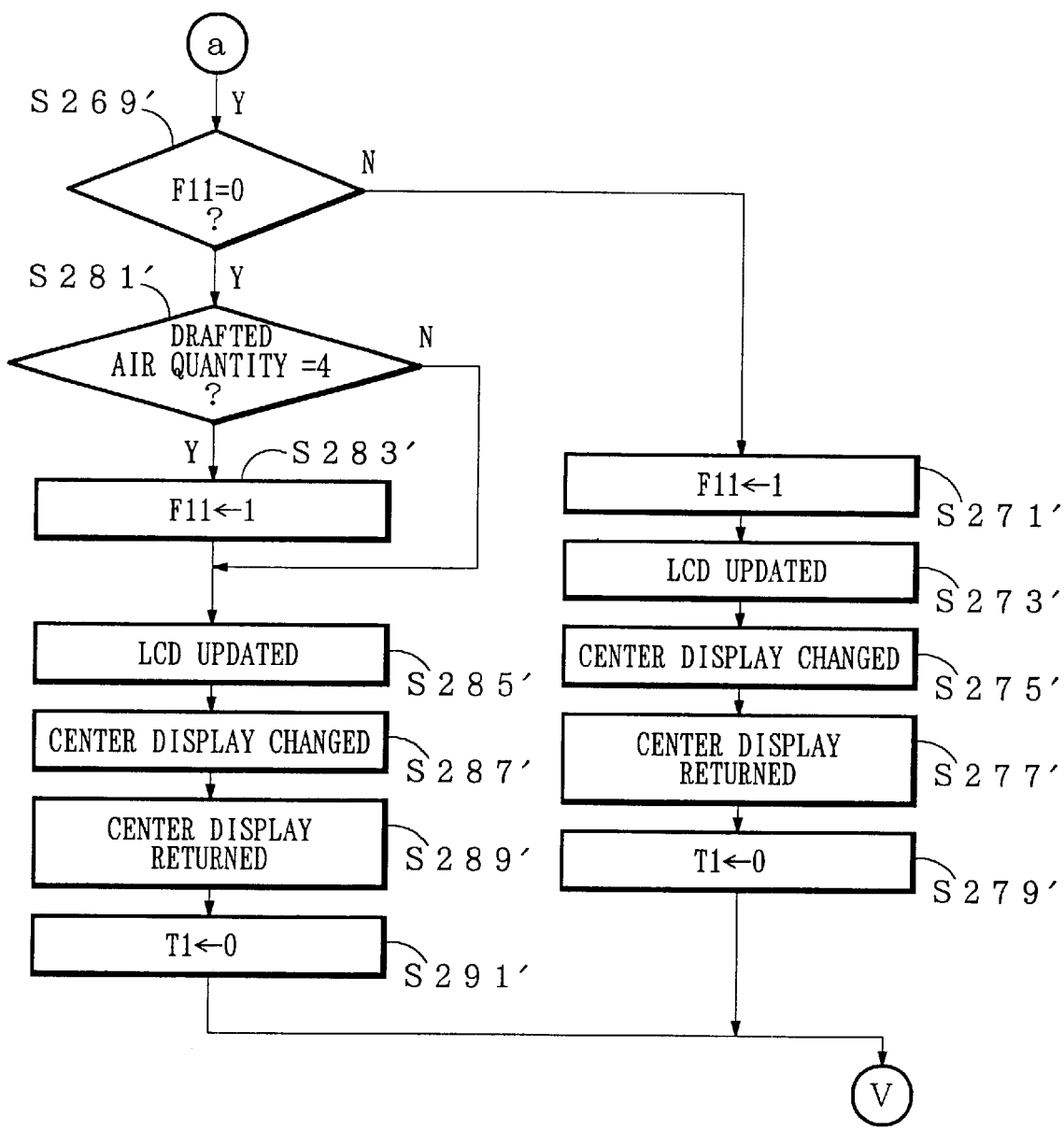

Further, in this embodiment, the steps S245' and S257', in the flowchart of FIG. 72 and steps S269' and S281' in the flowchart of FIG. 73 correspond to the processing by the stage discriminating means 31A. The steps S273' and S285' in the flowchart of FIG. 73 correspond to the processing by the character image information creating means 31B.

Figure 70:
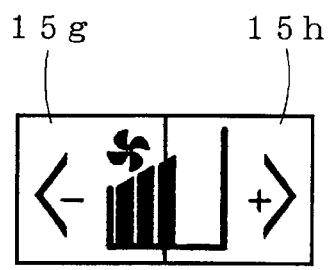
FIG. 70 is a view showing the main part of the display state by the multi-switch section by the multi-function switch according to an embodiment of the second aspect of the present invention.

The object appliance defined in claims correspond to the air conditioner 70 in this embodiment. The display means defined in claims corresponds to the liquid crystal display 15j. The decrement operation button α2 defined in claims corresponds to the operation button 15g where the left arrow, "–" and left half of the symbol of the air drafting level are viewed on the air conditioner mode screen in the multi-switch section as shown in FIG. 70; increment operation button α1 corresponds to the operation button 15h where the right arrow, "+" and right half of the symbol of the air drafting level are viewed; and operation button α includes the operation buttons 15g and 15h.

The character indicative of the operation of the object appliance defined in claims corresponds to the image of the symbol of the air drafting level.

In the switch device configured as described above, in the air conditioner mode displayed state, when the operation button 15g is pressed, the setting of the drafted air quantity is decremented by "1". In the state where the drafted air quantity has been reduced to the minimum of "0", when the operation button 15g is pressed, the setting is changed to the maximum of "5".

Likewise, when the operation button 15h is pressed, the setting of the drafted air quantity is incremented by "1", In the state where the drafted air quantity has been reduced to the minimum of "5", when the operation button 15g is pressed, the setting is changed to the minimum of "0".

Figure 74:
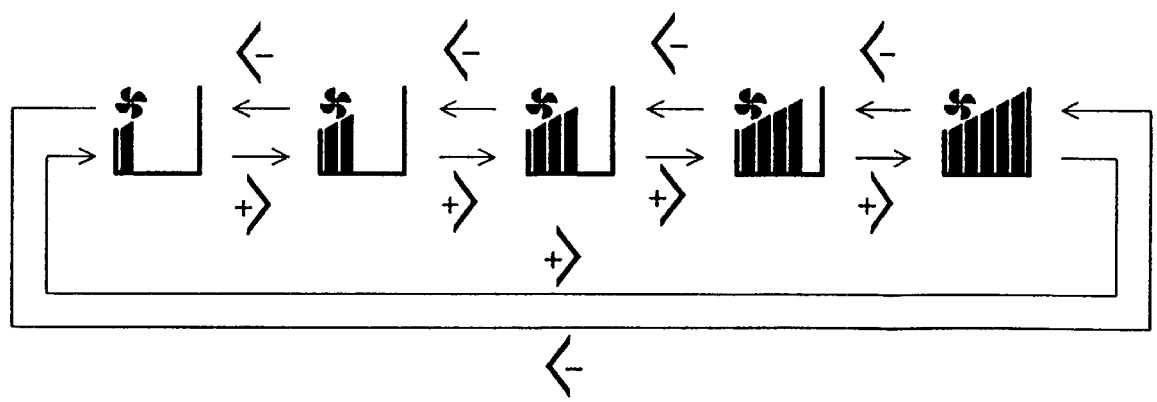
FIGS. 71 to 74 are flowcharts showing the processing performed by a CPU in accordance with the control program stored in an ROM in an microcomputer in the multi-function switch of FIG. 70.

Thus, the symbol indicative of the air drafting level changes as shown in FIG. 74. Specifically, when pressing of the operation button 15g is continued, the symbol changes counter-clockwise, whereas when pressing of the operation button 15h is continued, the symbol changes clockwise.

Incidentally, as in the first embodiment, by pressing the operation button 15g or 15h, the airconditioner mode guiding screen on the center display 29 is changed into the air drafting level.

In accordance with this embodiment, the same effect as in the first embodiment can be obtained. In addition, as understood from the above explanation, by pressing the operation button 15g or 15h only once without keeping on pressing it, setting of the air drafted quantity can be easily changed from the minimum from the maximum and vice versa.

Further, in accordance with this embodiment, the symbol mark of the air drafted quantity is displayed at an area spreading over both operation buttons 15g and 15h so that it can be displayed with good visibility without being restricted by the size of each of the operation buttons 15g and 15h.

In this embodiment, although the symbol of the air drafting level was displayed at the area spreading over two operation buttons on the liquid crystal display 15j, it may be displayed at the area spreading over three successive operation buttons.

Embodiment 3

In the first and the second embodiment, the present invention was explained in connection with changes of the symbol of the air drafting level or air drafting mode. However, the technical idea in the preset invention can be applied to the character of symbol indicative of the balancing of sound volume or sound quality viewed at the operation buttons 15a–15h in the audio control mode displayed state.

In the second embodiment, although the setting of the air drafting level was changed at a fixed pitch, it may be changed at a variable pitch.

Embodiment 3

FIG. 43 shows the display of the multi-switch section according to the third embodiment of the present invention. As seen from FIG. 43, the liquid crystal display 15j displays the audio control mode screen on which the preset set level of "BASS" in the CD player 40, MD player 50 and tuner 60 is viewed at the center operation button 15f of the three operation buttons 15e–15g.

Specifically, the character of "BASS" and present set value ("1"–"5") are viewed at the operation button 15f. A left arrow and "–" are viewed at the left operation button 15e, whereas a right arrow and "+" are viewed at the right operation button 15g. The rightmost operation button 15h is blank.

Referring to the flowchart of FIGS. 76–77, an explanation will be given of the processing of displaying the BASS in the CD player 40, MD player and tuner 60 on the audio control mode screen on the liquid crystal display 15j which is carried out according to the control program by the microcomputer 31.

Figure 76:
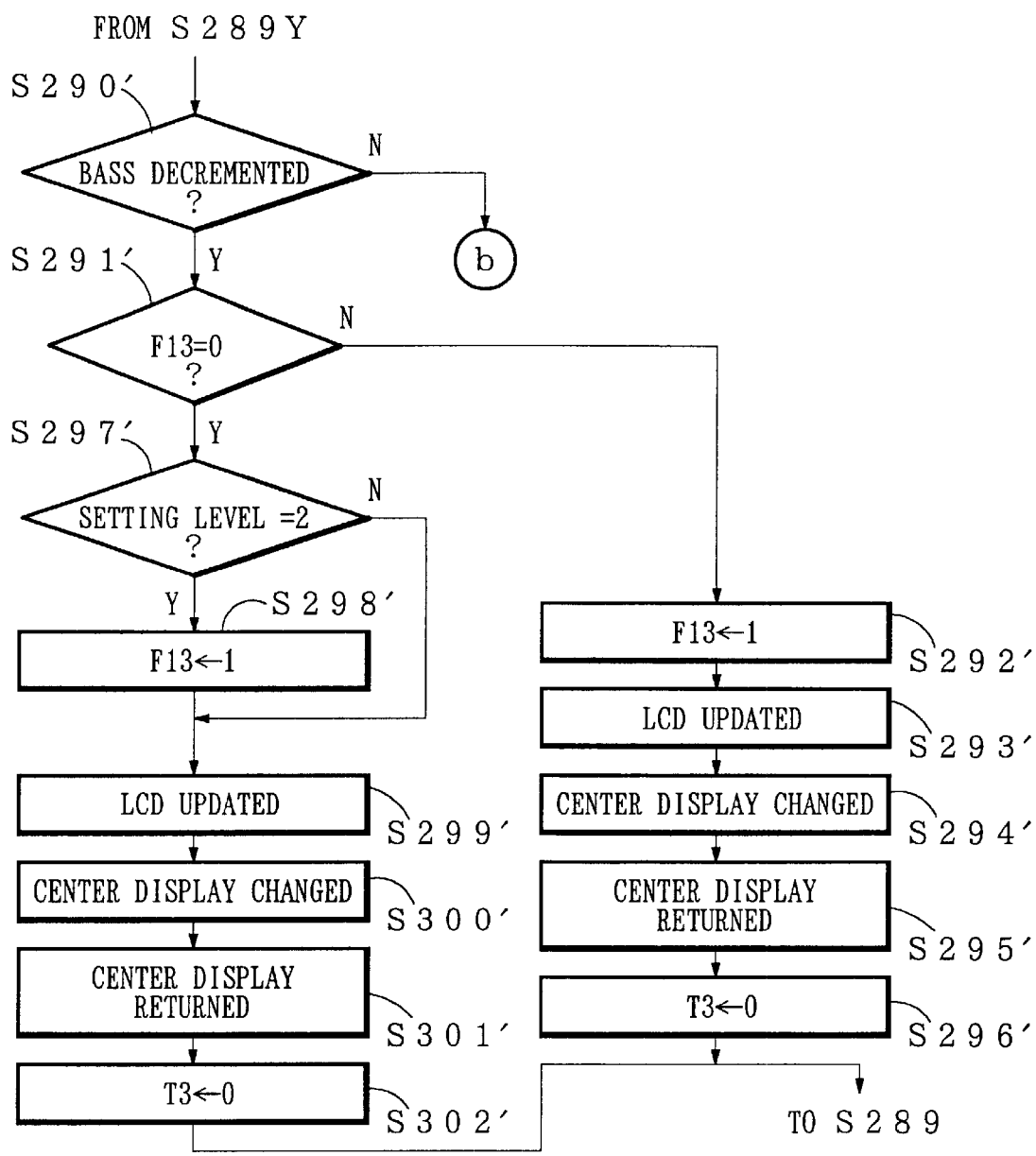
FIGS. 76 to 77 are flowcharts showing the processing performed by a CPU in accordance with the control program stored in an ROM in an microcomputer in the multi-function switch of FIG. 75.

The respective steps in FIG. 76 will be executed in place of the processing until step S303 if in step S289 in FIG. 38, the answer is YES.

In step S291' in FIG. 76, whether or not the operation button 15e allotted for decrement of "BASS" has been pressed is verified. If NO, the processing proceeds to processing b (step S290' in FIG. 77).

If YES in step S290', whether or not the flag F13 of the minimum flag area in RAM 31b is "0" is verified (step S291') In step S291, if YES, the processing proceeds to step S297' described later. If NO, the minimum flag F13 is set at "0" (step S292'). The audio control mode screen on the liquid crystal display 15j is updated so that the setting value of "BASS" viewed at the operation button 15f is "5" (maximum) (step S293').

In addition, the audio control mode guiding screen on the center display 29 is changed, for a prescribed time, into only the emphatic display of the character of the set value of "BASS" being "5" (maximum value) (step S294'). After the prescribed time elapsed, the display of the center display is returned to the original audio control mode guiding screen (step S295'). The timer value T3 of the third level timer is reset at zero (step S296'). Thereafter, the processing returns to step S289.

In step S297', whether or not the present set value of "BASS" is "2" is verified. If NO, the processing proceeds to step S299' described later. If YES, the minimum flag F13 is set at "1" (step S298'), and thereafter the processing proceeds to step S299'.

In step S299', the audio control mode screen on the liquid crystal display 15j is updated in accordance with changing of "BASS" level corresponding to the pressed operation button 15e. In addition, the audio control guiding screen on the center display 29 is changed, for a prescribed time, into only the emphatic display of the symbol mark of the set value of the "BASS" (step S300'). After the prescribed time elapsed, the display of the center display 29 is returned to the original audio control mode guiding screen (step S301'). The timer value T3 of the third level timer is reset at zero (step S302'). Thereafter, the processing returns to step S289.

As seen from FIG. 45, in step SA290, whether or not the operation button 15g allotted for increment of "BASS" has been pressed is verified. If YES, the processing proceeds to step SA291 described later. If NO, the audio control mode screen on the liquid crystal display 15j is updated so that the setting value of "BASS" viewed at the operation button 15f is "3" (default) (step SA290a).

In addition, the audio control mode guiding screen on the center display 29 is changed, for a prescribed time, into only the emphatic display of the character of the set value of "BASS" being "3" (default) (step SA290b). After the prescribed time elapsed, the display of the center display 29 is returned to the original audio control mode guiding screen (step SA290c). The timer value T3 of the third level timer is reset to zero (step SA290d). Thereafter, whether or not both the minimum value flag F13 and the maximum value flag F13 in RAM 31b are "0" is verified (step SA290e).

In step SA290e, if NO (any one of F13 and F15 is not "0"), both flags are set at "0" (step SA290f). Thereafter, the processing returns to step S289. In step SA290e, if YES (both F13 and F15 are "0"), the processing returns to step S289 (FIG. 38).

In step SA291, whether or not the maximum value flag F15 is "0" is verified. If YES, the processing proceeds to step SA297. If NO, the maximum value flag F15 is set at "0" (step SA292). The liquid crystal display 15j is updated so that the setting value of "BASS" viewed at the operation button 15f is "1" (minimum) (step SA293).

In addition, the audio control mode guiding screen on the center display 29 is changed, for a prescribed time, into only the emphatic display of the character of the set value of "BASS" being "1" (minimum) (step SA294). After the prescribed time elapsed, the display of the center display 29 is returned to the original audio control mode guiding screen (step SA295). The timer value T3 of the third level timer is reset at zero (step SA296).

In step S297, whether or not the present set value of "BASS" is "4" is verified. If NO, the processing proceeds to step SA299 described later. If YES, the maximum value flag F15 is set at "1" (step SA298), and thereafter the processing proceeds to step SA299.

In step SA299, the audio control mode screen on the liquid crystal display 15j is updated in accordance with changing of "BASS" level corresponding to the pressed operation button 15g. In addition, the audio control guiding screen on the center display 29 is changed, for a prescribed time, into only the emphatic display of the symbol mark of the set value of the "BASS" (step SA300). After the prescribed time elapsed, the display of the center display is returned to the original audio control mode guiding screen (step SA301). The timer value T3 of the third level timer is reset at zero (step SA302). Thereafter, the processing returns to step S289.

As apparent from the explanation hither to made, the step 217 in the flowchart in FIG. 71 and step 243' in the flowchart in FIG. 72 correspond to the processing by the operation detecting means A, and constitute the operation detecting means A together with the limit switches 16a–16h.

Figure 77:
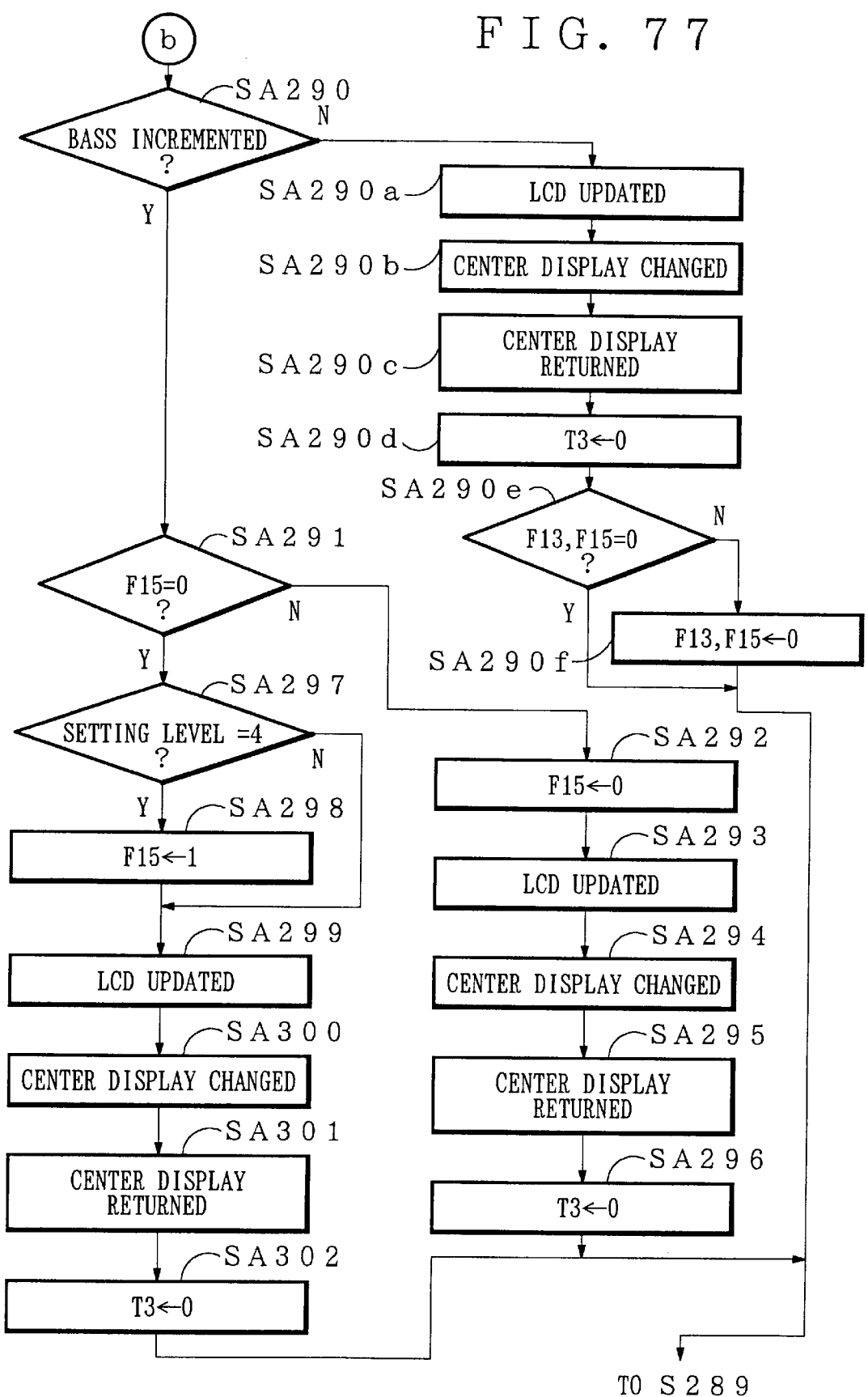

Further, in this embodiment, the steps S291' and S297' in the flowchart of FIG. 76 and steps SA291 and SA297 in the flowchart of FIG. 77 correspond to the processing by the stage discriminating means 31A. The steps S293' and S299' in the flowchart of FIG. 76 and the steps S290a, SA293 and SA299 correspond to the processing by the character image information creating means 31B.

Figure 75:
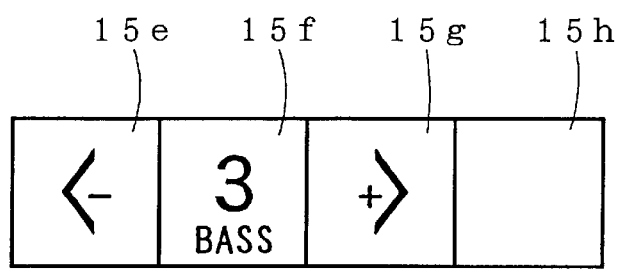
FIG. 75 is a view showing the main part of the display state by the multi-switch section by the multi-function switch according to another embodiment of the second aspect of the present invention.

The object appliance defined in claims correspond to the CD player 40, MD player 50 and tuner 60 in this embodiment. The display means defined in claims corresponds to the liquid crystal display 15j. The decrement operation button α2 defined in claims corresponds to the operation button 15e where the left arrow and "–" are viewed on the audio control mode screen in the multi-switch section as shown in FIG. 75; increment operation button α1 corresponds to the operation button 15g where the right arrow and "+" are viewed on the same screen; default operation button α3 defined in the claims corresponds to operation button 15f where the "BASS" and the present set value ("1"–"5") are viewed; and the operation button a defined in claims includes the operation buttons 15e, 15f and 15g.

The character indicative of the operation of the object appliance defined in claims corresponds to the image of the symbol of "BASS".

In the switch device configured as described above, in the audio control mode displayed state, when the operation button 15e is pressed, the setting of "BASS" is decremented by "1". In the state where the setting of "BASS" has been reduced to the minimum of "0", when the operation button 15g is pressed, the setting is changed to the maximum of "5".

Likewise, when the operation button 15g is pressed, the setting of "BASS" is incremented by "1". In the state where the setting of "BASS" has been reduced to the minimum of "5", when the operation button 15g is pressed, the setting is changed to the minimum of "1".

In the audio control mode displayed state, when the operation button 15f is pressed, the setting of "BASS" is changed to the default value of "3" regardless of the previous state.

In accordance with this embodiment, the same effect as in the first and the second embodiment can be obtained. In addition, as understood from the above explanation, by pressing the operation button 15f only once without memorizing the default value and keeping on pressing 15e or 15g, the setting of "BASS" can be easily changed into the default value.

In this aspect also, the explanation on each of the embodiments described hitherto was made in connection with the switch device which is arranged on the center console of a vehicle and used for selecting/setting the operation by the appliances and arranged on the center console of a vehicle. However, it is needless to say that the present invention can be also applied to a switch device which is used to select/set the operation of each of a plurality of object appliances using common operation buttons such as a collective setting device in indoor facilities.

What is claimed is:

1. A multi-function switch device comprising:

a plurality of operating operation buttons ($\alpha 1-\alpha n$) each for selecting object appliances and their operation;

a display means (15*j*) on which images indicative of functions of the operation buttons are displayed, the images being viewed at the corresponding operating operation buttons;

means (31A) for executing the display of a first level screen representative of a plurality of object appliances to be selected on the display means (15*j*);

means (B) for detecting whether or not any of the operation buttons has been pressed while the first level screen is displayed;

means (31B) for specifying an image of the appliance to be displayed on the display means (15*j*) in response to detection of a pressed operation button; and means (31C) for executing the display of a second level screen representative of a plurality of functions of a specific appliance, wherein the images of the second level screen replace entirely the images of the first level screen, wherein while the first level screen or the second level screen is displayed on the display means (15*j*), in a first operation button region except at least one of the plurality of operation buttons ($\alpha 1-\alpha n$), the corresponding functions are viewed, whereas in a second operation button region constituting the at least one operation button, additive information relative to functions of the operation buttons viewed in the first operation button region is viewed.

2. A multi-function switch comprising:

a plurality of operating operation buttons ($\delta 1-\delta n$) each for selecting one of operations of a specific object appliance;

a section (D) through which an operation of the specific appliance is selected using any of the operation buttons ($\delta 1-\delta n$);

a section (E) through which a change of setting of the operation of the object appliance is instructed;

display means (15*j*, 15*k*) for displaying the operations of the specific appliance which are viewed at the corresponding operation buttons ($\delta 1-\delta n$); and display changing means (33A) for changing the display of the display means (15*j*, 15*k*) so that in response to an instruction of changing the setting of the operation, selective operations relative to at least the setting are viewed at the operation buttons, wherein the changed display of the operations of the specific appliance replace entirely the previous display of the operations of the specific appliance, wherein an image of the first color is viewed against a background of the second color at a first operation button region composed of some of the plurality of operation buttons, whereas the image of the second color is viewed against the background of the first color at a second operation button region composed of the remaining operation buttons, and the first and the second operation button region are switched by a selecting means (F).

3. A multi-function switch device comprising:

operation button means ($\alpha$) for stepwise setting one of operations of an object appliance;

display means (15*j*) for displaying the set operation which is viewed at the operation button means;

means (A') for detecting that any one of operation button means has been pressed;

means (31A') for deciding the step of the operation set by the operation button means on the basis of a detection result of the detecting means (A'); and means (31B') for creating image information of a character to be viewed at the operation button means on the basis of a decision result of the deciding means (31A') so that the character representative of the operation of the object appliance viewed at the operation button means is changed in accordance with the step on the display means, wherein the image information to be viewed at the operation button means replaces entirely the previous information viewed at the operation button means, and wherein the operation button means includes an increment operation button for incrementing the step of the operation of the object appliance and a decrement operation button for decrementing the step thereof; and the step deciding means decides that the step of the operation is now a minimum value when the operation detecting means detects the operation of the increment operation button in a state where the step of the operation is decided to be a maximum value, and decides that the step of the operation is now a maximum value when the operation detecting means detects the operation of the decrement operation button in a state where the step of the operation is decided to be a minimum value.

4. The multi-function switch device according to claim 3, wherein the operation button means further includes a default operation button for setting the step of operation at a default value between the minimum value and the maximum value, and the step deciding means decides that the step of the operation is now a default value when the operation detecting means detects the operation of the default operation button.

* * * * *